US009568172B1

(12) United States Patent
Chantos et al.

(10) Patent No.: US 9,568,172 B1

(45) Date of Patent: Feb. 14, 2017

(54) APPARATUS, SYSTEM, AND METHOD FOR AIMING LED MODULES

(71) Applicant: Musco Corporation, Oskaloosa, IA (US)

(72) Inventors: Christopher T. Chantos, Davenport, IA (US); Lawrence H. Boxler, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 891 days.

(21) Appl. No.: 13/839,017

(22) Filed: Mar. 15, 2013

Related U.S. Application Data

(60) Provisional application No. 61/642,354, filed on May 3, 2012.

(51) Int. Cl.
*G01B 11/26* (2006.01)
*F21V 21/14* (2006.01)

(52) U.S. Cl.
CPC .................................... *F21V 21/14* (2013.01)

(58) Field of Classification Search
CPC ...................................................... F21V 21/14
See application file for complete search history.

(56) References Cited

U.S. PATENT DOCUMENTS

| | | | | |
|---|---|---|---|---|
| 8,300,219 | B1 | 10/2012 | Gordin et al. | |
| 2005/0057745 | A1* | 3/2005 | Bontje | 356/139.03 |
| 2012/0217897 | A1 | 8/2012 | Gordin et al. | |

* cited by examiner

*Primary Examiner* — Luke Ratcliffe
*Assistant Examiner* — Samantha K Abraham
(74) *Attorney, Agent, or Firm* — McKee, Voorhees & Sease, PLC

(57) ABSTRACT

An apparatus, system and method for aiming solid state lighting modules that are mounted in a lighting fixture. The apparatus comprises an aiming station space from a projection surface. At least one reference laser projects from at or near the aiming station to the projection surface. The lighting module is preliminary attached to a supporting structure or rail that is mounted at the aiming station. An aiming laser is temporarily attached to the housing. The module is manually adjusted on its mounting rail to align its aiming laser with a reference position on the projection surface. The module is then locked in to position.

15 Claims, 56 Drawing Sheets

SECTION 5-5

SECTION 7-7

SIDE VIEW

BACK VIEW

FRONT VIEW 52
53
51
50
TOP VIEW

BOTTOM VIEW

PERSPECTIVE VIEW

FRONT VIEW

BACK VIEW

RIGHT VIEW

LEFT VIEW

θ

| Module Position on Bar | Center Angle | X | Y |
|---|---|---|---|
| R6R | 45 | 6.350 | 2.754 |
| R6C | 45 | 6.138 | 2.542 |
| R6L | 45 | 5.926 | 2.330 |
| R5R | 37.5 | 5.52205521 | 1.9763214 |
| R5C | 37.5 | 5.2840492 | 1.793693 |
| R5L | 37.5 | 5.0460432 | 1.6110646 |
| R4R | 30 | 4.600 | 1.313 |
| R4C | 30 | 4.340 | 1.163 |
| R4L | 30 | 4.080 | 1.013 |
| R3R | 22.5 | 3.59885605 | 0.7755307 |
| R3C | 22.5 | 3.32169219 | 0.6607257 |
| R3L | 22.5 | 3.04452833 | 0.5459206 |
| R2R | 15 | 2.536 | 0.373 |
| R2C | 15 | 2.247 | 0.296 |
| R2L | 15 | 1.957 | 0.218 |
| R1R | 7.5 | 1.43040081 | 0.1134165 |
| R1C | 7.5 | 1.13296735 | 0.0742586 |
| R1L | 7.5 | 0.83553389 | 0.0351007 |
| 0R | 0 | 0.300 | 0.000 |
| 0C | 0 | 0.000 | 0.000 |
| 0L | 0 | -0.300 | 0.000 |
| L1R | -7.5 | -0.8355339 | 0.0351007 |
| L1C | -7.5 | -1.1329673 | 0.0742586 |
| L1L | -7.5 | -1.4304008 | 0.1134165 |
| L2R | -15 | -1.957 | 0.218 |
| L2C | -15 | -2.247 | 0.296 |
| L2L | -15 | -2.536 | 0.373 |
| L3R | -22.5 | -3.0445283 | 0.5459206 |
| L3C | -22.5 | -3.3216922 | 0.6607257 |
| L3L | -22.5 | -3.5988561 | 0.7755307 |
| L4R | -30 | -4.080 | 1.013 |
| L4C | -30 | -4.340 | 1.163 |
| L4L | -30 | -4.600 | 1.313 |
| L5R | -37.5 | -5.0460432 | 1.6110646 |
| L5C | -37.5 | -5.2840492 | 1.793693 |
| L5L | -37.5 | -5.5220552 | 1.9763214 |
| L6R | -45 | -5.926 | 2.330 |
| L6C | -45 | -6.138 | 2.542 |
| L6L | -45 | -6.350 | 2.754 |

TABLE TX

θ

| | | | |
|---|---|---|---|
| 2R5R | 33.75 | 5.072 | 1.630 |
| 2R5C | 33.75 | 4.822 | 1.463 |
| 2R5L | 33.75 | 4.573 | 1.296 |
| 2R4R | 26.25 | 4.10812765 | 1.0278312 |
| 2R4C | 26.25 | 3.83906583 | 0.8951446 |
| 2R4L | 26.25 | 3.57000401 | 0.762458 |
| 2R3R | 18.75 | 3.0741736 | 0.5570783 |
| 2R3C | 18.75 | 2.79009456 | 0.4606465 |
| 2R3L | 18.75 | 2.50601552 | 0.3642146 |
| 2R2R | 11.25 | 1.98761958 | 0.2253109 |
| 2R2C | 11.25 | 1.693384 | 0.1667838 |
| 2R2L | 11.25 | 1.39914841 | 0.1082567 |
| 2R1R | 3.75 | 0.86705684 | 0.0382055 |
| 2R1C | 3.75 | 0.56769916 | 0.0185845 |
| 2R1L | 3.75 | 0.26834148 | -0.0010364 |
| 2L1R | -3.75 | -0.2683415 | -0.0010364 |
| 2L1C | -3.75 | -0.5676992 | 0.0185845 |
| 2L1L | -3.75 | -0.8670568 | 0.0382055 |
| 2L2R | -11.25 | -1.3991484 | 0.1082567 |
| 2L2C | -11.25 | -1.693384 | 0.1667838 |
| 2L2L | -11.25 | -1.9876196 | 0.2253109 |
| 2L3R | -18.75 | -2.5060155 | 0.3642146 |
| 2L3C | -18.75 | -2.7900946 | 0.4606465 |
| 2L3L | -18.75 | -3.0741736 | 0.5570783 |
| 2L4R | -26.25 | -3.570004 | 0.762458 |
| 2L4C | -26.25 | -3.8390658 | 0.8951446 |
| 2L4L | -26.25 | -4.1081277 | 1.0278312 |
| 2L5R | -33.75 | -4.5729087 | 1.2961727 |
| 2L5C | -33.75 | -4.8223496 | 1.4628438 |
| 2L5L | -33.75 | -5.0717905 | 1.6295148 |

TABLE TZ

Fig.16T

| Denavit-Hartenberg Parameters | | | |
|---|---|---|---|
| a (i-1) | alpha (i-1) | d (i) | theta (i) |
| 0.000 | -109.835 | 0.000 | 0.000 |
| 0.000 | 0.000 | 0.000 | 95.015 |
| 0.000 | 90.000 | 0.000 | 19.377 |
| 180.580 | 0.000 | 0.000 | 0.000 |
| 0.000 | 0.000 | 0.000 | 0.000 |

1070

Transformation Matrices

Local wTw1

| | | | |
|---|---|---|---|
| 1.000 | 0.000 | 0.000 | -2.006 |
| 0.000 | -0.339 | 0.941 | 1.222 |
| 0.000 | -0.941 | -0.339 | -0.539 |
| 0.000 | 0.000 | 0.000 | 1.000 |

wTw1

| | | | |
|---|---|---|---|
| -0.087 | -0.996 | 0.000 | 0.000 |
| 0.996 | -0.087 | 0.000 | 0.000 |
| 0.000 | 0.000 | 1.000 | 0.000 |
| 0.000 | 0.000 | 0.000 | 1.000 |

wTw1

| | | | |
|---|---|---|---|
| 0.943 | -0.332 | 0.000 | 0.000 |
| 0.000 | 0.000 | -1.000 | 0.000 |
| 0.332 | 0.943 | 0.000 | 0.000 |
| 0.000 | 0.000 | 0.000 | 1.000 |

wTw1

| | | | |
|---|---|---|---|
| 1.000 | 0.000 | 0.000 | 180.580 |
| 0.000 | 1.000 | 0.000 | 0.000 |
| 0.000 | 0.000 | 1.000 | 0.000 |
| 0.000 | 0.000 | 0.000 | 1.000 |

Global wTs

| | | | |
|---|---|---|---|
| -0.087 | -0.996 | 0.000 | -2.006 |
| -0.338 | 0.030 | 0.941 | 1.222 |
| -0.937 | 0.082 | -0.339 | -0.539 |
| 0.000 | 0.000 | 0.000 | 1.000 |

wT1

| | | | |
|---|---|---|---|
| -0.082 | 0.029 | 0.996 | -2.006 |
| -0.007 | 1.000 | -0.030 | 1.222 |
| -0.997 | -0.009 | -0.082 | -0.539 |
| 0.000 | 0.000 | 0.000 | 1.000 |

WT2

| | | | |
|---|---|---|---|
| -0.082 | 0.029 | 0.996 | -16.896 |
| -0.007 | 1.000 | -0.030 | 0.000 |
| -0.997 | -0.009 | -0.082 | -180.500 |
| 0.000 | 0.000 | 0.000 | 1.000 |

Fig. 16Z

APPARATUS, SYSTEM, AND METHOD FOR AIMING LED MODULES

CROSS-REFERENCE TO RELATED APPLICATIONS

This application claims priority under 35 U.S.C. §119 to provisional application Ser. No. 61/642,354 filed May 3, 2012, herein incorporated by reference in its entirety.

I. BACKGROUND OF THE INVENTION

Field of the Invention

This invention relates to lighting and lighting fixtures and, in particular, to apparatus, systems, and methods of aiming individually adjustable light modules that are mountable collectively into a lighting fixture.

State of the Art

In many lighting applications particular illumination criteria are specified or desired. An example is wide area lighting. Intensity, uniformity, and minimums across a target area are examples. Part of the job of a lighting designer is to select fixtures which meet those illumination specifications.

But a subtle aspect of fixture selection is not only what type of light output they create (e.g. light distribution pattern), but also how that output meets the lighting specifications when the fixture is aimed from its operating position to the target.

One older approach is to place fixtures in operating position relative the target area, manually aim them in some organized fashion, and test if the specifications are met. This, however, can be extremely resource and time intensive. For large or wide area lighting, this can mean elevating workers sometimes up to one hundred or more feet in the air, manually manipulating relatively large fixtures, and somehow communicating with workers down at the target if the aimings are right and if they meet requirements. Consider this for sports lighting having four tall poles, each with eight lighting fixtures. Just moving the elevated worker from pole to pole involves a large crane and significant time. Then to manually aim each fixture is resource intensive. It also involves human error in aiming.

More recently attempts have been made to use computerized programs to assist in selection of the fixtures and output patterns to effectively illumination a target, and to calculate how each will be aimed relative to the target area when in operating position. The programming can be translated to a factory-aiming methodology that allows each fixture to be pre-aimed (sometimes called factory aiming) on support structures (e.g. cross-arms). The pre-aimed fixtures/cross arms can then be taken to the actual target area and elevated into operating position. By, for example, confirming the cross arms or at least one fixture is correctly aimed to the target, the assumption is all fixtures are likewise. This can save considerable time and expense in the final installation of the lighting system.

U.S. Pat. No. 8,300,219, incorporated by reference herein and commonly owned by the assignee of the present application, describes and illustrates one such pre-aiming system related to high intensity, wide-area lighting fixtures having a single, large, high intensity discharge (HID) lamp per fixture. Machine vision and computer displays inform the worker how to aim the mounting elbow for each fixture to a cross arm in the factory. The cross arms are taken to the target, the lamp and reflector and other needed components assembled thereto, and the cross arms/fixtures raised on poles into operating position. U.S. Pat. No. 8,300,219 describes how such factory aiming of single-lamp fixtures can significantly save time and resources, and improve accuracy of aiming for such fixtures.

Even more recently, light emitting diode (LED) lighting has emerged as a viable substitute for HID lighting in wide or large area lighting, including but not limited to such things as sports lighting, roadway lighting, parking lot lighting, and the analogous illumination tasks. However, the size and light output of individual LEDs is a fraction of that of most wide area HID lamps. As of yet, quite a large number of LEDs must be mounted into a single fixture to achieve the light output and beam pattern distributions of typical HID fixtures. One approach is to mount the LEDs on a single mounting board inside a single large reflector to support and guide the light output. Sometimes individual optical components are placed over the LEDs to alter their beam patterns.

Another approach is to mount the many LEDs into the fixture but with structure that allows individual LEDs to be independently adjusted in at least one direction. The lighting designer can then have a highly customizable fixture in the sense that a large number of light output patterns from the single fixture can be created by the selection of the aiming direction of each LED in the fixture. An example is commonly owned U.S. patent application Ser. No. 13/399,291, incorporated by reference herein.

However, in a way this re-creates the older problem discussed above with regard to aiming fixtures. Each of the plural LEDs in the fixture must somehow be accurately aimed to achieve the designer's intended light output from the fixture when in operating position. As will be further discussed, some of these LED-based fixtures can have tens of LEDs. One example would be in a range of 50 to 100. To individually manually aim each one at the target site with the fixture elevated in operating position would add to rather than relieve the time and resource burden of on-site aiming discussed above.

In addition, the relatively small size of current individual LED assemblies, even with attendant optics (e.g. lens, reflectors, visors, etc.) does not lend itself to the computer vision jigs and system of U.S. Pat. No. 8,300,219, which is incorporated herein by reference. The issues this creates can be further appreciated by reference to a particular type of LED assembly discussed below.

LED (light emitting diode) modules such as those described U.S. patent application Ser. No. 13/399,291, which is incorporated by reference in its entirety, need to be aimed as discussed in Procedure 3000, step 3004 of FIG. 13 of said application, which is also reproduced as FIG. 11 of this application. Such lighting modules 10 are illustrated in FIGS. 3-7. A housing 60 (bowl-shaped shell) and mounting structure to mount modules 10 in housing 60 is shown in FIGS. 1-10, The independent aiming of each module 10 (which includes one or just a few LEDs 201) is required to produce a collectively light output distribution pattern from the single fixture on which they are mounted to be useful in meeting an illumination scheme designed or specified for a target area.

The following paragraphs from the aforementioned patent application explain the need and desirability of an improved aiming method.

The mechanics of aiming a module 10 have already been discussed, but to do so in a rapid and repeatable manner it is beneficial if all modules associated with an individual beam pattern are aligned to a common reference—readily visible to an assembler—while affixed to module bar 50, but prior to module bar 50 being installed in fixture housing 60.

U.S. Pat. No. 8,300,219, discusses methods of aiming a plurality of objects to a common reference, though other methods are possible, and envisioned. In practice, each individual module could have a laser mounted thereon and the module pivoted until the beam projected from the mounted laser matched the position of an aiming point projected onto a wall or floor. This same approach could be applied to a module bar (e.g. see module bar or rail 50 in FIGS. 6, 7 and 10) in that the laser could be mounted to the bar and aimed to a reference point and the aiming of each LED module mounted to said module bar assumed to be accurate once the bar is aimed. The aiming of the fixture housing could be assured using the same method. Of course, a laser need not be used; a sensor/receiver setup could be used. There are a variety of methods by which LED modules 10 may be precisely aimed and though it is perhaps the easiest to aim LED modules 10 prior to installation in fixture housing 60, it is not a departure from aspects of the present invention to aim modules in situ.

Once a module bar/LED module assembly is fully built and aimed, it may be installed in fixture housing 60 according to step 3005 of method 3000 (FIG. 11). Ideally, no additional aiming or modification to the assembly is required once affixed to the interior of housing 60. The process is repeated according to step 3006 for all modules in a given fixture, after which outer components (see FIG. 2) are affixed according to step 3007 so to produce exemplary fixture 5000.

The foregoing illustrates some of the issues and difficulties that exist in the art. Although projecting a laser temporarily mounted on a module 10 when in place in a fixture housing 60 allows a worker to see a projection of the aiming direction of the module 10 relative to the surface and relative to housing 60, it is apparent that there is room for improvement in the art. There is a need for an improved way to translate the aiming orientation of each of the plural modules in an accurate and repeatable way relative to the designer's output distribution pattern needed from the fixture for each different lighting application. There is a need for highly flexible yet precise and accurate pre-aiming of such many relatively small, independently adjustable lighting modules for not only each fixture but for multiple fixtures, including when the aiming plan for modules differs from fixture to fixture. There is a need for improvement in technique, space requirements, automation, and processing of such pre-aiming projects.

II. SUMMARY OF THE INVENTION

It is therefore a principle object, feature, aspect, or advantage of the present invention to provide an improvement in this technological field.

Further objects, features, aspects, or advantages of the present invention include an apparatus, system, or method for aiming independently adjustable solid state light source modules relative a mounting interface that is then installed into a lighting fixture. Another object, aspect, advantage, or feature of the present invention is an apparatus, method, or system as above described which can improve precision, accuracy, and repeatability of aiming such modules, whether one or many in a fixture and whether one or many in multiple fixtures.

Another object, feature, aspect, or advantage of the present invention is an apparatus, system, or method as above described which provides more efficient semi-automated aiming prior to installation in an operating position relative a target area, including but not limited to, factory pre-aiming.

Further objects, features, aspects, and advantages of the present invention include an apparatus, method, or system as above described which can be set up in a limited space, room, or area.

Another aspect, feature, advantage, or feature of the present invention is an apparatus, system or method as above described which has high flexibility for use in a number of varied applications and configurations.

A method, system, and apparatus for aiming LED modules are described herein which is an improvement to existing art. This includes, but is not limited to, an improvement in terms of convenience, repeatability, and accuracy.

In accordance with the present invention, a method, system, and apparatus is envisioned for aiming LED modules which allows a one or more modules to be aimed with respect to one or more axes and in reference to pre-determined aiming points.

Another aspect of the invention comprises a system which utilizes an aiming fixture for mounting the supporting structure for one or more solid state light modules; a jig or mount that can either be fixed or adjustable around one axis of rotation relative to a projection surface; a least one laser projecting a reference line on the projection surface correlated to one degree freedom of movement of aiming of the lighting module, and a laser beam removably mounted on the lighting module that is coordinated with the general aiming axis of the lighting module such that projection of that laser beam to the projection surface provides visual indication of aiming of the lighting module relative of its supporting structure and relative to the at least one reference line on the projection surface. This combination allows a visual reference indicator on the projection surface to inform a worker as to how to adjust the lighting module in a desired fashion. Once adjusted the lighting module can be fixed in that aiming orientation. The supporting structure and pre-aimed lighting module can then be installed into the lighting fixture which can then be installed in operating position. The pre-aiming can be correlated to either a desired composite light output distribution from the fixture or specified lighting criteria for a target area.

Another aspect of the present invention relates to the system as above described with optionally a second laser that can be projected on the projection surface to form another reference line used or correlated to pre-determined desired aiming orientation of the lighting module in two degrees of freedom of movement direction.

Another aspect of the invention includes a controller that is operatively connected to actuators at least at one of the adjustable last beams to in an at least semi-automated fashion adjust the laser beam over a range of projected positions on the projection surface relating or correlated to a range of desired aiming orientations of the lighting module relative to its position on the aiming jig. Still further, the controller could also be operatively connected to an actuator to adjust the aiming jig in at least one degree of freedom of movement to position the support structure or mounting rail to which the lighting module is attached into a pre-determined position to assist in efficiently managing the range of potential aiming orientations projected to the projection surface. In one aspect, this movement of the aiming jig is rotation around a horizontal axis that is spaced from but parallel to the projection surface to improve the range of potential aiming positions of modules when space for the projection surface is limited.

Another aspect of the invention comprises methods and software associated with a programmable controller which can translate the three-dimensional position of several different components of the system relative to one another and calculate required offsets, compensations, and adjustments to convert output signals of the controller to any of the actuators to effectuate visual reference indicators on the projection surface to sufficient accuracy. In one example, the translation is between three-dimensional coordinate systems for the projection surface, the aiming fixture, and the supporting structure or rail. Software can include mathematical translations such that a pre-determined aiming orientation for each lighting module relative to the mounting structure or rail when ultimately in operating position, can be simulated by projection of the at least one reference laser and/or rotation of the aiming jig to allow projection of a laser beam mounted on the lighting module to a visual reference on the projection surface to match the pre-determined aiming of that lighting module for its ultimate operating position in a lighting fixture. In one aspect a priori knowledge of the elevation and orientation of the lighting fixture in its ultimate operating position relative a target, the position of the supporting structure or rail for the lighting module in the fixture as well as its orientation relative to fixture and target, and the desired azimuth and elevation of the lighting module relative the lighting fixture or the target results in the lighting module aiming needing to be adjusted in two dimensions relative its supporting structure or rail in the aiming fixture relative to the projection surface to meet its pre-designed aiming requirements.

Further in accordance with the present invention, the method, system, and apparatus is envisioned wherein one or more modules are identified, attached to a mounting structure, and attached to an aiming fixture which projects one or more laser reference lines and positions the module mounting structure with reference to a desired angle between the module and the mounting structure These and other objects, features, aspects, and advantages of the present invention will become more apparent with reference to the accompanying specification and claims.

III. BRIEF DESCRIPTION OF THE DRAWINGS

Figure 7:
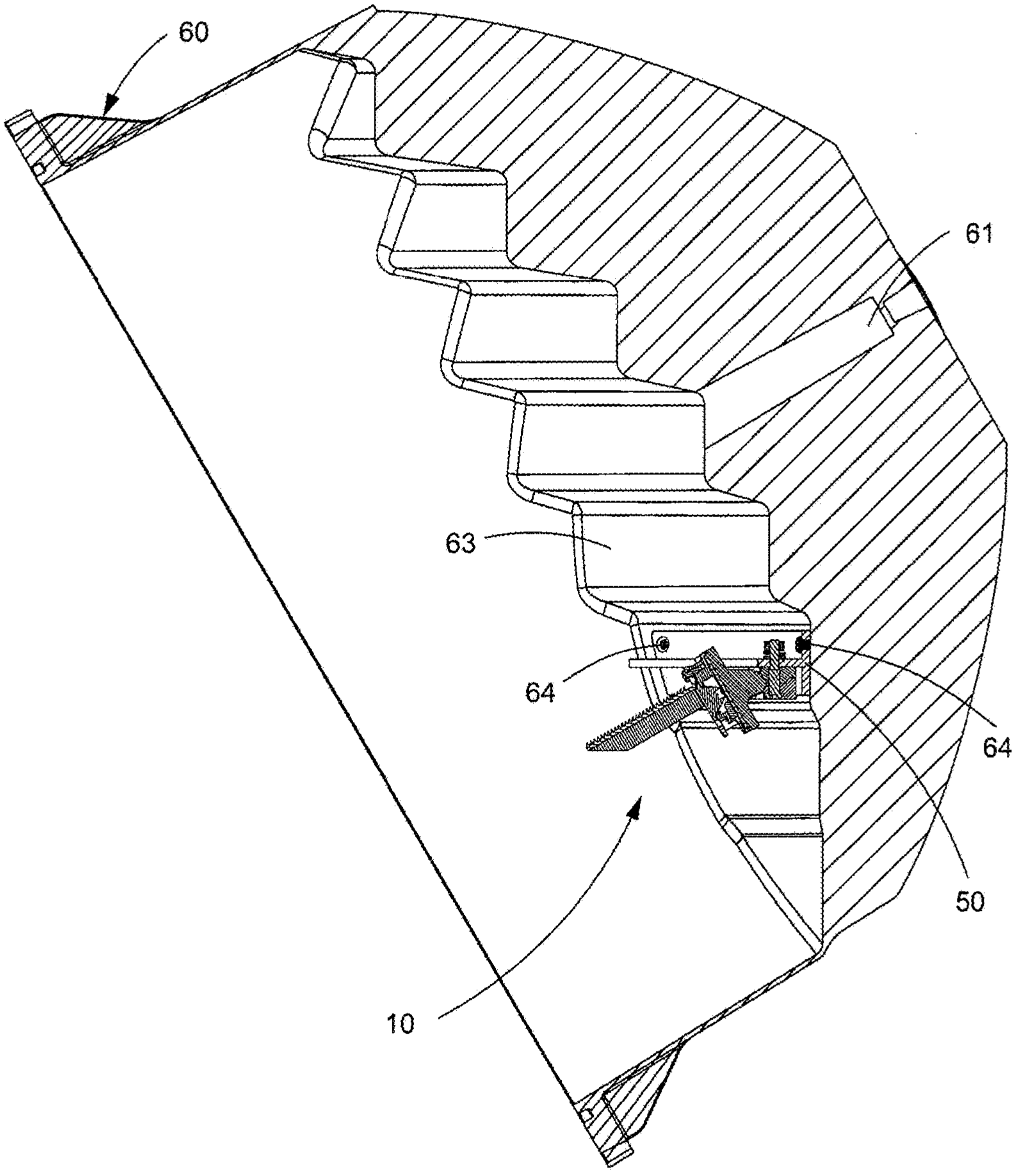
FIG. 7 is an enlarged sectional view taken along line 7-7 of FIG. 8A of the fixture housing of FIGS. 1 and 2 showing mounting surfaces for module rails such as FIG. 6.
Figures 8A, 8B, 8C:
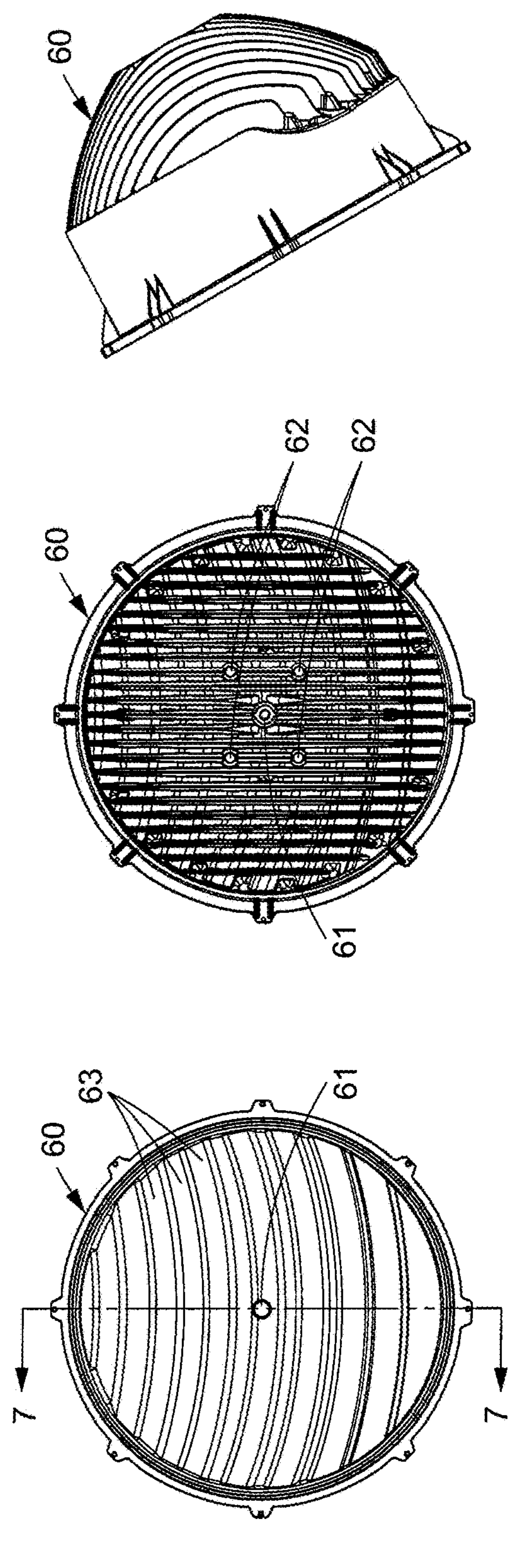

FIG. 8A-C are front, back, and side isometric views of the housing of FIG. 7.

Figure 9:
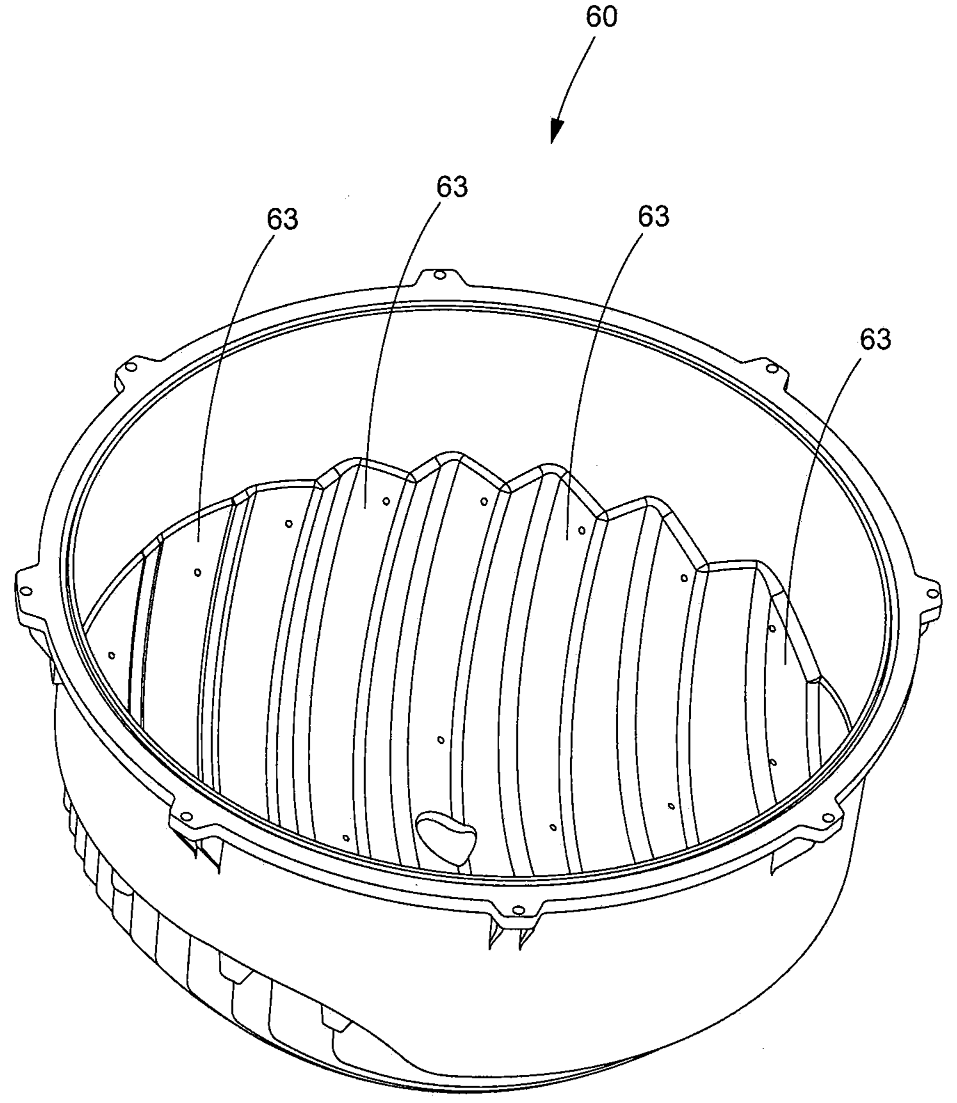
Figures 10A, 10B, 10C, 10D, 10E, 10F, 10G:
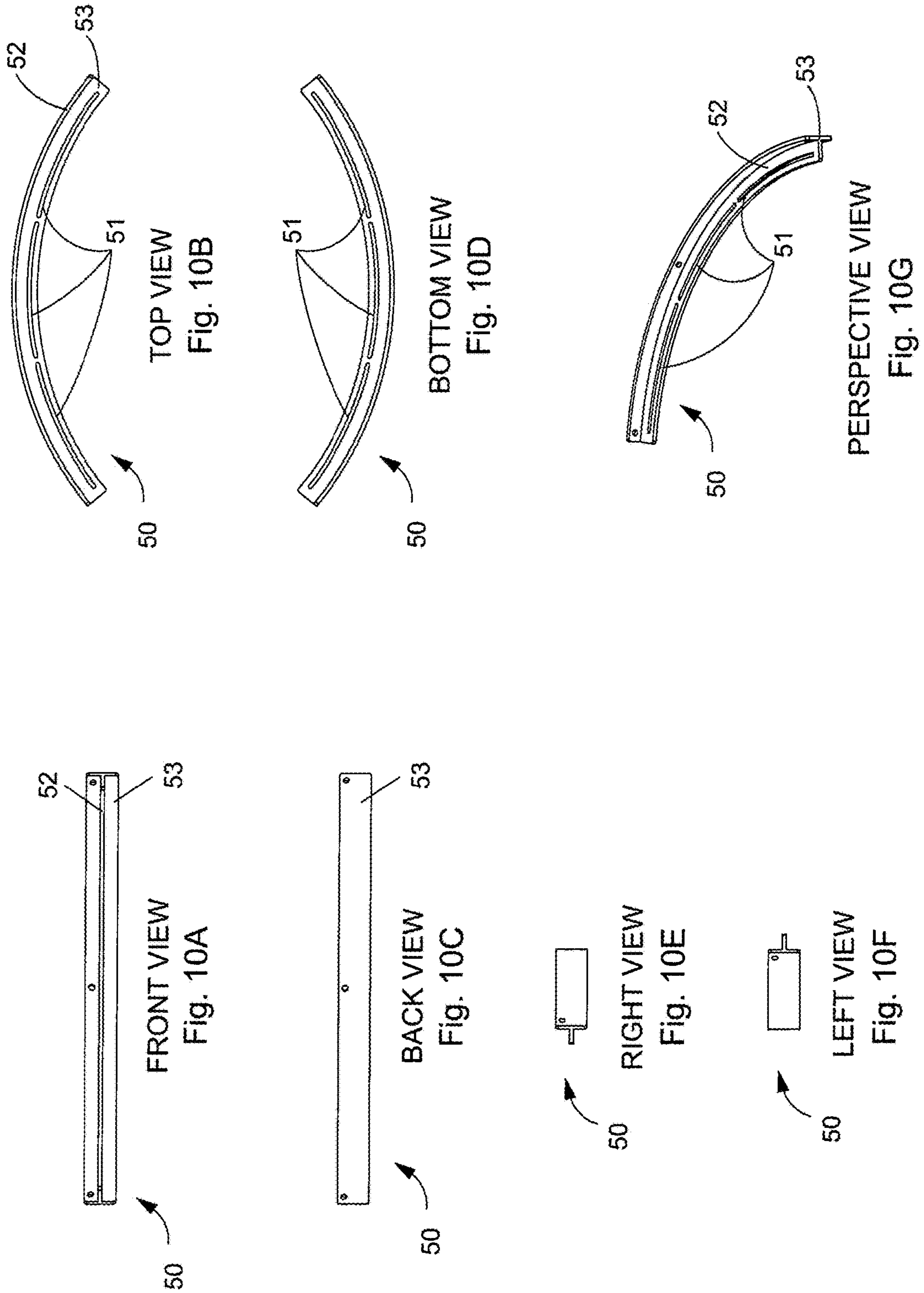

FIG. 9 is a perspective view of the housing of FIGS. 7 and 8A-C showing the multiple mounting surfaces for mountable module rails.

Figure 6:
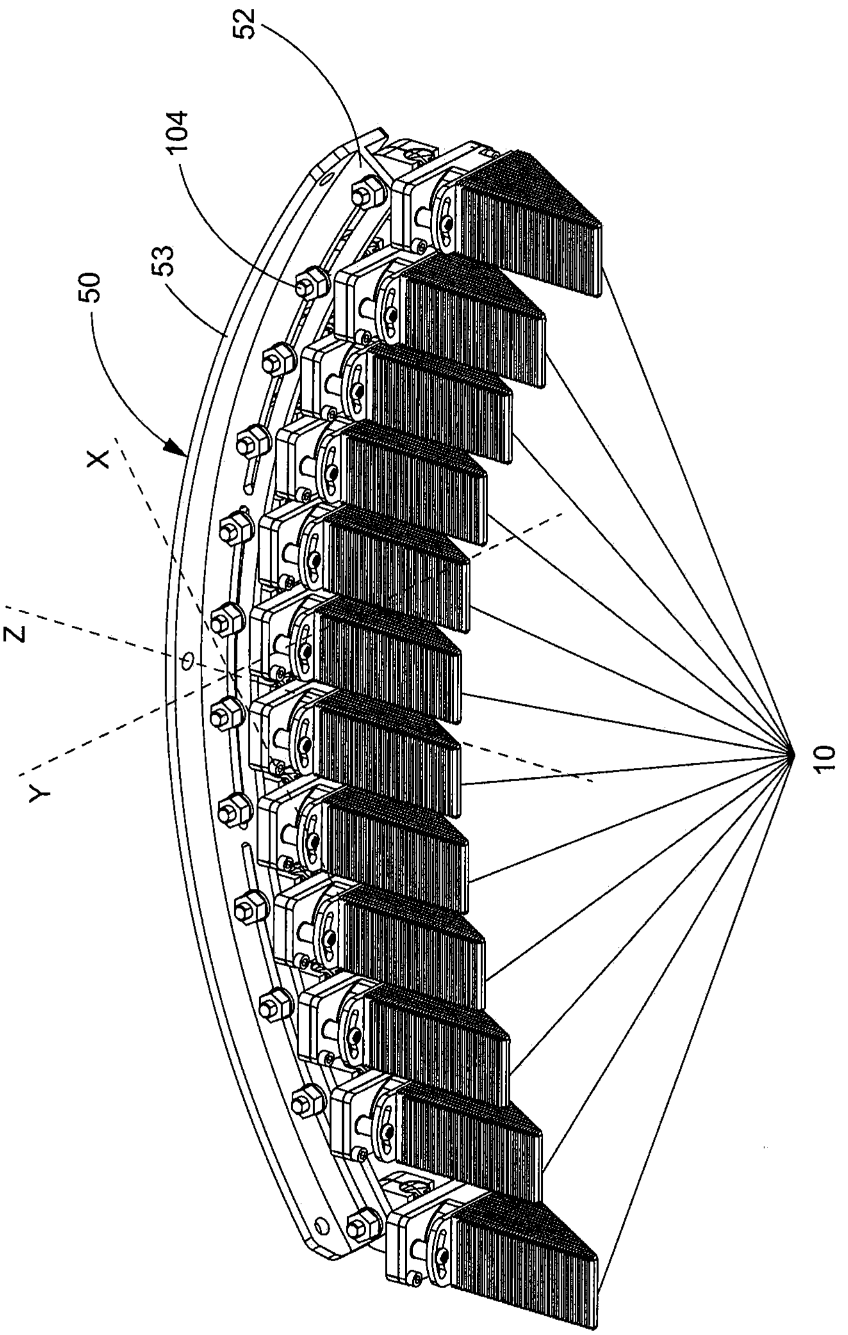
FIG. 6 is a perspective view of a module rail with a plurality of modules attached to it.

FIGS. 10A-G are isometric views and a perspective view (FIG. 10G) of the mounting rail of FIG. 6 that can be mounted in FIG. 9.

Figure 11:
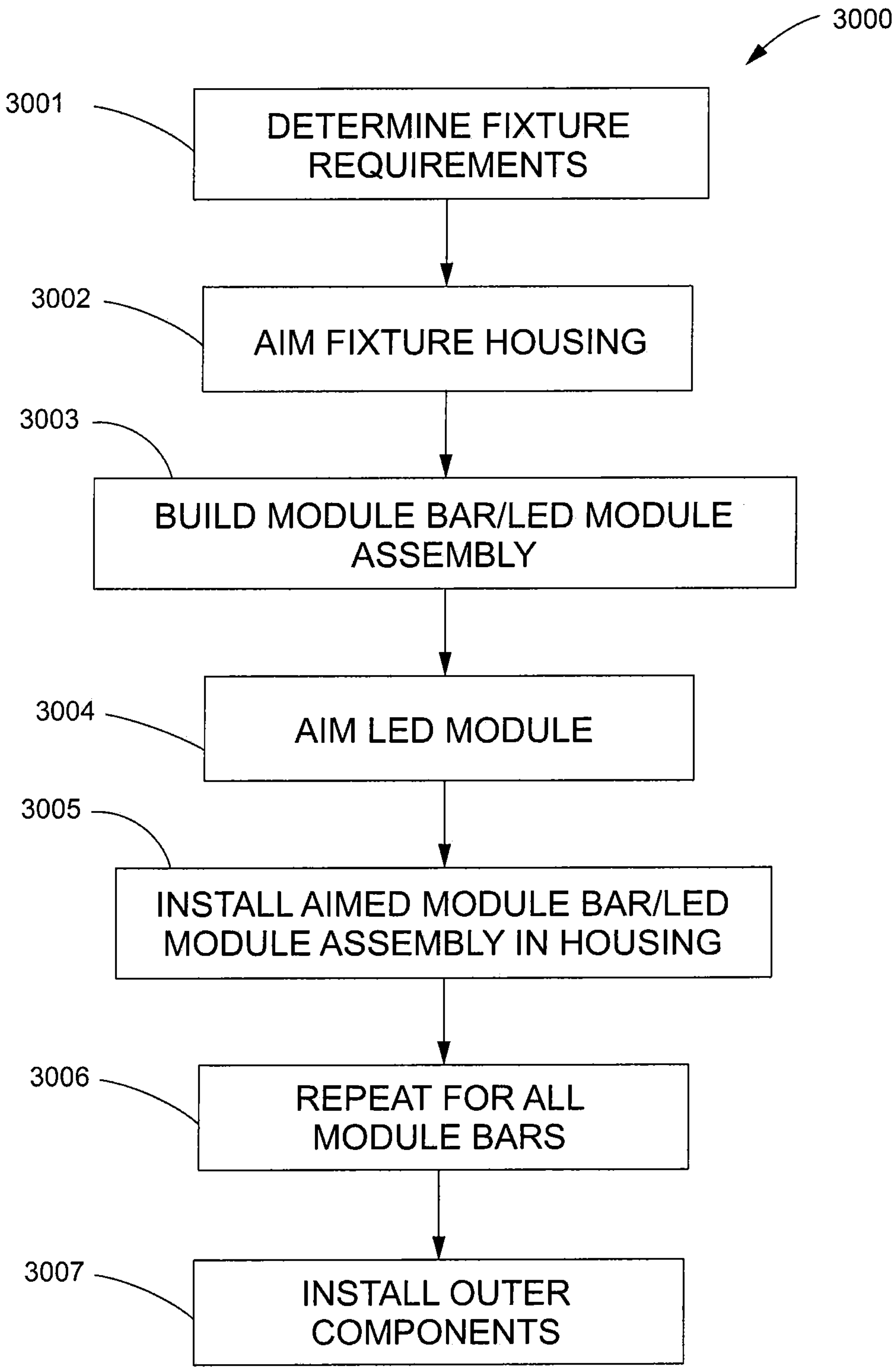

FIG. 11 is a flow chart of a general method of assembling fixtures including multiple lighting module rails like FIGS. 1-10A-G.

Figure 12:
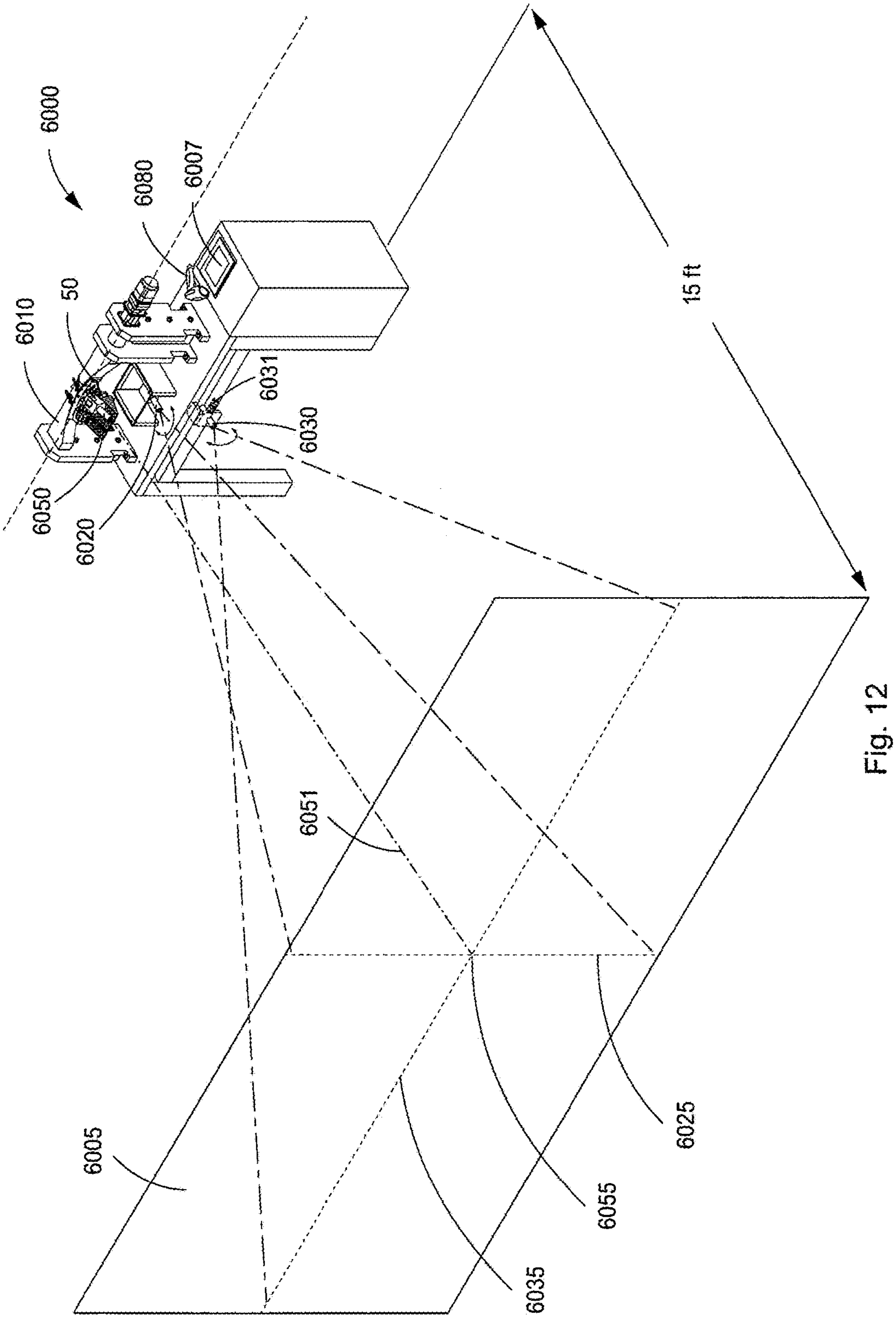

FIG. 12 is a perspective and diagrammatic view of a lighting module aiming system according to an exemplary embodiment of the present invention.

Figure 13:
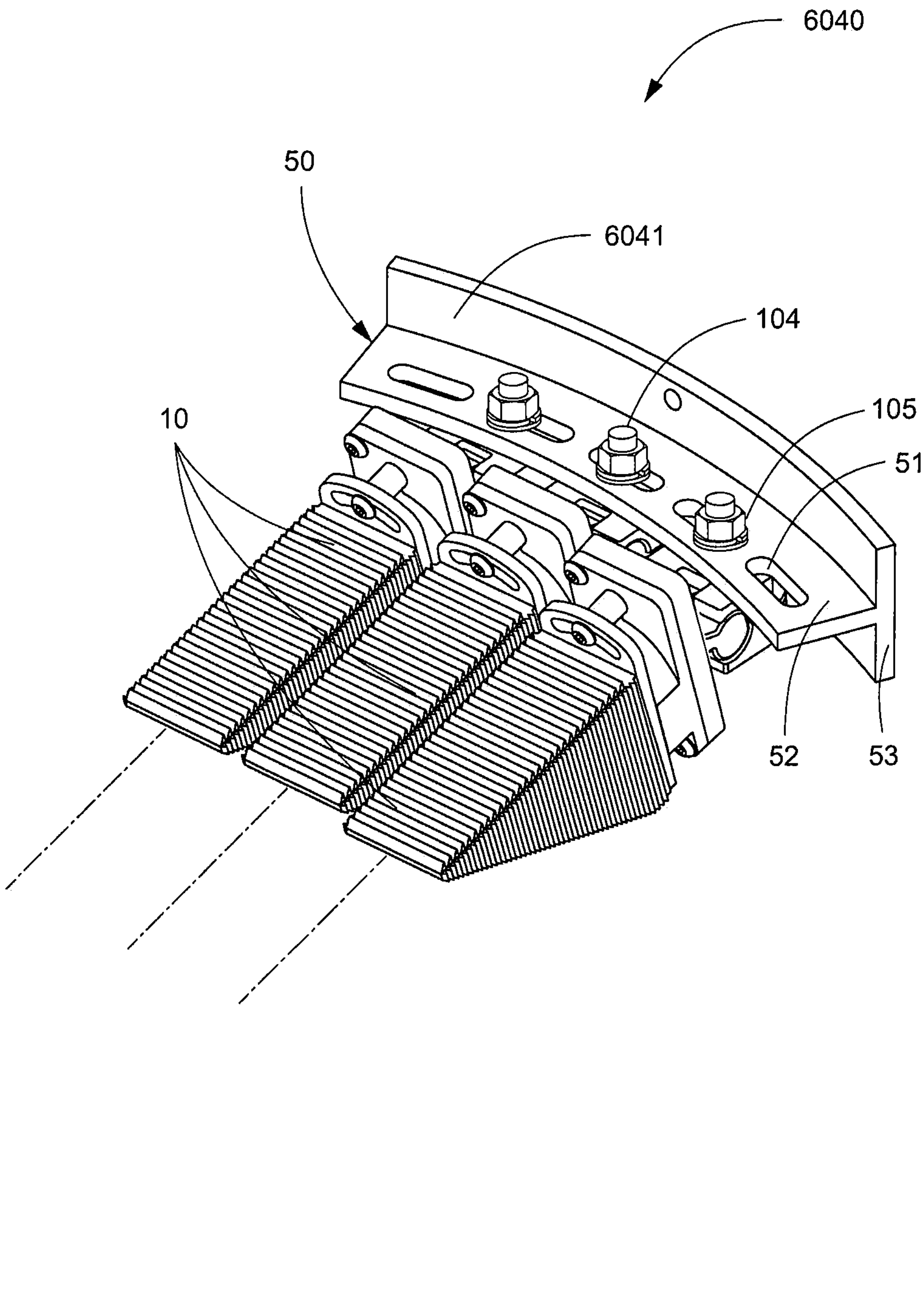

FIG. 13 is an enlarged perspective view of a small module rail and three lighting modules that can be pre-aimed with the system of FIG. 12 and installed in the housing of FIGS. 7-9.

Figure 14A:
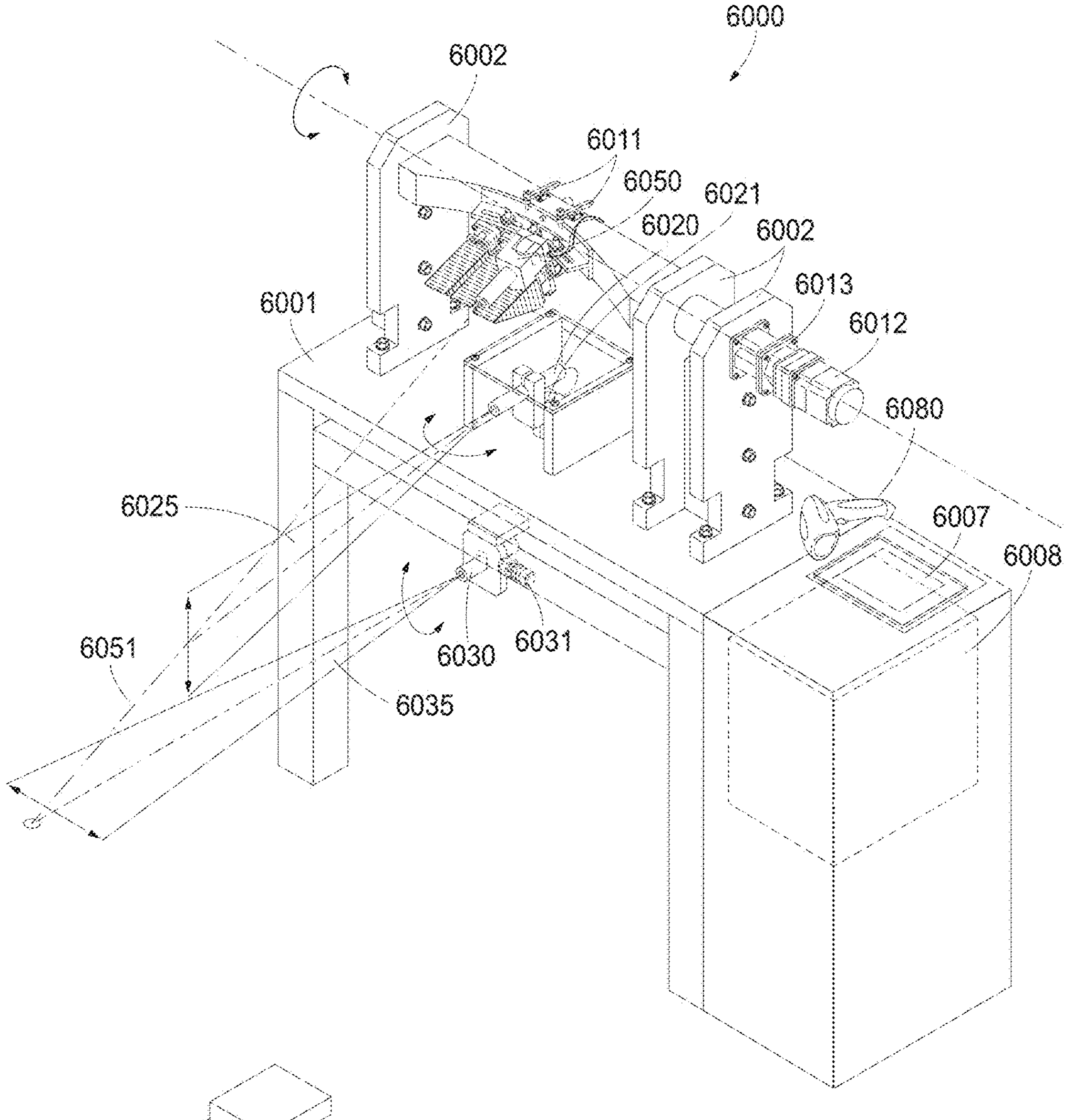
Figure 14B:
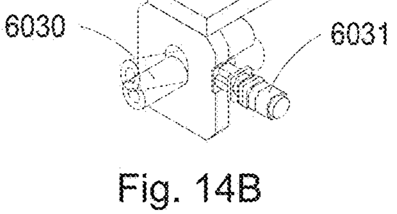

FIGS. 14A and B are an enlarged perspective and partial diagrammatic view of the lighting module aiming station of FIG. 12.

Figure 15:
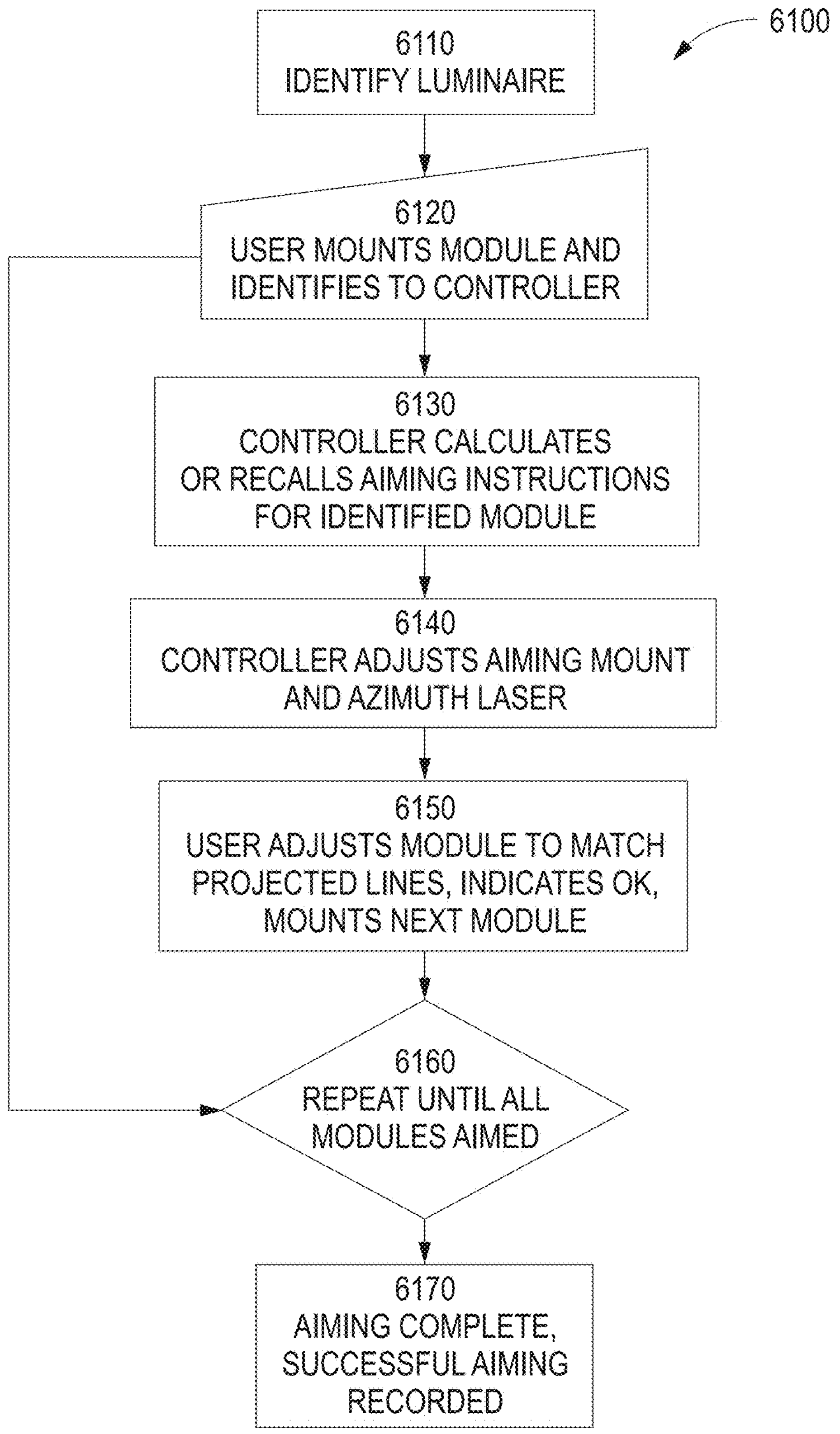

FIG. 15 is a flow chart of methodology for aiming lighting modules with the lighting module station of FIGS. 12 and 14A and B.

Figure 16A:
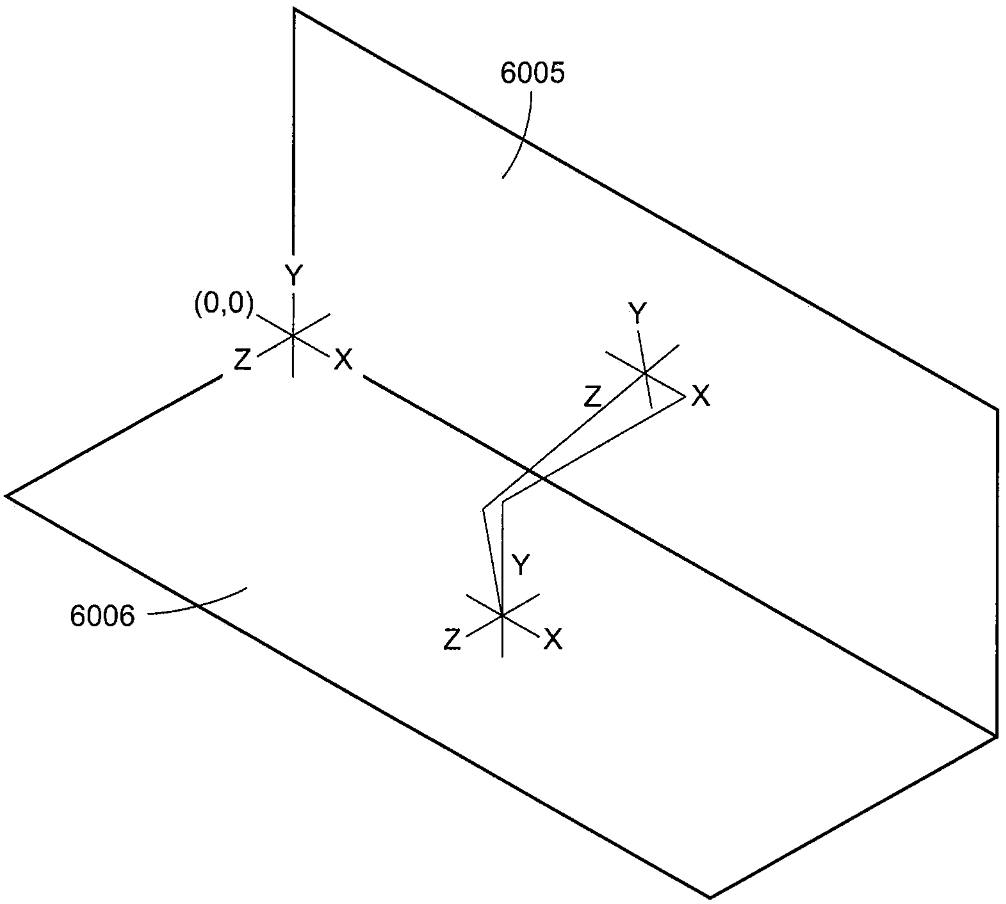
Figure 16B:
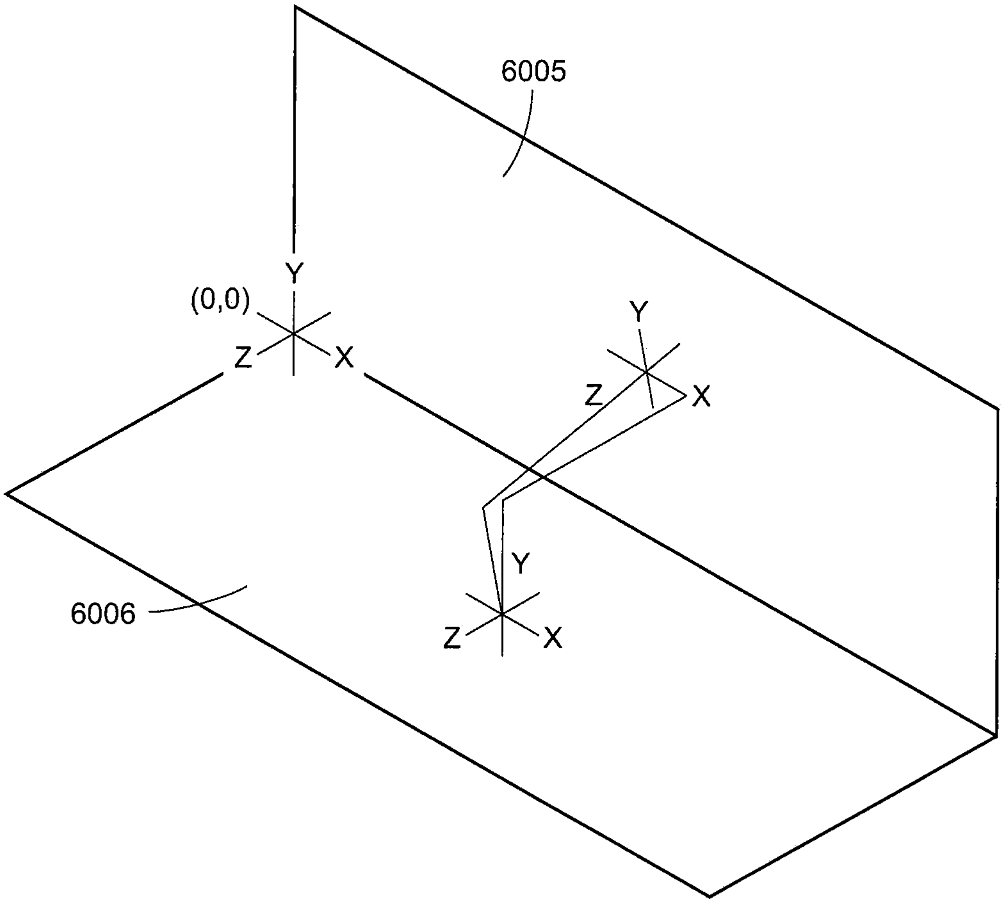

FIGS. 16A-Z are diagrammatic depictions of mathematical translation of position of components of the aiming system relative to physical space and to each other for purposes of practicing the system or method according to one exemplary embodiment of the present invention.

Figure 17A:
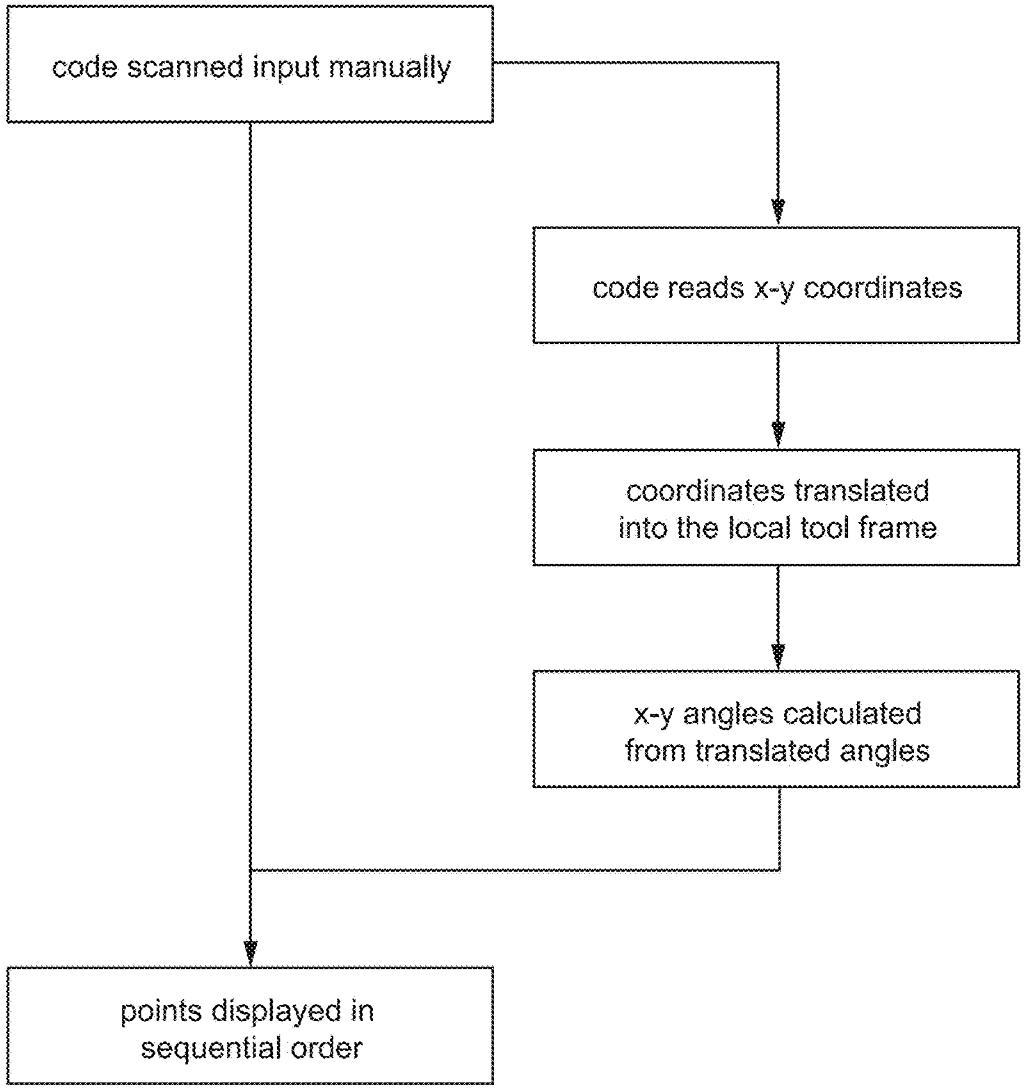

FIGS. 17A and B are flow charts describing methodology using the concept of FIGS. 16A-Z.

Figure 18A:
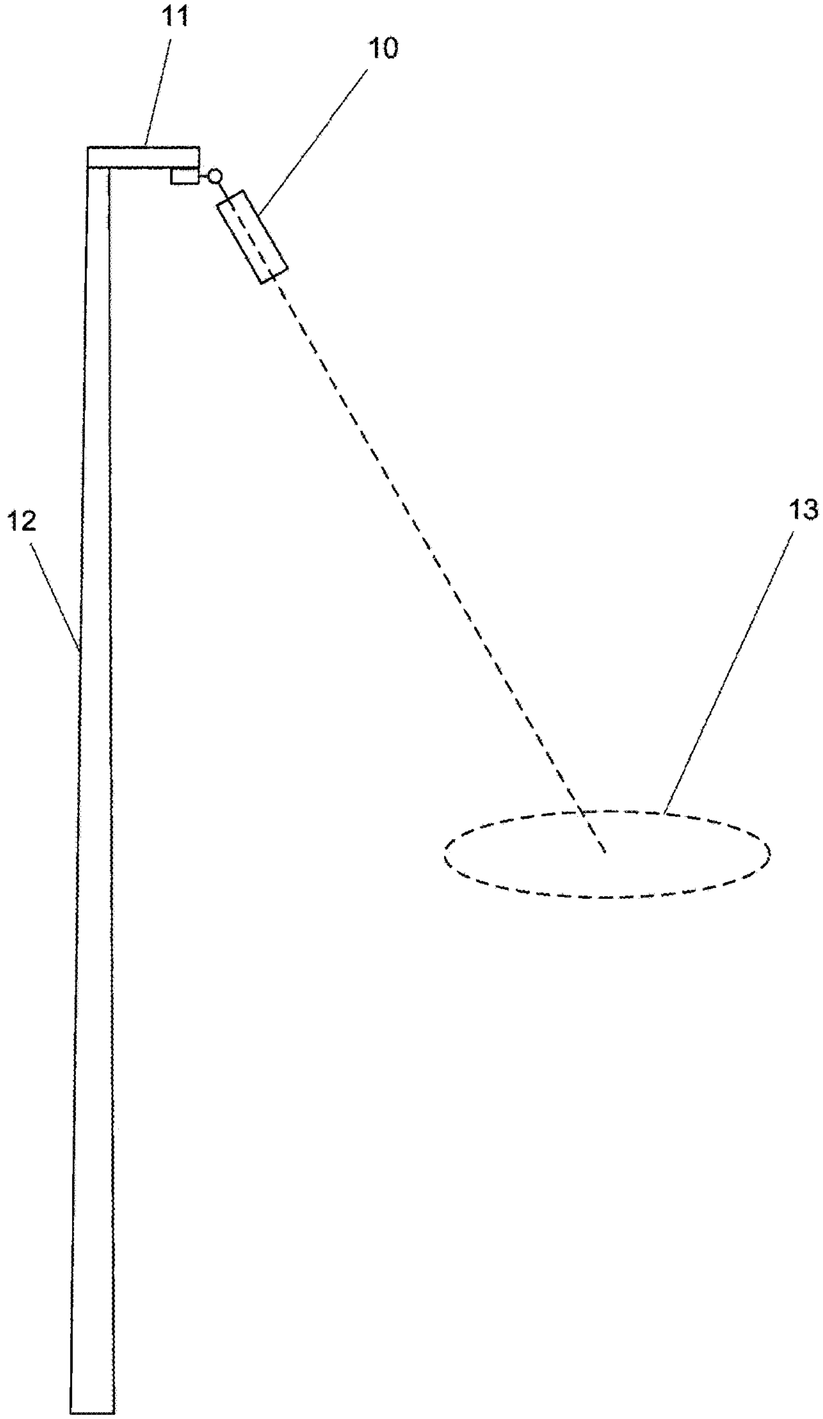
Figure 18B:
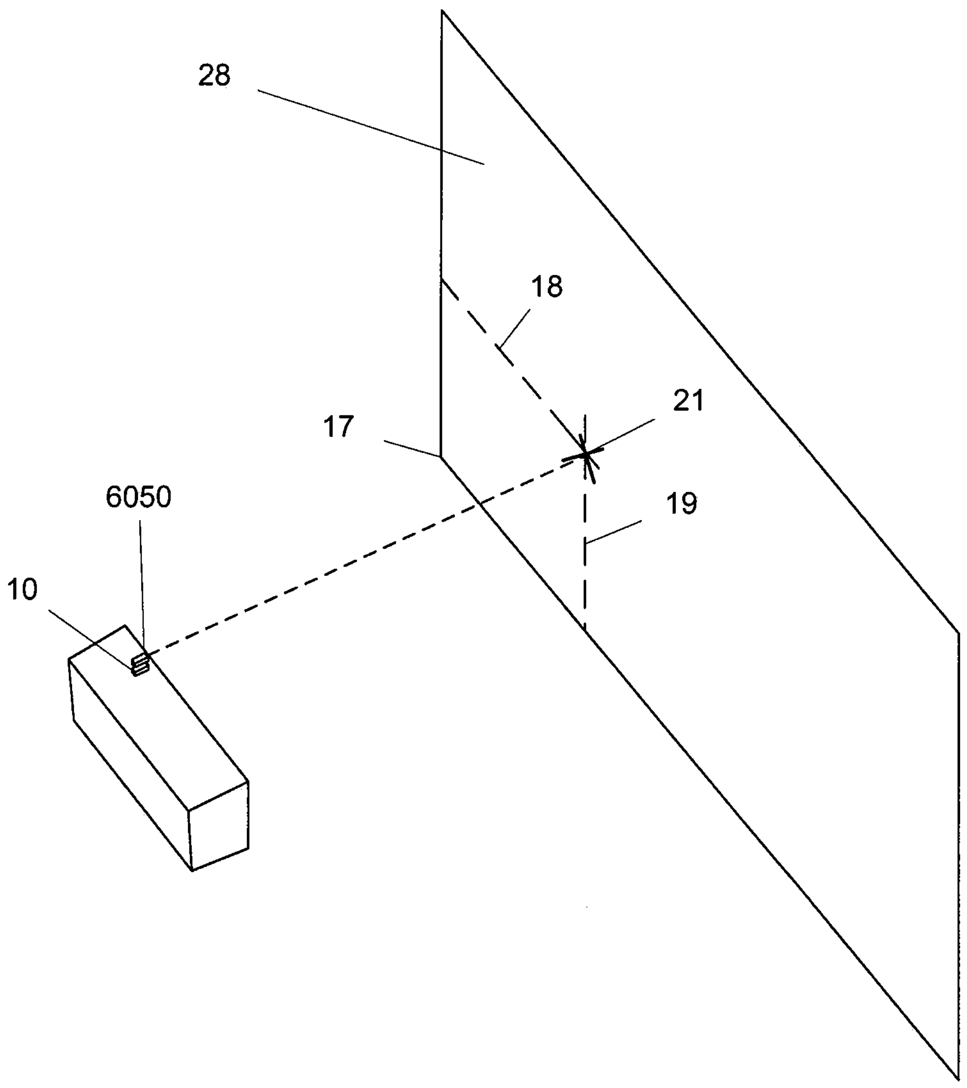
Figure 18C:
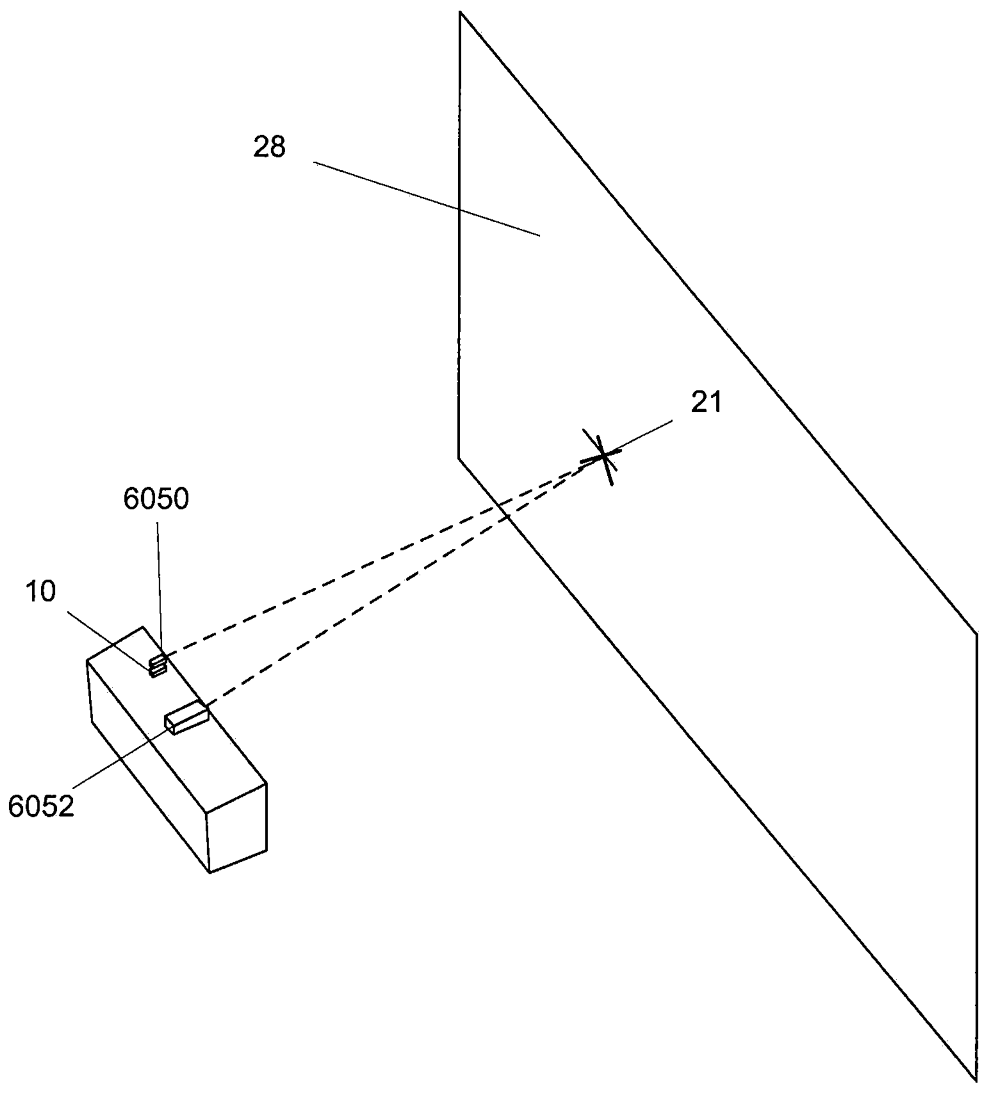
Figure 18D:
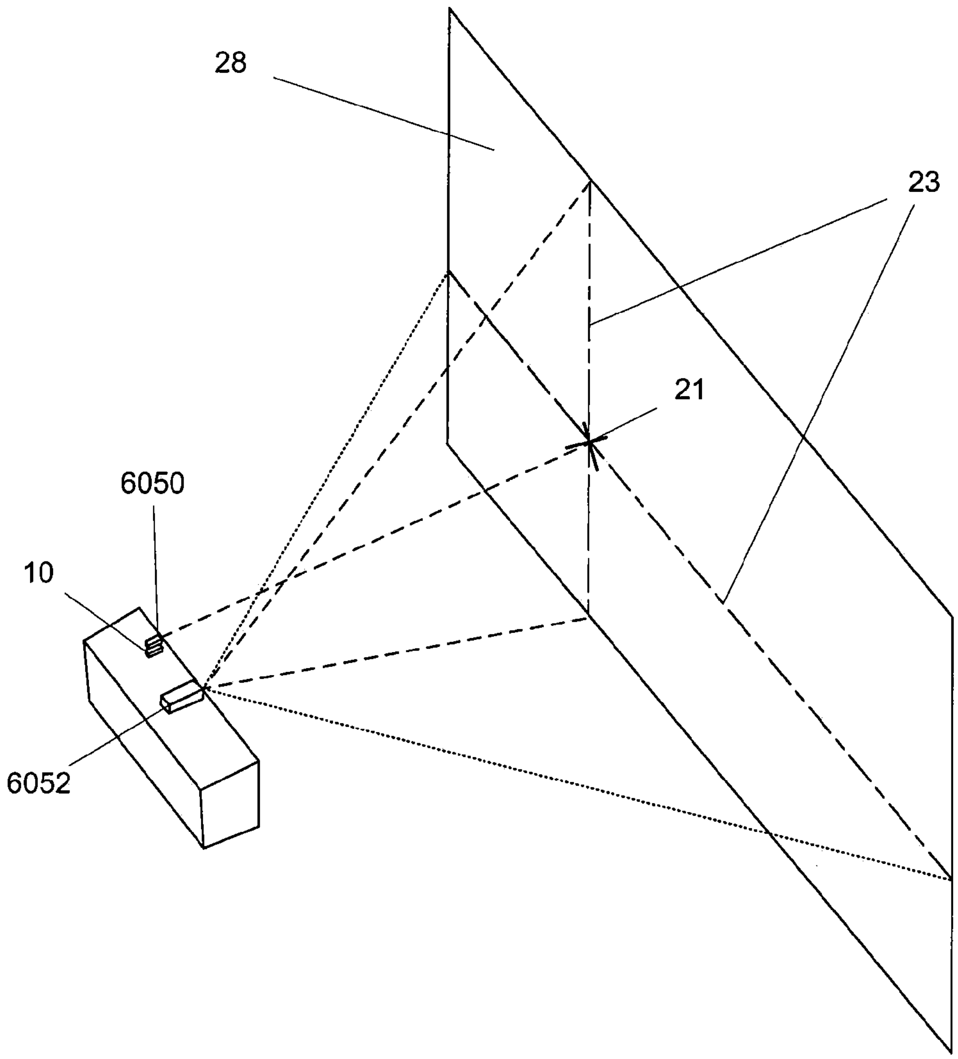
Figure 18E:
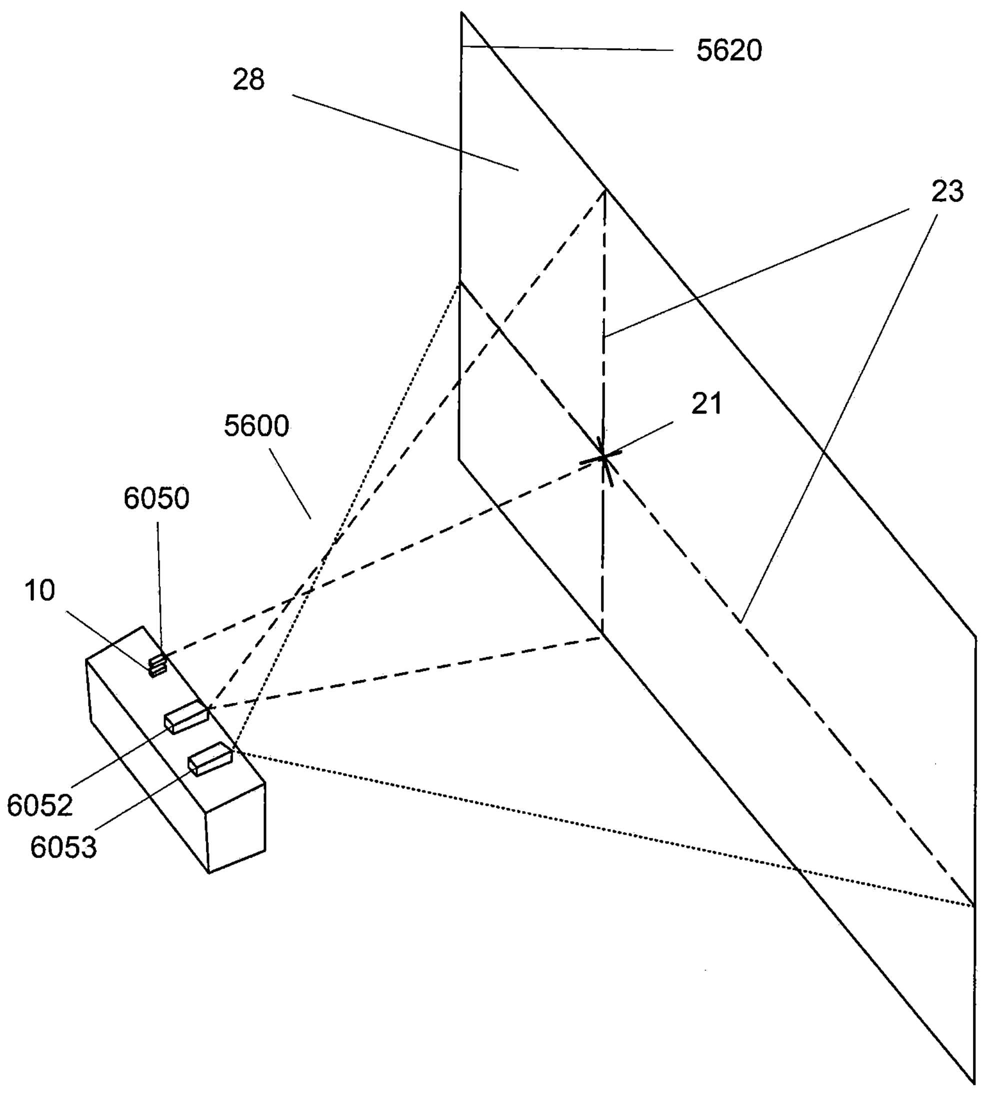
Figure 18F:
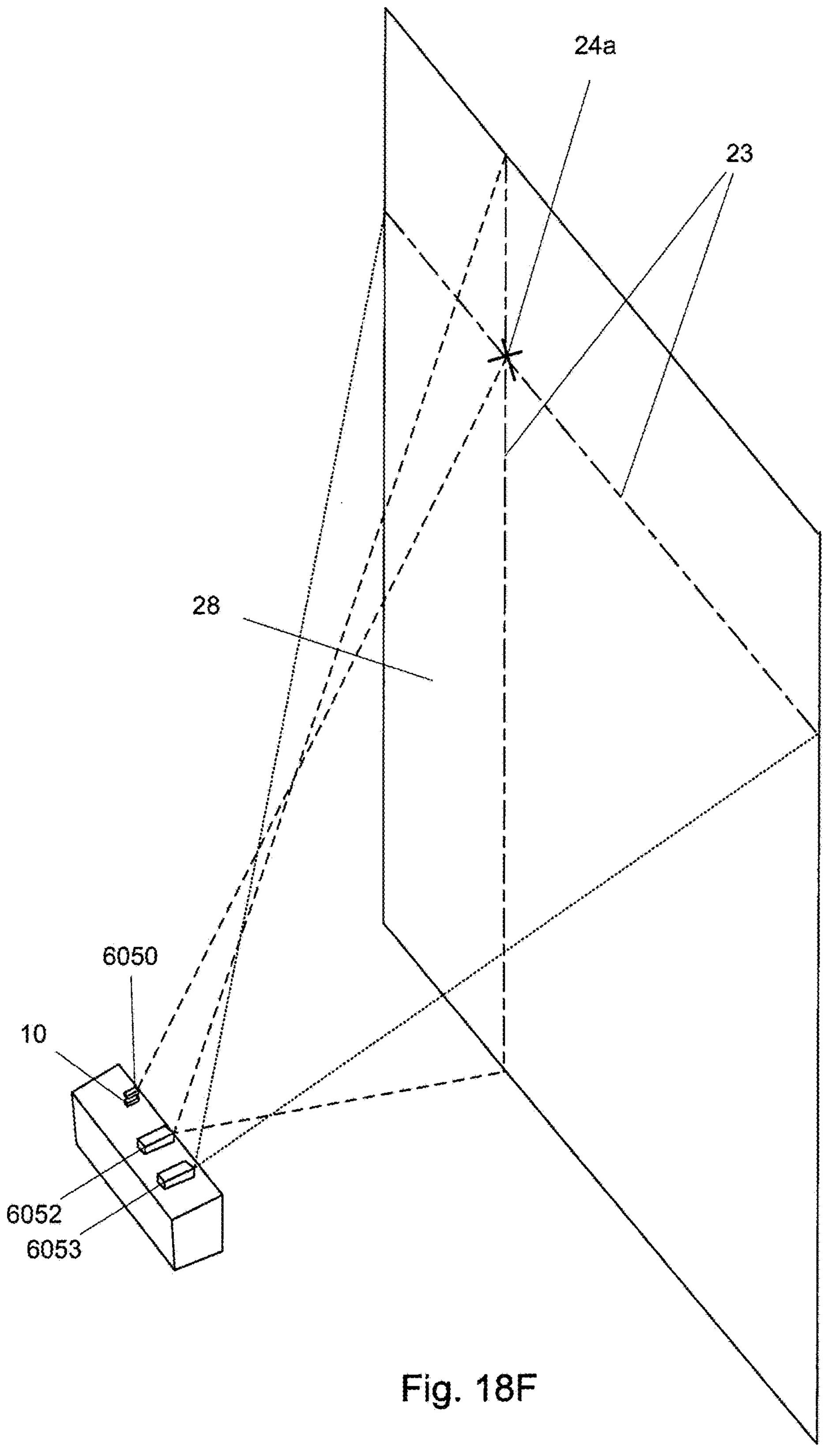
Figure 18G:
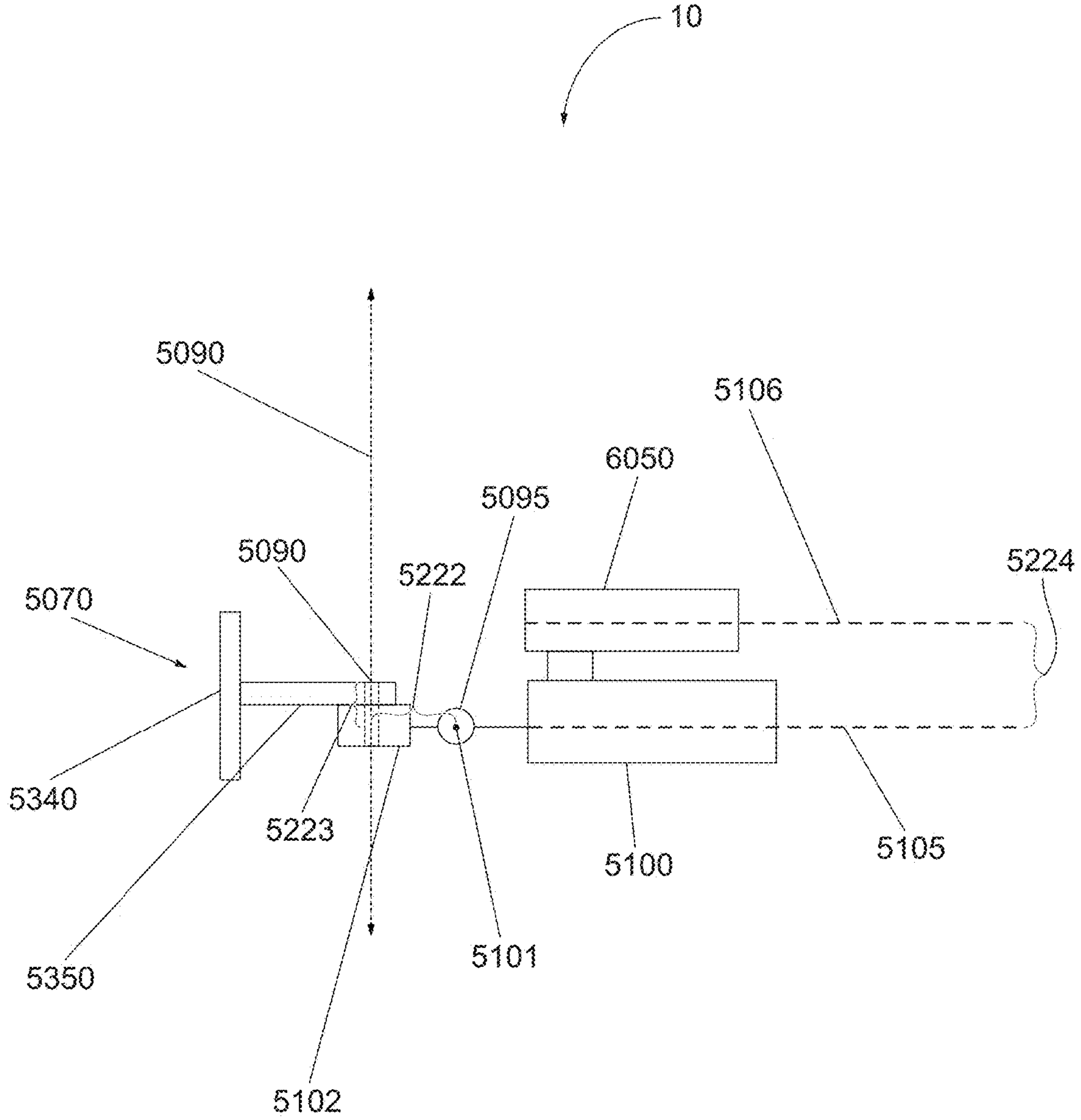
Figure 18H:
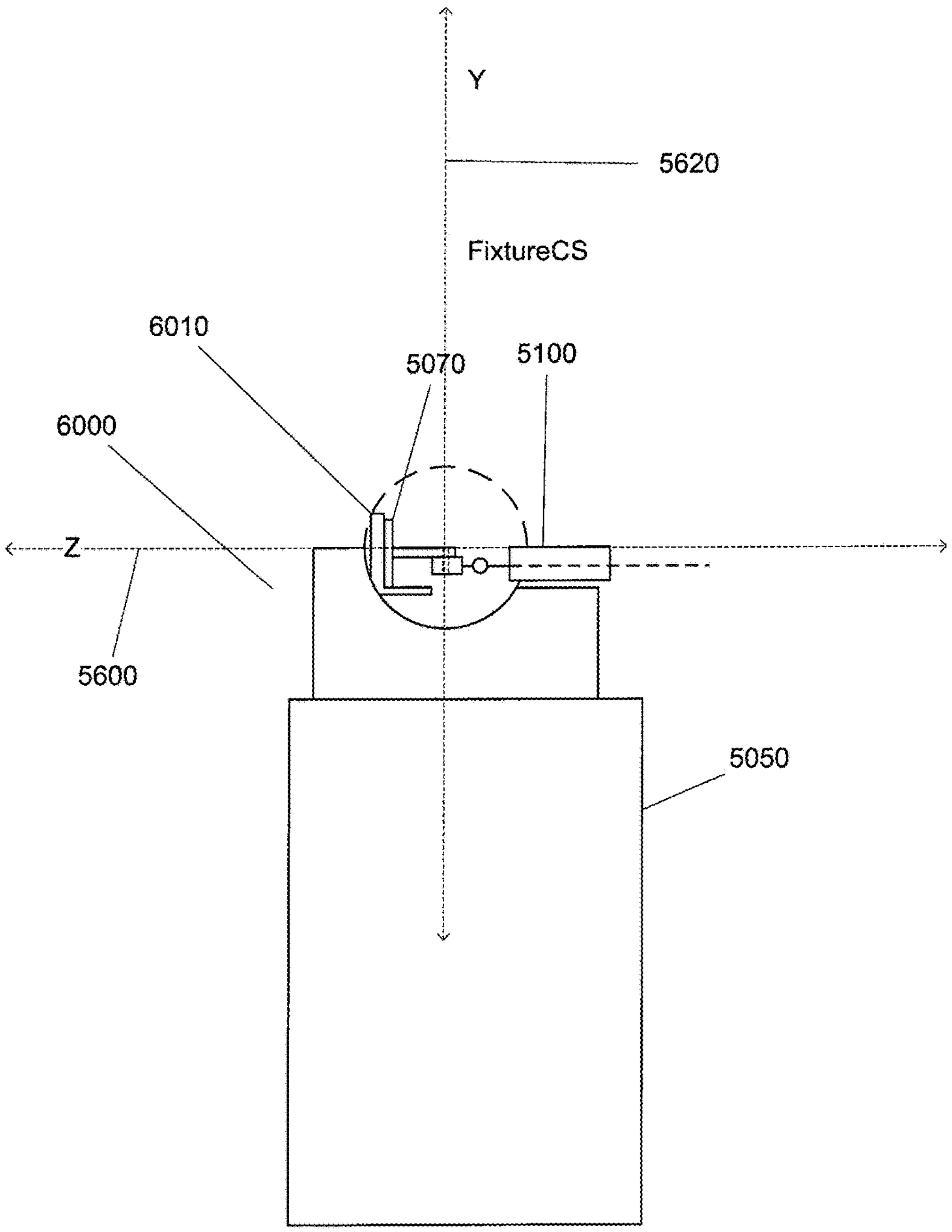
Figure 18I:
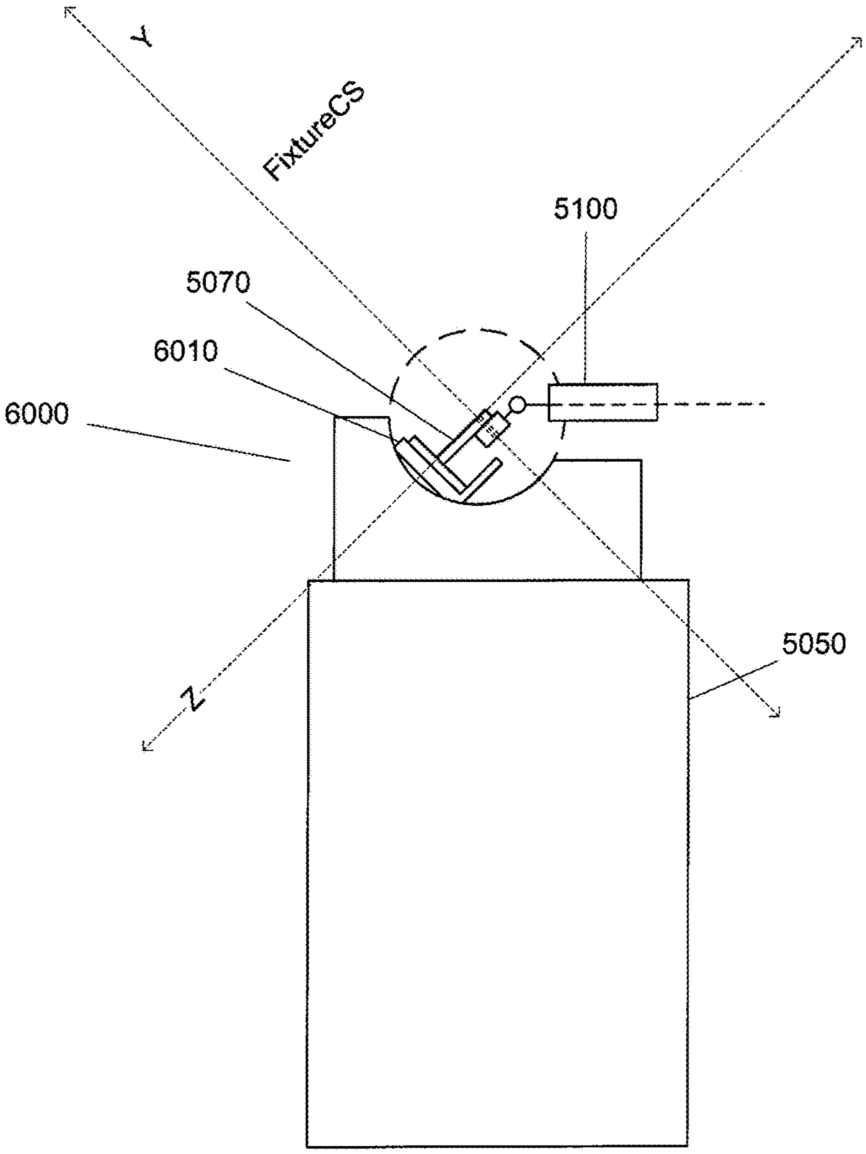
Figure 18J:
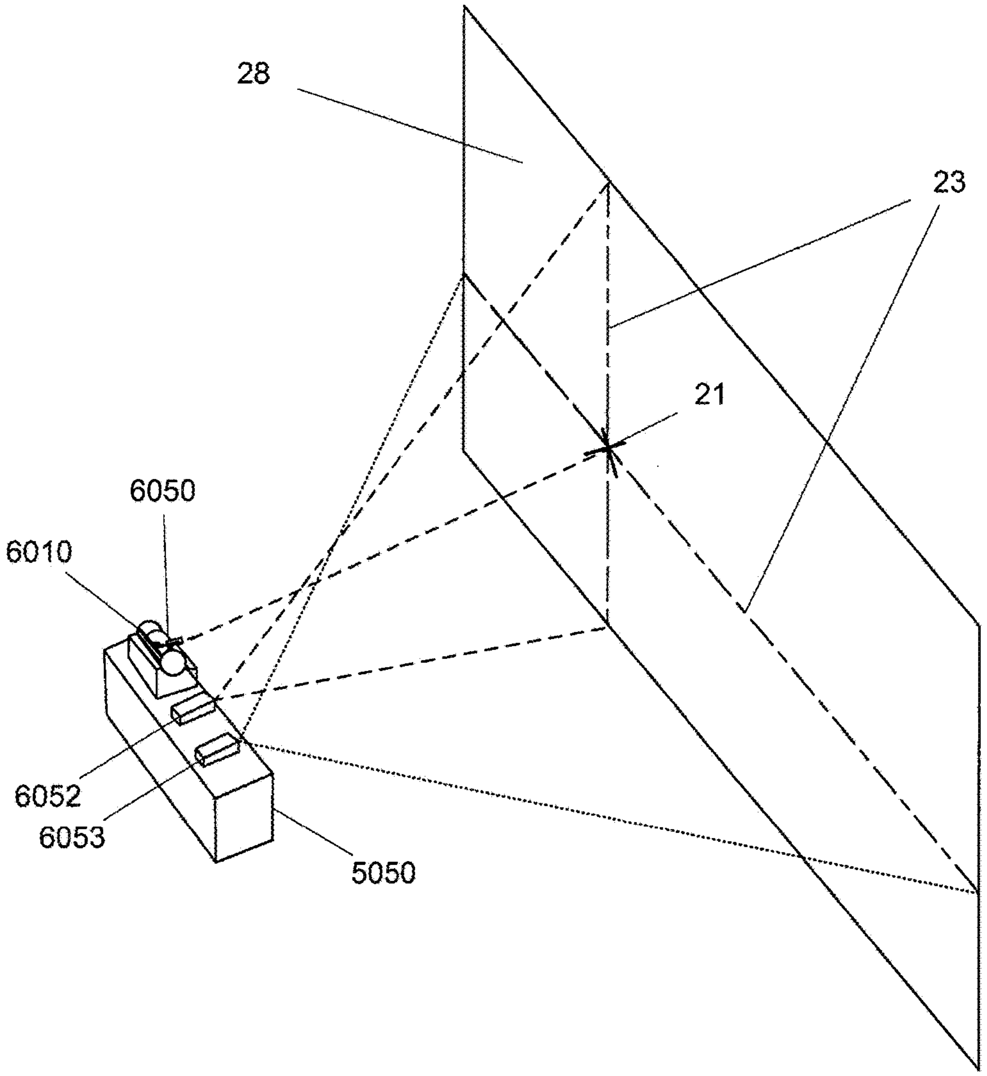
Figure 18K:
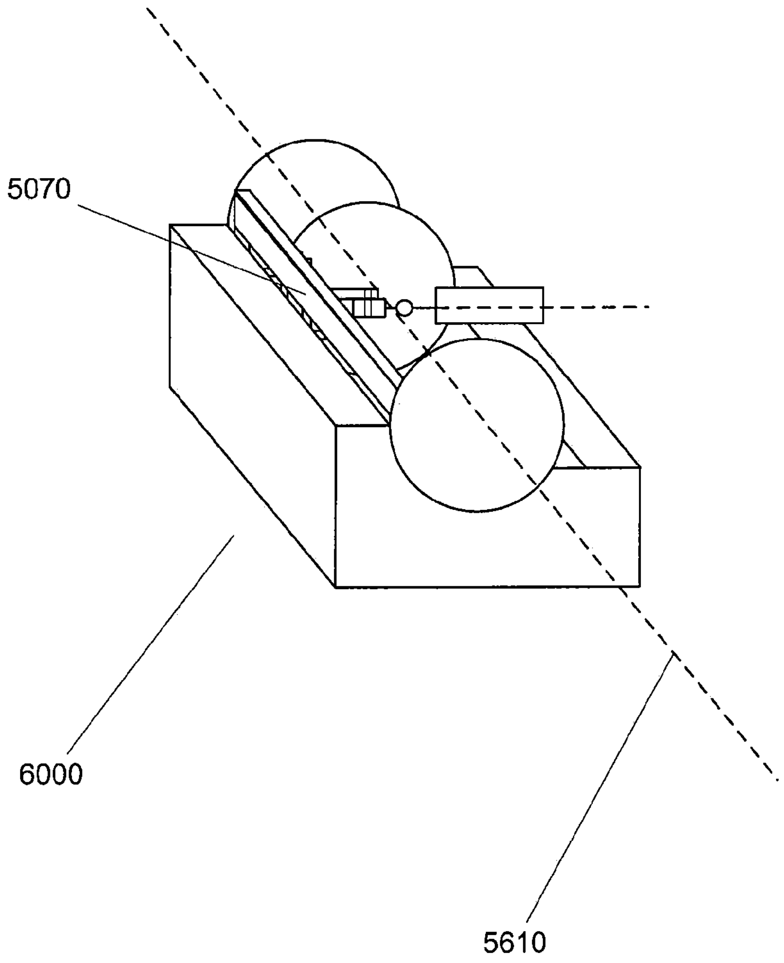
Figure 18L:
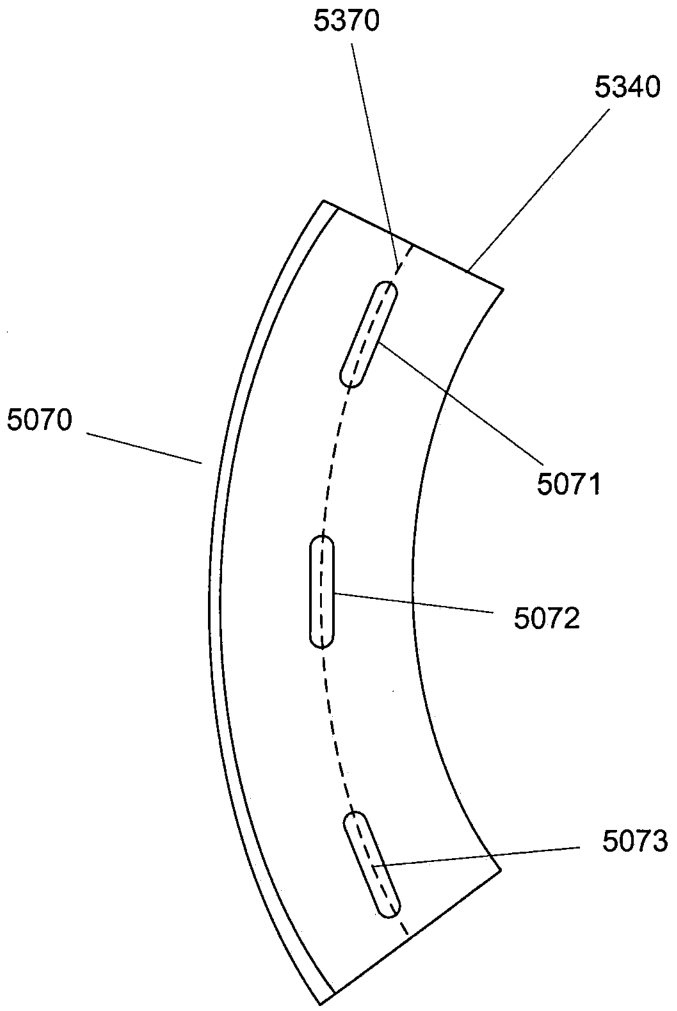
Figure 18M:
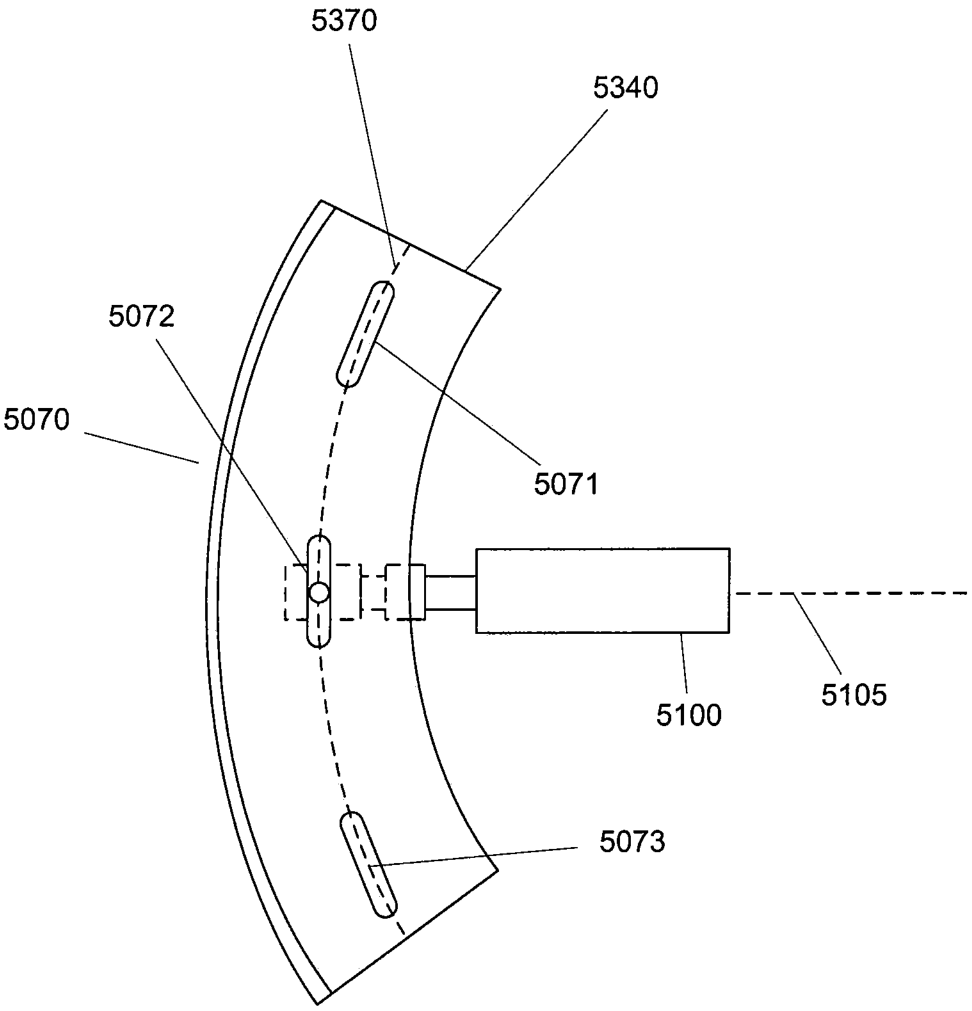
Figure 18N:
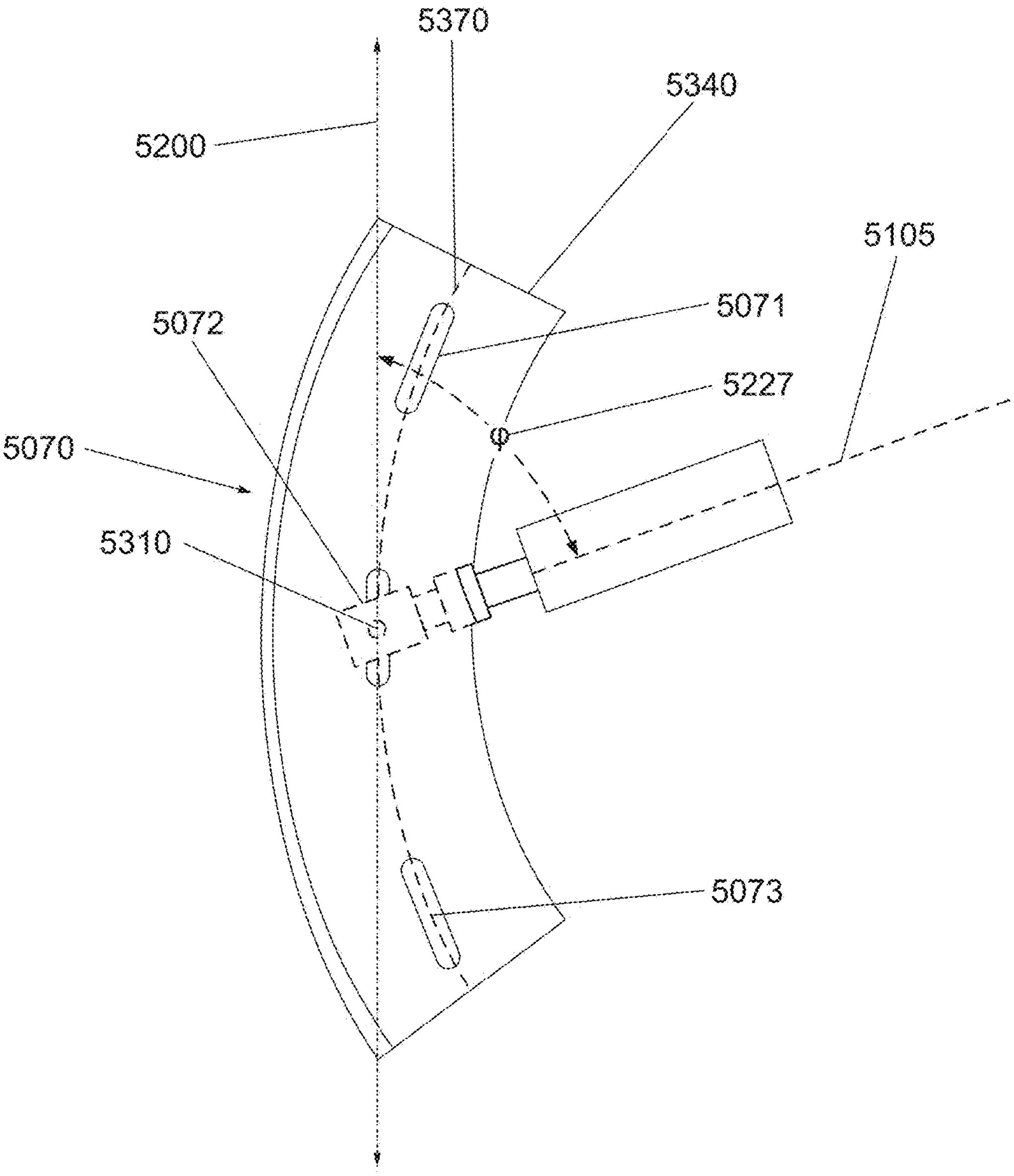
Figure 18O:
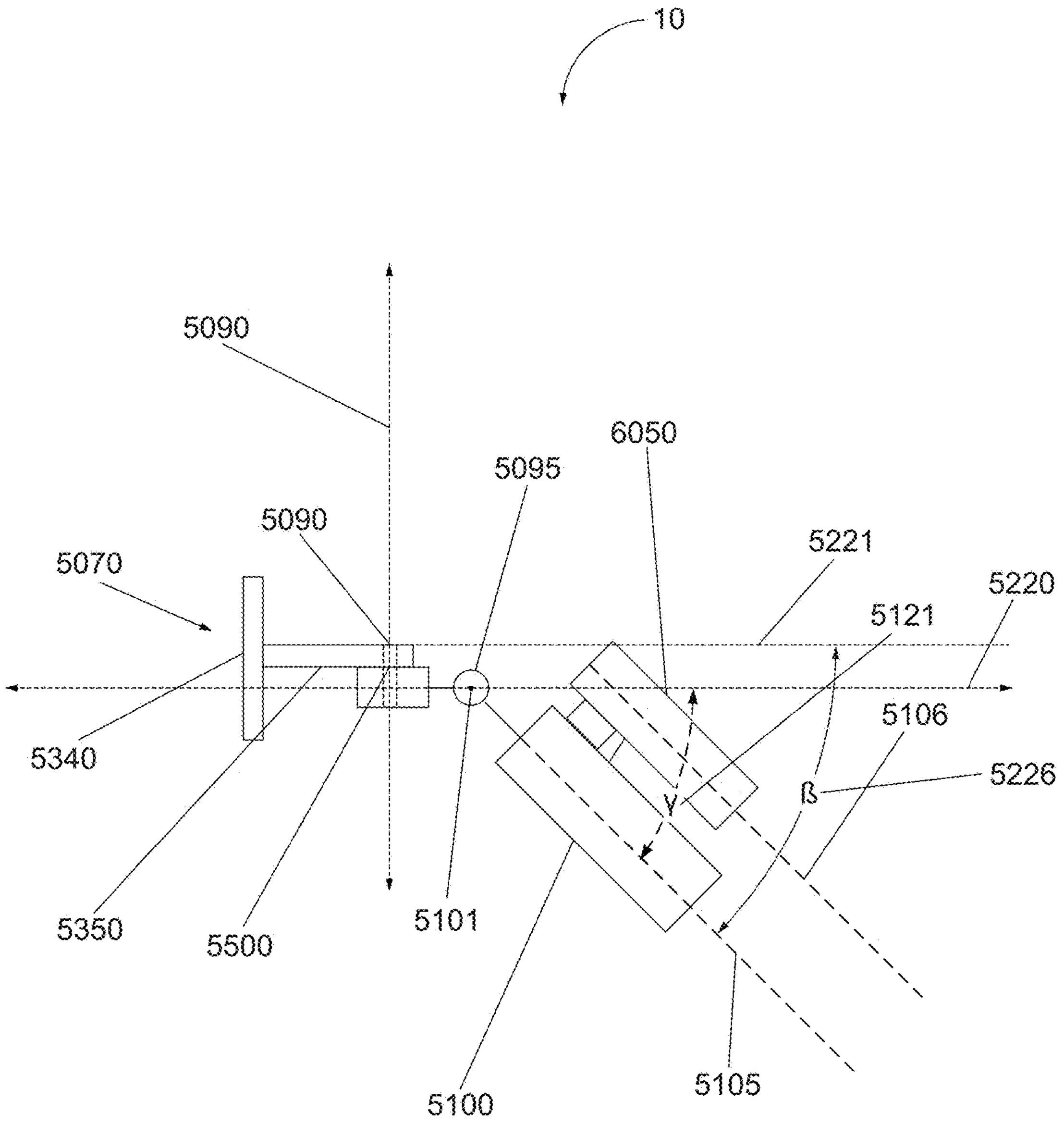
Figure 18P:
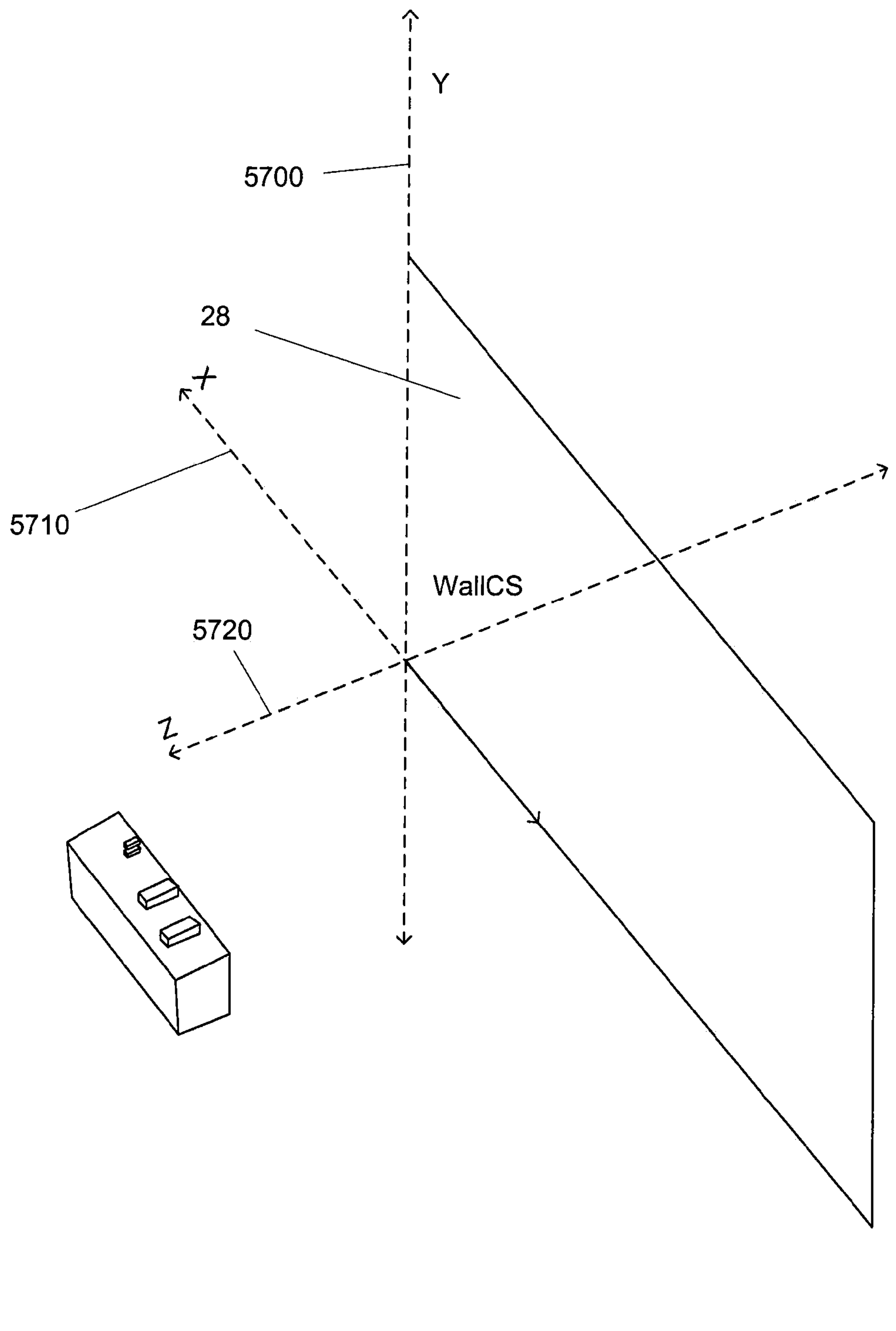

FIGS. 18A-P are diagrammatic views depicting an exemplary methodology.

DETAILED DESCRIPTION OF EXEMPLARY EMBODIMENTS

For a better understanding of the present invention, exemplary embodiments will now be described in detail. It is to be understood that these are not inclusive or exclusive of the ways the invention can be carried out but are for illustrative purposes. Variations obvious to those skilled in the art will be included within the scope of the invention.

Figure 1:
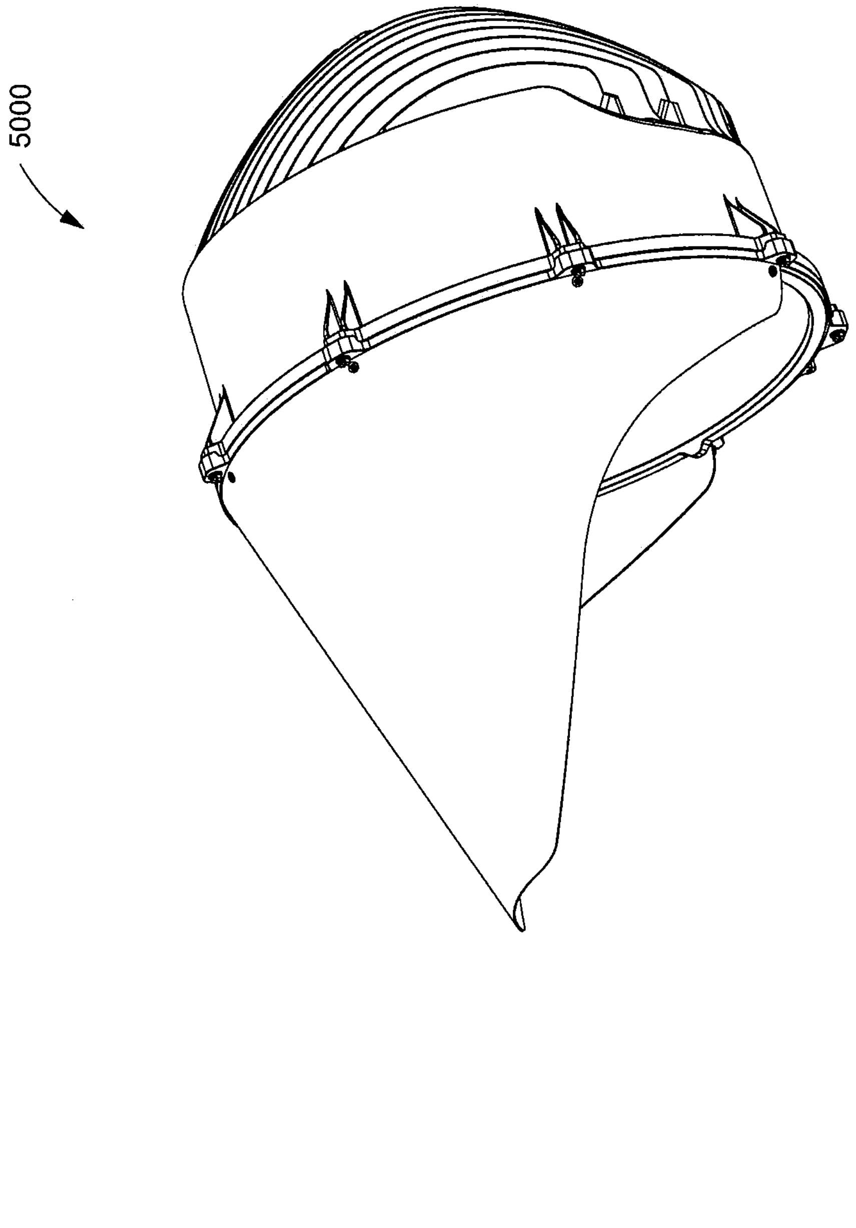
FIG. 1 is an isolated perspective view of one example of a lighting fixture to which pre-aimed lighting modules can be applied.
Figure 2:
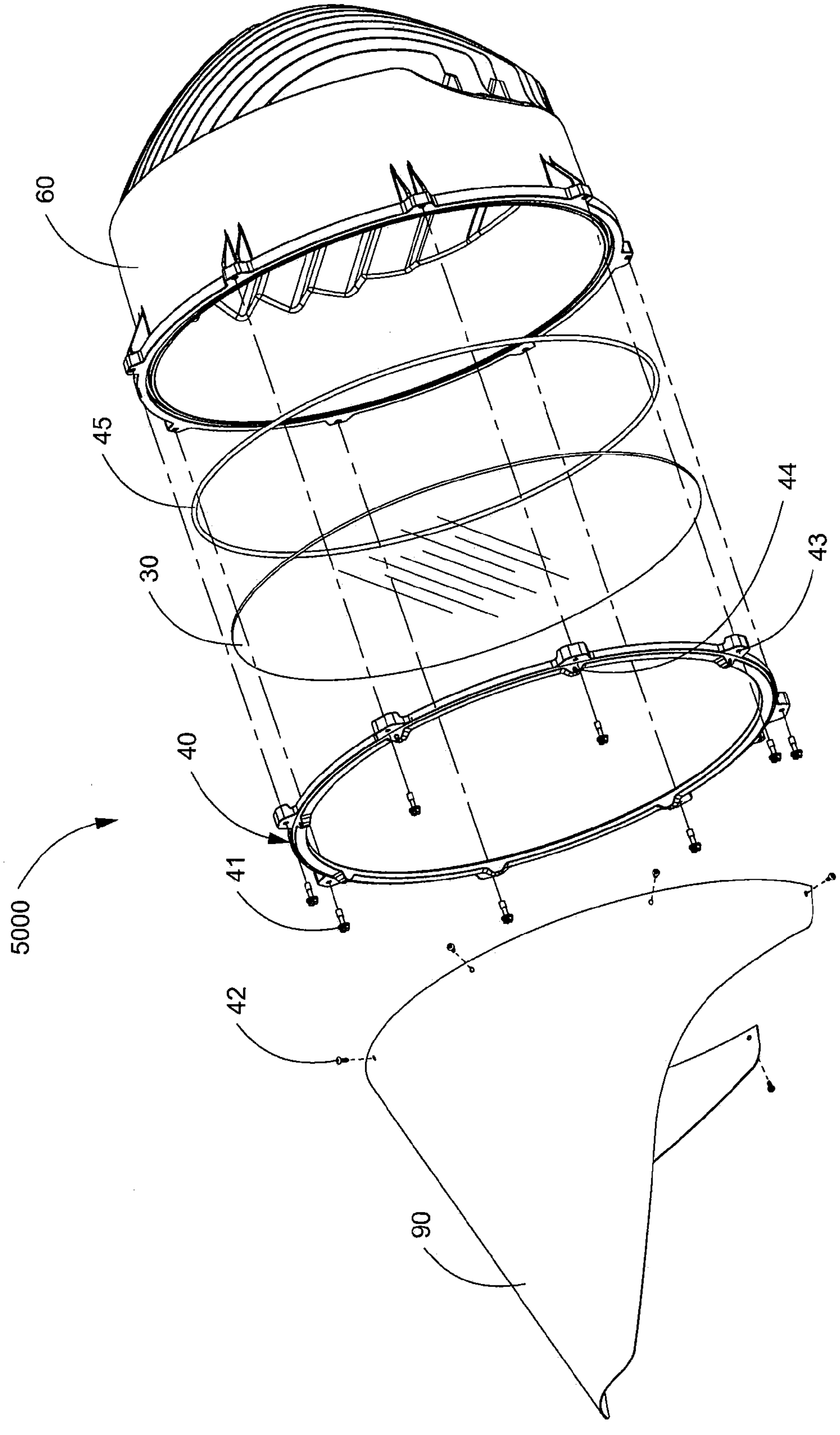
FIG. 2 is an exploded view of parts of the lighting fixture of FIG. 1 without the pre-aimed lighting modules.

The exemplary embodiments will be discussed in the context of a lighting fixture 5000 such as shown at FIGS. 1-2, with a bowl shaped fixture housing 60 with plural curved mounting surfaces 63. Each mounting surface 63 is adapted to each receive a lighting module rail or bar 50, FIG. 6 containing one or more lighting modules 10. Finishing components such as shown in FIGS. 1 and 2 by example only, such as lens 30, sealing gasket 45, lens ring 40, and an optional visor 90 can be added on any module 10. Further details of the fixture can be seen in the incorporated by reference documents cited herein. It is to be understood, however, that the housing and structure of FIGS. 1 and 2 can be different, changed, or modified. Also, the lighting module of FIGS. 3-7 is but one example of a lighting module that can be utilized.

It is important for the context of the exemplary embodiments to understand the following.

First, housing 60 (see FIGS. 7-9) has a plurality of mounting surfaces 63 that are curved and essentially are one above the other when the fixture 5000 is in a typical operating orientation (FIG. 7) typically 15-45° down from horizontal. As can be appreciated from FIG. 7, when a set of lighting modules 10, mounted on a module bar or rail 50, are installed in each of those mounting surfaces 63, there are multiple essentially rows of LED lighting modules at different vertical levels from bottom to top in the fixture. As can further be appreciated, each of those lighting modules ends up in its own unique position in three-dimensional physical space. As can be appreciated from FIG. 6, the curved mounting rail 50 means modules at the opposite ends are more forward than other modules. And then modules on different rails are at different vertical heights.

Figure 3:
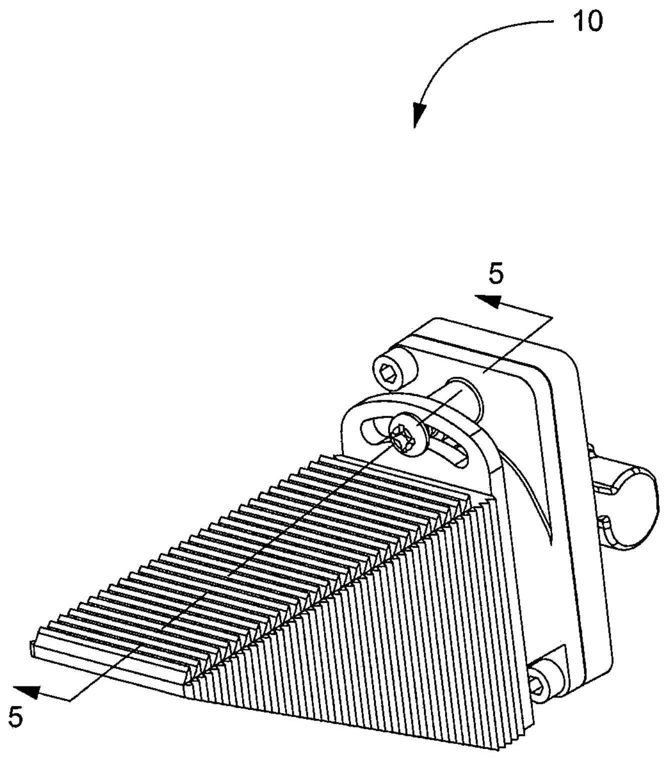
FIG. 3 is an enlarged-in-scale perspective view of a solid state lighting module that can be pre-aimed and then installed in the fixture of FIGS. 1 and 2 according to an exemplary embodiment of the present invention.
Figure 4:
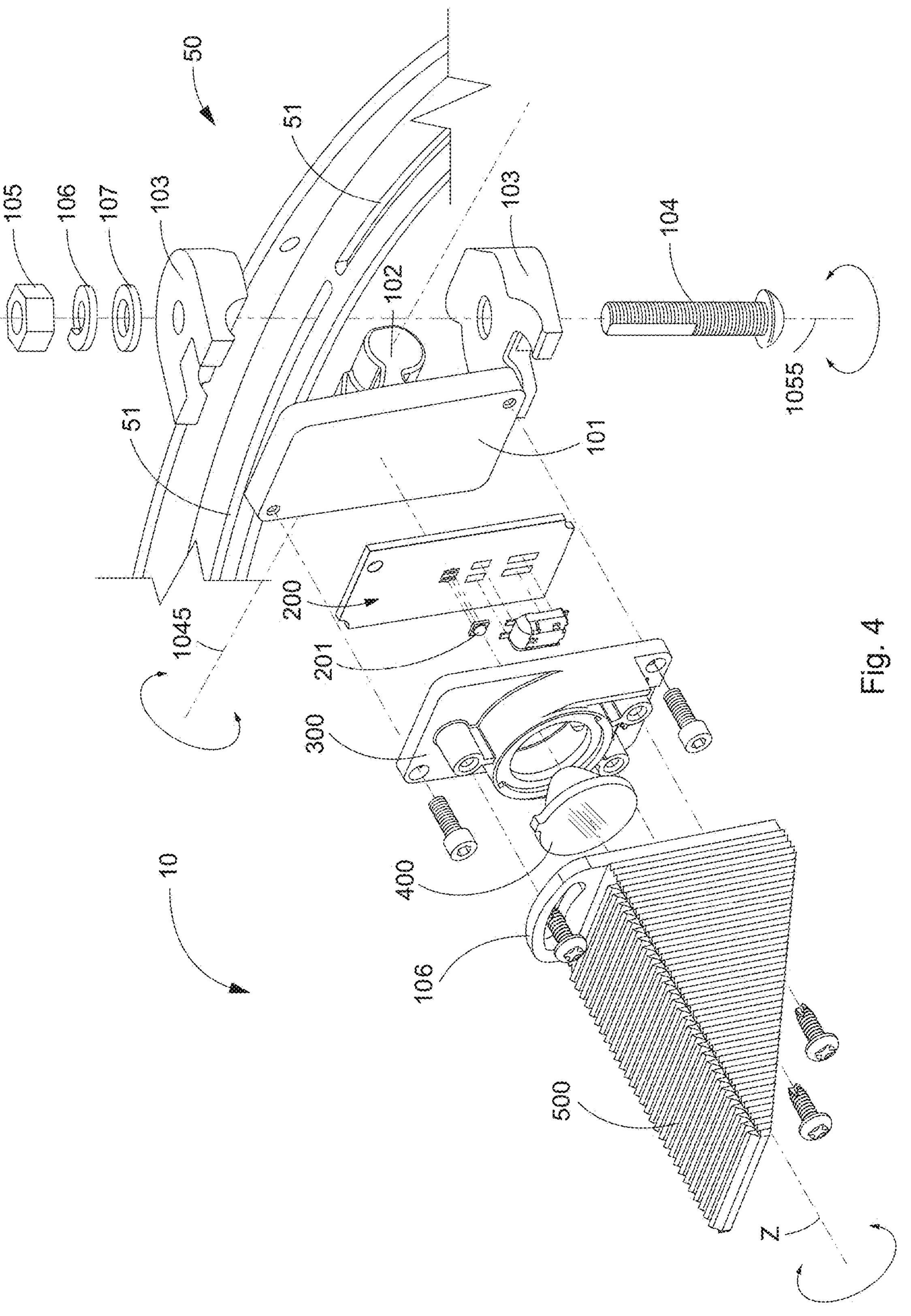
FIG. 4 is an exploded view of the lighting module of FIG. 3 and a partial view of its method of attachment to a supporting rail or module bar that can be mounted into the fixture of FIGS. 1 and 2 according to one aspect of the present invention.

Finally, as indicated in FIG. 4 and elsewhere, each module 10 has what will be called an elevation pivot joint 101, allowing it to be adjusted relative a vertical plan, and an azimuth pivot joint 103, allowing it to be adjusted relative a horizontal plan. Essentially each module 10 can be tilted and panned over a range, each of which is informed by the structure of the module and its surrounding structure when installed (e.g. room between adjacent modules, closeness of the sides of fixture housing 60, etc.). There is also a further adjustment capacity of module 10. As indicated in FIGS. 3 and 4, visor 500, the interior of which include a reflective surface, can be rotated over a range relative to the optical axis of lens 400 and LED 201 (Z-axis in FIG. 4) to control somewhat the light output pattern relative to that additional axis. As can further be appreciated, selection of lens or optic 400 and LED 201 can also affect the light output pattern.

However, principally for purposes of these embodiments, the focus will be on the two degrees freedom of adjustability (pan/tilt or elevation/azimuth type adjustability) of each lighting module 10 relative to its mounting structure, namely the module bar or rail 50. As explained in the incorporated by reference relevant documents, this independent adjustability of each LED light source allows a high degree of customizability and flexibility of the composite light output distribution pattern from fixture 5000. Essentially, a large number of smaller individual light beams can be adjusted as desired to create a composite output from the fixture 5000 as a whole.

General System and Method

At a general level, an exemplary embodiment according to the present invention relates to a systemized way to aim module 10 in a desired pan/tilt or elevation/azimuth orientation. An empty module bar or rail 50 can be mounted to aiming station 6000 on aiming jig 6010 (see FIG. 12, also referred to as "bar", "jig", or "module aiming mount"). A laser 6050 can be removably clamped to module 10 by quick release clamps 6011 (FIG. 14A) and its beam aligned to basically coincide with the central optical or aiming axis of module 10. Station 6000 is spaced from a projection surface 6005 (e.g. 10-20 feet away); in one exemplary embodiment a vertical wall of a room that can be for example 5-30 feet wide and 6-30 feet tall. Thus, loosening nut 105 on bolt 104, which allows side-to-side panning of module 10 as well as loosens clamp member 103 on joint 101 (FIG. 5) to allow up and down tilting of lighting module 10, would thus allow a worker to manually pan/tilt the individual module 10 to move the spot of module laser beam 6051 to various positions on projection surface or wall 6005 depending on which direction module 10 is moved relative that wall 6005. Thus, this mounting (as illustrated in FIG. 12) allows a worker to project the basic aiming or optical axis of that individual lighting module to that vertical surface spaced away from the module and see where it falls on wall 6005. The intersection of the module beam 6051 with wall 6005 (a laser spot) allows the worker to know essentially the aiming direction of the module from station 6000 to wall 6005.

In this exemplary embodiment, the desired aiming direction of that module 10 is pre-determined by some methodology. One example is a computerized lighting design program. A computer can store each unique aiming direction of each module 10 according to that programming and display cross-hairs on wall 6005 correlated to a given module 10. By using the apparatus, method, and system of the invention each of the plural lighting modules 10 in a fixture housing 60 would individually be aimed relative to its cross-hair on the wall to create a composite beam pattern for an ultimate operating position and application for an illumination job.

This requires some translation of the computer program design plan to the pre-aiming room at the factory (or elsewhere). It is pre-known where the fixture 5000 will end up in operating position relative a target area. It could be, for example, 100 feet up on a pole on the outer left end of a cross-arm attached to the pole and tens or hundreds of feet away from the target area. It is also pre-known, therefore, that relative to housing 60, how each lighting module 10 will be aimed (panned/tilted, elevation/azimuth, etc.).

Therefore, it is also pre-determined how each module will be angularly adjusted (pan/tilt or elevation/azimuth) relative to its mounting rail 50.

The problem is that it is difficult and not trivial to very accurately adjust the relatively small individual modules 10 (just a couple inches in dimensions if not smaller) to accurately get each of their optical or aiming axis to its pre-designed position to a target that far away. As can be appreciated, just a relatively small error in adjusting pan/tilt of a module on rail 50 could result in a fairly large error in projection of that small light beam to a target several 100 feet away.

Thus, the inventors have addressed that problem by the methodology of FIG. 15.

In general, since all of the pre-known information can be compiled and stored in a data base (individual data for each module of each ultimate fixture 5000 including elevation, location, an aiming of the fixture housing 60 relative the target) and precise information about where each rail 50 will end up inside each fixture housing 60 and information about where each module 10 will end up on each rail 50, those physical space relationships are able to be stored in a data base. What is left is to adjust the pan/tilt of each module relative to its position on its rail 50 in an acceptably precise and accurate way. To accomplish this, the exemplary embodiment illustrated at FIG. 12 holds a rail 50 on jig 6010. At least one laser beam (fanned to create the laser energy essentially in a single plane) is projected from the location of the laser to a projection surface such as wall 6005. The adjustment of that laser beam relative to the projection surface 6005 is correlated with at least one of the pan or tilt criteria for that specific module 10. In other words, either line 6025 or 6035 in FIG. 12 is mathematically calculated to give a visual reference for a worker to adjust laser beam 6051 on module 10 to coincide with it. When the worker coincides the module laser beam 6051 with one of those projected laser lines on surface 6005, the worker knows that at least the pan or tilt adjustment designed for that module is within a reasonable degree of accuracy correct. The worker merely has to loosen the joint of the lighting module 10 on its rail 50 and manually manipulate module 10 until its projected laser beam 6051 overlays the projected laser line 6025 or 6035.

Furthermore, as illustrated in FIG. 12, if a second laser projects an orthogonal line on projection surface 6005 and a second line is correlated to the two degrees of freedom of adjustability of module 10 relative to rail 50, and that second line is also correlated to the pre-designed second adjustment of module 10, the worker merely moves the loosened module 10 until its laser beam 6051 coincides with the intersection 6055 of orthogonal laser lines 6025 and 6035. That intersection 6055 is a projection onto projection surface 6005 of the correct pan/tilt orientation or aiming of the optical axis of the module 10 being aimed relative to a pre-determined pan/tilt aiming for that module. In other words, the laser lines 6025 and 6035 are moved on projection surface or wall 6005 to give a visual indication of how the worker should pan/tilt the module to its desired position. The worker then simply tightens down the loosened joint of the module to that position, removes the laser 6050 and now has pre-aimed that module. As shown in FIG. 15, the worker moves on to the next module. Once all modules on a rail 50 have been pre-aimed, the entire sub assembly of rail and pre-aimed modules is removed from aiming jig 6010 and the next rail 50 is mounted on jig 6010.

A further feature of this embodiment is as follows. Jig 6010 can rotate around its longitudinal axis. Instead of moving laser line 6035 for each module, the module itself can be rotated at jig 6010 up or down (to change its range of elevation). It can be rotated proportionally to the predesigned aiming position relative to projection surface or wall 6005 such that the elevation of the module when correctly aimed will fall on that projection surface 6005, and even towards the center of that projection surface 6005. All that is left is then to position vertical laser line 6025 (the azimuth reference) on surface 6005. The intersection between lines 6035 and 6025 is again the target for aiming module laser beam 6051 to its intersection 6055 for correct alignment. Again module 10 is then tightened to rail 50 and is pre-aimed. As can be appreciated this rotation of the rail 50 at the module 10 allows a smaller projection surface 6005 to work for this pre-aiming method. If aiming a jig 6010 could not rotate in that manner, sometimes the up or down elevation of module 10 would be too tall or too low to project beam 6051 within the perimeter of projection surface 6005.

Finally, as discussed above, semi-automation of the process can take place. As illustrated in FIGS. 12 and 14A and B, as well as FIG. 15, a controller 6008 at aiming station 6000 can have digital memory and a processor. Data regarding the prior knowledge about the lighting application is stored there. Either through a user interface, such as touch pad 6007 or by scanning a module 10 with a bar code scanner (assuming a bar code on the module 10), controller 6008 knows which module 10 for the fixture 5000 is being aimed. It can then automatically operate an actuator 6012 and rotate jig 6010 to the right elevation or tilt for that particular module 10. With an analogous actuator 6021, controller 6008 can move the aim of azimuth laser 6020 left or right to move its projected line 6025 on projection surface 6005. Elevation laser line 6035 can be basically centered horizontally on projection surface 6005. Thus, by automatically moving laser line 6025 on projection surface 6005, and rotating bar 50 in aiming jig 6010 an appropriate amount, the intersection 6055 on projection surface 6005 presents the target point for the user to manually loosen module 10 and move it until its attached temporary laser beam 6051 corresponds with intersections 6055. The module is then tightened to rail 50 and module 10 is pre-aimed. This exemplary embodiment therefore follows the method of FIG. 15.

Example Embodiment 1

Figure 5:
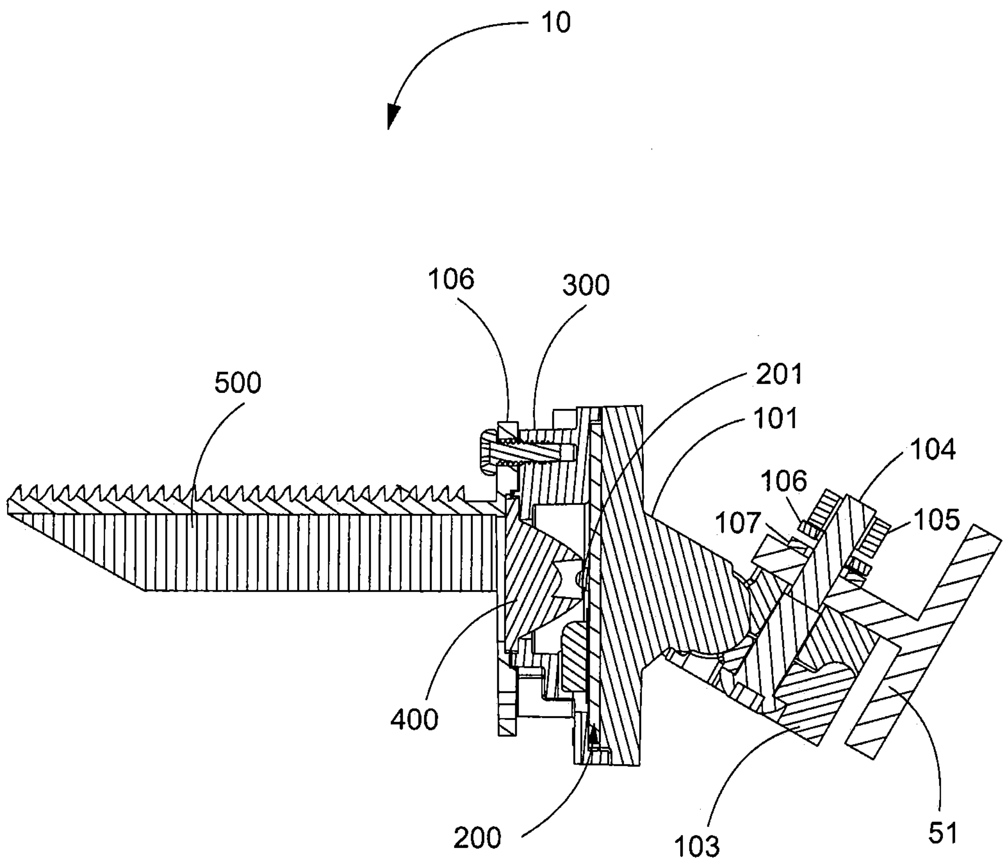
FIG. 5 is a sectional view taken along line 5-5 of FIG. 3 but also including the two degree freedom of movement structure of the lighting module that allows it to be attached to the module rail but adjusted in two degrees of freedom of movement relative to that module rail.

An embodiment according to aspects of the present invention includes the aforementioned LED modules 10, FIGS. 3, 4, and 5. These modules must be aimed relative to the mounting bars (also called "module bars" or "mounting rails")50, of FIGS. 6, 10A-10G. The mounting bars 50 with installed and aimed modules 10 are then installed in reflector housing 60, FIGS. 9, and 10A-10G, as part of exemplary fixture 5000, FIGS. 1-2. Fixtures 5000 are in turn installed on mounting structures which are appropriate to the area to be illuminated as described in U.S. patent application Ser. No. 13/399,291.

In addition to the components describe above, this embodiment uses an aiming fixture into which the mounting bars are temporarily mounted, an aiming surface on which laser lines are projected for reference and aiming, and a controller or control program/procedure.

An embodiment according to aspects of the present invention is illustrated in FIGS. 1-14 of this application.

In the following discussion, methods of 'aiming' or placing an object such as a laser, fixture or jig in a position which is rotationally indexed from another object are described. These methods assume the use of rotational positioning technology which can provide the desired precision and repeatability. This technology, in the form of e.g. stepper motors and gear reduction drives is well known in the art and are readily available.

Aiming Fixture Description

The aiming fixture 6000, FIG. 12, is located in proximity to an aiming surface (a wall or screen) 6005 at a specified distance, commonly around 15 feet. An "elevation" laser 6030 mounted to the aiming fixture projects a horizontal laser line 6035 on the wall. The line is co-planar with the central axis of the module aiming mount 6010. The horizontal line provides a vertical reference for aiming each light module. An example of a suitable laser 6030 as well as for laser 6020 referenced below is the CL830 laser, available from Cemar Electro, Inc., 100 Walnut Street, Champlain, N.Y. 12919, USA.

The aiming fixture 6000 (or a controller 6008) is preloaded with aiming specifications for lighting module groups 6040 for each specific fixture. For purposes of aiming, the relationships between the mounting bar 50, the fixture, pole, and lighting target have been previously calculated; thus information necessary for aiming purposes essentially specifies aiming of each module 10 in two axes relative to its mounting bar 50.

Controller 6008 can be any of a number of controllers (e.g. PCs, micro-controllers, PLC, etc.). The user interface 6007 can be keyboard, touch screen, or other known inputs. Barcode scanner 6080 is another way to get and identifying information from a module 10 or bar 50 and match it to a data base so the station 6000 knows how to automatically adjust at least one laser and/or rotate the jig 6010.

Examples of such a controller and its interface are: the Allen Bradley 1400 Micrologix Processor, with Allen Bradley "6-inch Color Panelview Plus" available from Van Meter Inc, 5775 Tremont Avenue, Davenport, Iowa 52807 may be used for controller 6007. Likewise, motors or actuators such as 6012 (which can include a stepper drive 6013) for rotating jig 6010 or panning/tilting one of laser 6020 or 6030 can be servo motors 6021 and 6031 respectively such as: the Allen Bradley TLY-A220P-BJ64AA servo motor and stepper drives such as the Stober P322SPRO500MT/A-B TLY-A220 50:1 gearhead, both available from Van Meter Inc, 5775 Tremont Avenue, Davenport, Iowa 52807. Motors 6012 to rotate jig 6010 are typically used in industry to enable continuous rotation, but for this application can for example be controlled over a range of plus or minus 45 degrees at one degree steps. Similarly any actuator or motor to pan or tilt one of the lasers can control it over a range of (for example) plus or minus 45 degrees at one degree steps. (Finer control could be provided easily within industry standards if desired for both jig and laser rotation.)

Aiming the module requires moving it in two axes relative to the mounting bar 10. The "module aiming mount" 6010 rotates with reference to the projected horizontal laser line 6035. This means that the module bar 50 is rotated by the aiming fixture in order to place the module's optic axis coplanar with horizontal laser line 6035. The resultant angle between the module 10 and its mounting bar 50 places the module in correct relationship to the fixture to which it will ultimately be mounted. Thus raising or lowering a mounted module to match the laser dot 6055 from the clamped-on aiming laser 6050 will provide a specified angle between the optic axis of the module and the module mount.

The 'azimuth laser' 6020 projects a vertical beam 6025 that is perpendicular to the horizontal beam and at a specified angle relative to the central axis of the jig. The vertical line will serve as the horizontal reference for aiming each module.

"Vertical" and "horizontal" will typically be close to true vertical and horizontal but are referenced to the aiming fixture. Precise reference to true horizontal/vertical is not required, since the position of lasers 6020, 6030, and 6050 with relationship to each other are maintained by the structure of the aiming fixture 6000. Thus the aiming mount need only be in two degrees of freedom of movement or two directions (pan/tilt).

Module Groups

Lighting modules 10, FIG. 13, which have been previously selected according to method 3000 are installed onto a module bar 50, creating an individual module group 6040. Each module group 6040 is given a unique identification 6041 such as an item number or bar code.

One of the assembled lighting module groups 6040 is scanned for identification by the system, then mounted in the module aiming mount 6010, FIGS. 12 and 14A and B, at a pre-determined location. A laser unit 6050 FIGS. 12 and 14A, which will project a beam very closely along the module's optic axis is clamped to the module.

Thus, the exemplary embodiment of modules 10, mounting rails 50, housing 60, in combination with aiming station 6000, provides the ability for many modules 10 for many fixtures 5000 to be pre-aimed in a relatively small room away from the ultimate installation location of the fixtures. The aiming can be done with reasonable accuracy and precision in a highly repeatable manner such that essentially fixtures 5000 can be "built" or assembled according to pre-determined specifications. Each of the many modules in each fixture can be aimed and locked into position. The fixture can then be basically fully pre-assembled into the form of FIG. 1 for example. By a numbering or correlation system, each fixture can be identified and shipped to location. It can then be retrieved and elevated to its intended operating position and thus have factory pre-aiming of plural small light modules for the composite beam output distribution pattern for each fixture pre-designed for the lighting application.

In particular, the system of this example essentially requires only a relatively small pan/tilt manual adjustment of each module at aiming station 6000 by the worker clamping a laser beam to it and matching the laser beam to cross-hair on a wall only perhaps 15 or so feet away. The cross-hair is generated automatically by aiming station 6000. That cross-hair can change (and usually will) from module to module. The cross-hair is automatically positioned on the wall based on a translation of data from the pre-known information about where the fixture will ultimately be installed, what aiming orientation the fixture will be relative the target, which position on mounting rail 50 the module is. In this embodiment aiming essentially projects a horizontal laser line 6050 across a wall 6005, pans azimuth laser line 6025 to the correct vertical position on wall 6005 for the ultimate azimuth aiming angle for that module 10, and then rotates jig 6010 around its essentially horizontal axis parallel to wall 6005 to bring the range of tilting of module 10 within the perimeter of the projection surface wall 6005. Then, laser beam 6051 from module 10 simply must be visually aligned with the intersection 6055 of projected aiming lines or cross-hairs 6025 and 6035 to confirm correct factory aiming of module 10. Module 10 is then locked in that aiming orientation relative to its mounting bar 50. Module laser 6050 is removed and the module and/or bar is worked on for pre-aiming.

Thus, again, one aspect of the invention is distilling down the required manual adjustment to simply pan/tilt of module 10 on its automatically positioned rail 50 relative to laser cross-hairs on wall 6005 just a few feet away. The semi-automation involves the controller/computer knowing how to precisely rotate jig 6010, where to set azimuth laser line 6025 on wall 6005 for each module 10. This is accomplished with the utilization of a priori knowledge of the target area, where each fixture will be in actual physical space relative to target, how each fixture will be aimed relative to the actual target (many times the horizontal surface but could be other topology), and then what type of composite beam output pattern is desired. The aiming of each of the modules for each fixture thus requires the pan/tilt final adjust relative to its fixture housing 60.

As can be appreciated, the basic idea of distilling down the required manual aiming to just pan/tilt and line up a laser to a cross-hair is not necessarily a trivial solution. The following will describe an exemplary embodiment of how that semi-automation can be implemented according to this generalized concept.

Aiming Procedure

The module aiming mount 6010 and azimuth laser 6020 FIG. 14A rotate to match the specifications for each lighting module in each module group.

The technician then positions the module so the dot 6055 FIG. 12 projected by laser 6050 is centered very close to the intersection of the horizontal laser line 6035 and the vertical laser line 6025.

Software Concept

The control process 6100, used for aiming is illustrated in block form in FIG. 15. In the exemplary embodiment according to aspects of the invention, the following steps are used:

6110. User loads software controller 6008 with information regarding luminaire. This includes a specific identification for each module group and each module on each group. Each module is assigned a horizontal and vertical aiming relative to the module mount.

6120. User identifies module, then mounts onto module aiming mount 6010. User clamps aiming laser 6050 onto module 50, then indicates 'ready to aim.'

6130. Software recalls or calculates aiming instructions for aiming mount 6010 and azimuth laser 6020.

6140. Controller adjusts rotation of module aiming mount 6010 and azimuth laser 6020.

6150. User manually adjusts module 50 so aiming laser dot 6055 is on or very near intersection of horizontal and vertical reference lines 6035 and 6025. User indicates module OK. User removes aiming laser 6050 and clamps to next module 50.

6160. Process repeats until each module has been aimed. Process repeats until all modules are aimed. User can exit or repeat.

6170. Software records successful aiming of modules.

The software can be implemented in any of a number of commercially available computerized systems such as computer controlled motors or programmable logic controllers or the like. Each fixture 5000 can have a unique identifier that is correlated to where it will end up relative the target and what pan/tilt positions each module at its unique location within the fixture should take. This requires that each mounting rail 50 will be in the fixture housing 60. Then by keeping track of where each module is on each of those rails, the system can inform the worker that if they are working on a module on a certain rail 50 in a certain location in fixture housing 60 for a particular fixture 5000, this is the pan/tilt aiming orientation for that module. The aiming station automatically controls the actuators that can control the rotation of jig 6010 and the azimuth orientation of laser line 6025 (elevation laser reference 6035 can be fixed or pre-set or it also could be adjusted automatically in certain embodiments). The software could take the worker through an algorithm of displaying which fixture 5000, and which mounting bar 50, and which module on that mounting bar 50 should be aimed at the present time. Once complete the worker could document the aiming or otherwise move on to the next module. The procedure would continue until all modules for that fixture 5000 are pre-aimed and locked in position. By reference to U.S. Pat. No. 8,300,219, some of the pre-known correlations between the ultimate installation position for fixtures and translation of that ultimate coordinate system to the factory aiming coordinate systems it can be further understood.

Using/Installing the Modules

Once the module groups have been aimed, as long as the relationship of the individual modules to their respective mounting bars are not disturbed, they need only be mounted to their specified locations in their fixtures such as exemplary fixtures 5000, as described in described in U.S. patent application Ser. No. 13/399,291.

Specific Coordinate Translation Method (FIGS. 16A-Z)

By reference to FIGS. 16A-Z, one example of how the various factors needed to distill manual aiming of each module down to simply a manual pan/tilt adjustment relative to a projection surface like wall 6005 is described. As can be appreciated, there are various ways to approach and solve these issues. In this embodiment, the methodology takes into account and compensates for offsets and other factors needed to get the required accuracy and precision when converting design criteria into simply pan/tilt manual adjustment of multiple light modules for each fixture.

As can be appreciated, in one embodiment, the physical space associated with the aiming station can be described mathematically. As illustrated in FIG. 16A, there are three main coordinate systems at play. The wall and floor coordinate system WALL_CS is associated with the projection surface or wall 6005 and the floor upon which the aiming station 6000 is positioned. The actual aiming fixture coordinate system FIXTURE_CS is illustrated in FIG. 16A. Because the rail 50 can rotate relative to that fixture coordinate system, its coordinate system RAIL_CS is also illustrated. As can be appreciated, vector representation for the various components in the aiming system can be utilized according to known methods.

The FIGS. 16A-Z illustrate one way in which those coordinate systems can be related and used to accurately mathematically describe the physical space relationship of a module 10 being aimed relative to a reference in three dimensions to allow the controller to know how to rotate the rail 50 and move the azimuth laser beam 6025 to correspond with a desired aiming (pan or tilt) of that module relative to rail 50. As will be seen in the description below referring to FIG. 16A-Z, these descriptions account for the offsets in some of the components. For example, the lasers used to project lines 6025 and 6035 are offset from the module rail 50 at issue. That rail is offset from the floor and from the projection wall. And the particular module being aimed has a position on rail 50 including which slot 51 and in which part of that slot 51. As illustrated the software associated with controller 6008 can provide the worker with certain displays to help facilitate the programming and procedure.

Essentially this embodiment allows a fixture of many individual module 10 to be pre-aimed by identifying for aiming station 6000 which rail 50 for which position in fixture housing 60 is in play and then which of the modules 10 for that rail 50 are in play. The controller 6008 then instructs aiming station 6000 to rotate rail 50 up or down and generate and move azimuth laser line 6025 left or right to create visual crosshairs of lasers 6025 and 6035 on projection surface 6005 correlated with the pre-determined pan/tilt orientation of that module 10 relative to that rail 50. The laser 6050 mounted on that module 10 allows the worker to adjust the pan/tilt orientation of that module 10 until its laser beam 6051 intersects the crosshair intersection 6055. The worker then locks that module 10 and that aiming orientation relative to projection surface 6005. Laser 6050 is removed and another module 10 installed in its position on rail 50. Laser 6050 is temporarily installed on it. Controller 6008 is informed which new module 10 is now being aimed. Controller 6008 then rotates jig 6010 for the correct tilt or elevation for aiming and moves azimuth laser 6020 left or right to get the correct azimuth projection line 6025 on surface 6005. This continues for all the modules 10 for all the rails 50 for a fixture 60. The worker can then go to the next fixture 60 and repeat.

Further details are provided below in order to further explicate one embodiment according to aspects of the invention as envisioned.

Coordinate Systems

Several coordinate systems are used to enable describing the position of the modules as they are aimed with respect to their intended fixtures, their mounting structures, and the envisioned aiming system. These include the following which are shown in outline in FIG. 16A:

Wall Coordinate System (WALL CS): Y: Vertical on the wall; X: Horizontal on the wall; Z: Normal to the Wall; Origin (0, 0) is located in the bottom left corner of the aiming room on the floor. This coordinate system WALL CS is the main coordinate system used by all components of the workers using the system. The final output of these calculations will be expressed in this coordinate system.

Fixture Coordinate System (FIXTURE CS): Y: Normal to the floor; X: In line with the pivot axis of the fixture; Z: Normal to the Wall; Z-Y plane is located in the midline of the rail. This FIXTURE_CS will be the main coordinate system used in calculations. Its location was chosen for simplicity and will not likely be used outside of the calculations tab.

Rail Coordinate System (RAIL CS): Y: Normal to the base of the rail; X: parallel to the pivot axis of the fixture; Origin is centered on the middle slot; X-Y plane is lies on the top face of the rail. This RAIL CS is used to simplify the offset calculations determined by the position on the rail by allowing calculations to be performed within the RAIL CS coordinate system and subsequently translated to the FIXTURE CS coordinate system rather than having to calculate within both coordinate systems simultaneously. In one example, the following setup parameters are used, with definitions provided below:

| Setup | | |
|---|---|---|
| Setback | 204 | inches |
| Laser Offset | 0.19427 | inches |
| Fixture Tilt | 15 | Degrees |
| Height Offset | 48 | inches |
| Left wall offset | 252 | inches |
| Pivot Z Offset | 24.813 | inches |
| Pivot Y Offset | 59.674 | inches |
| module pivot y | 0.563 | inches |
| module pivot z | 0.56 | inches |

Figure 16C:
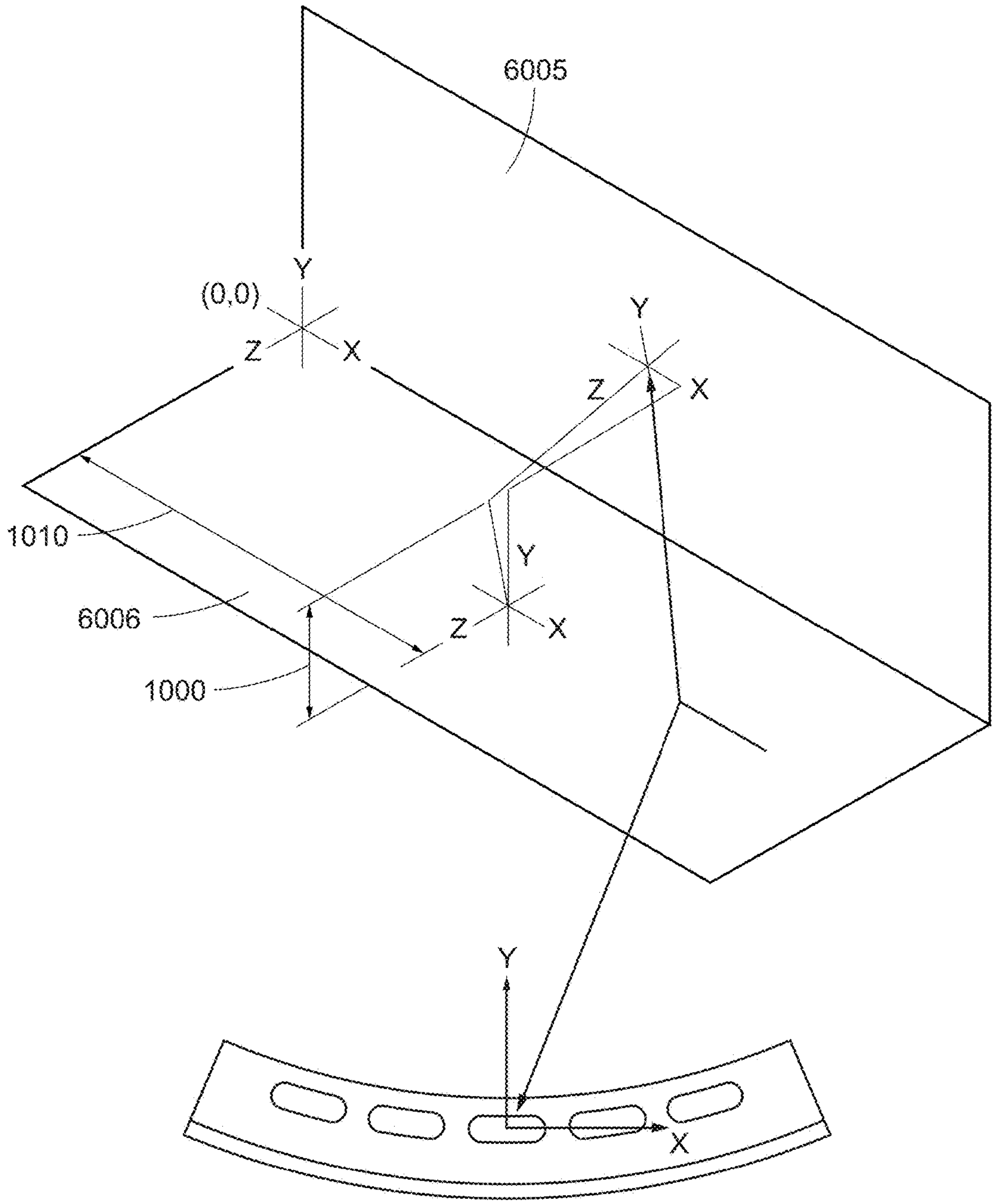
Figure 16D:
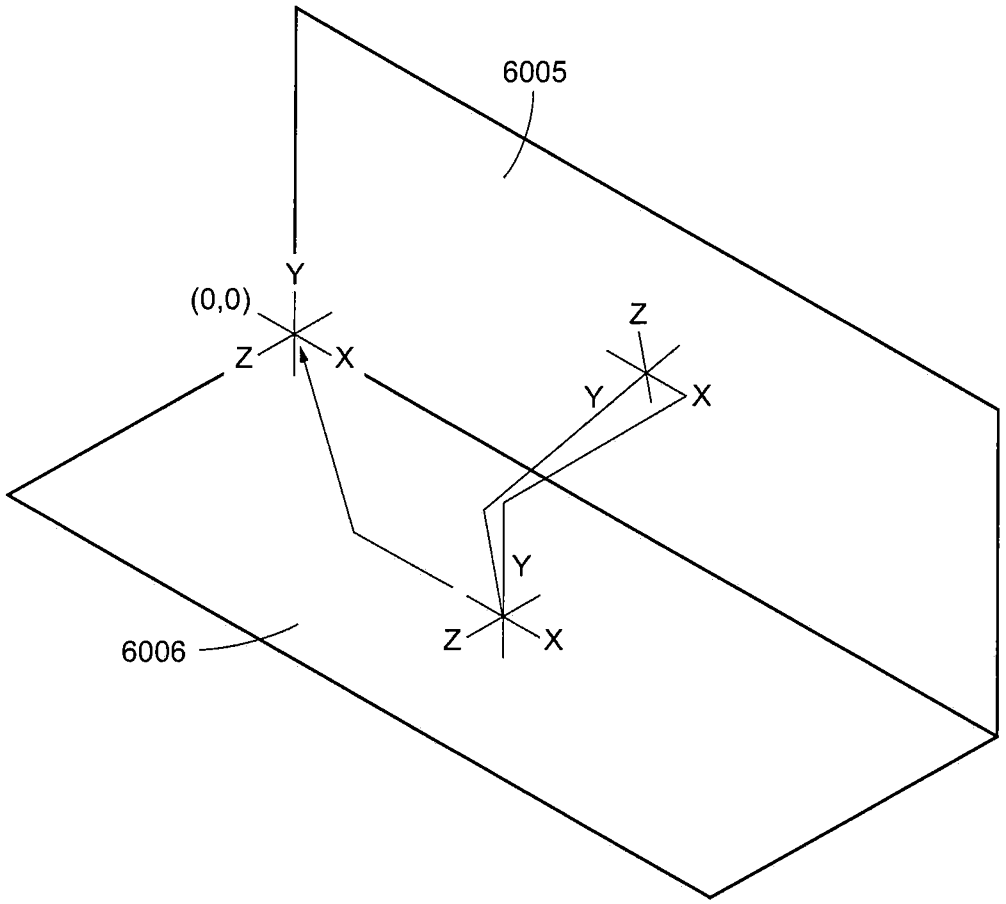
Figure 16E:
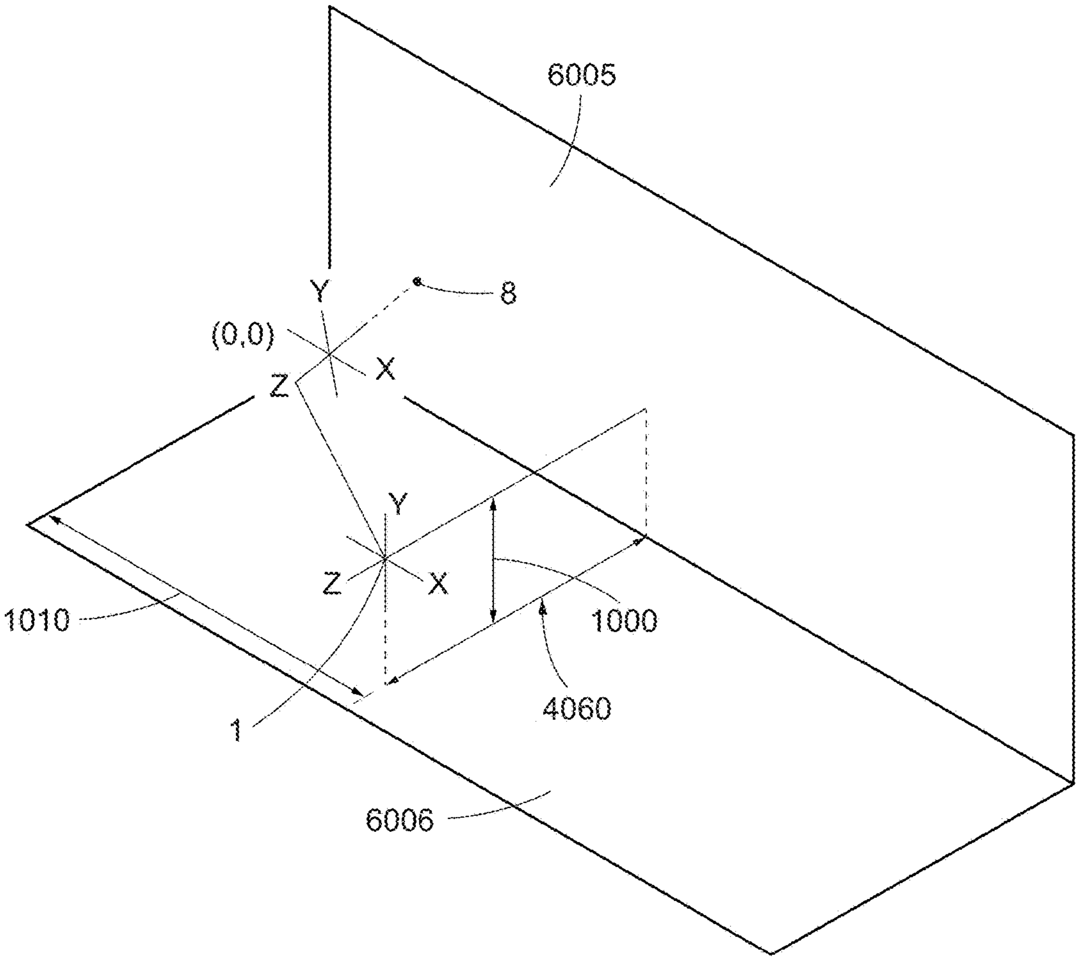
Figure 16F:
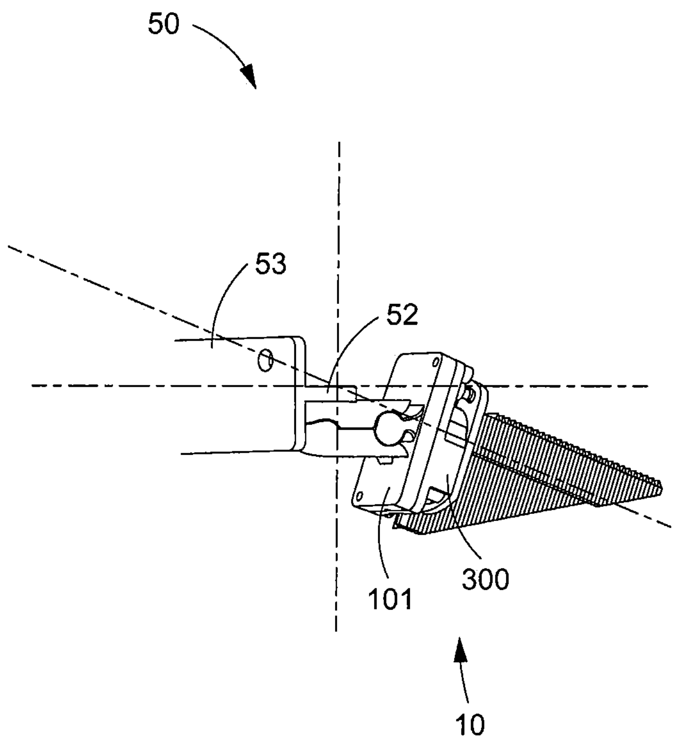
Figure 16G:
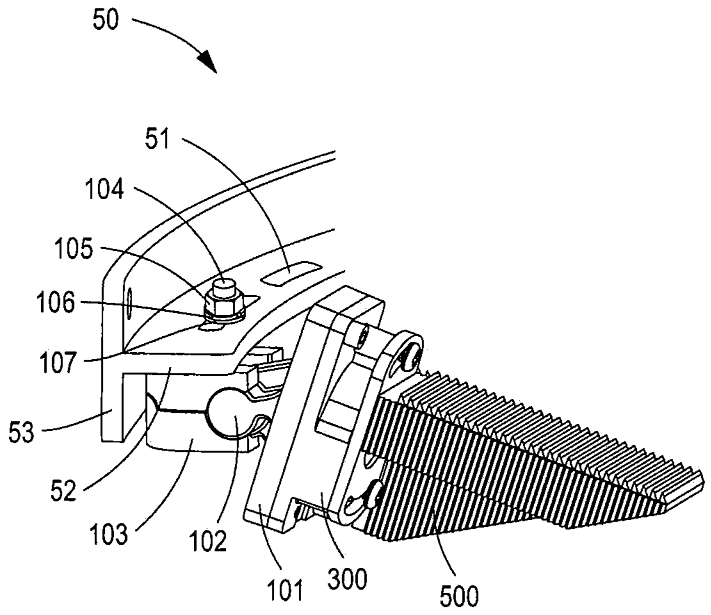
Figure 16H:
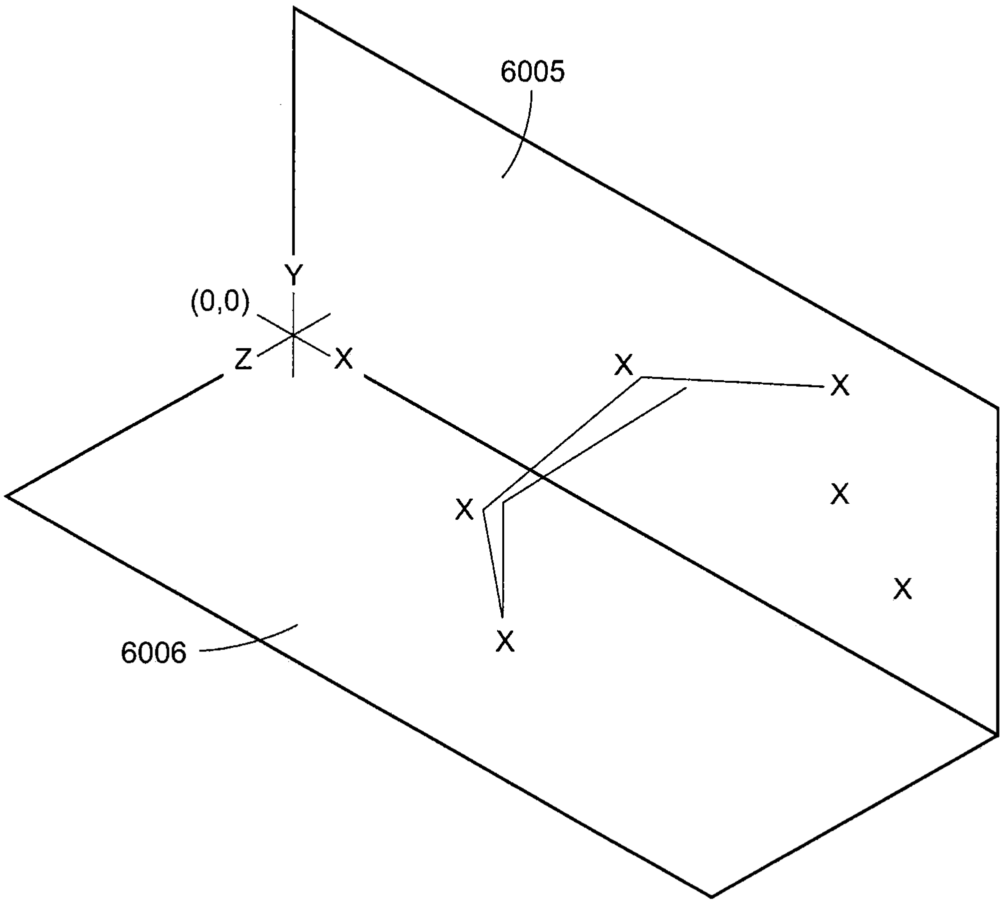

Setback FIG. 16E: the distance 4060, FIG. 16E from the Wall to the Fixture CS. Laser Offset: the distance 4010, FIG. 16W of the Aiming Laser 6050 FIG. 12 from the Module H(X) axis.

Figure 16I:
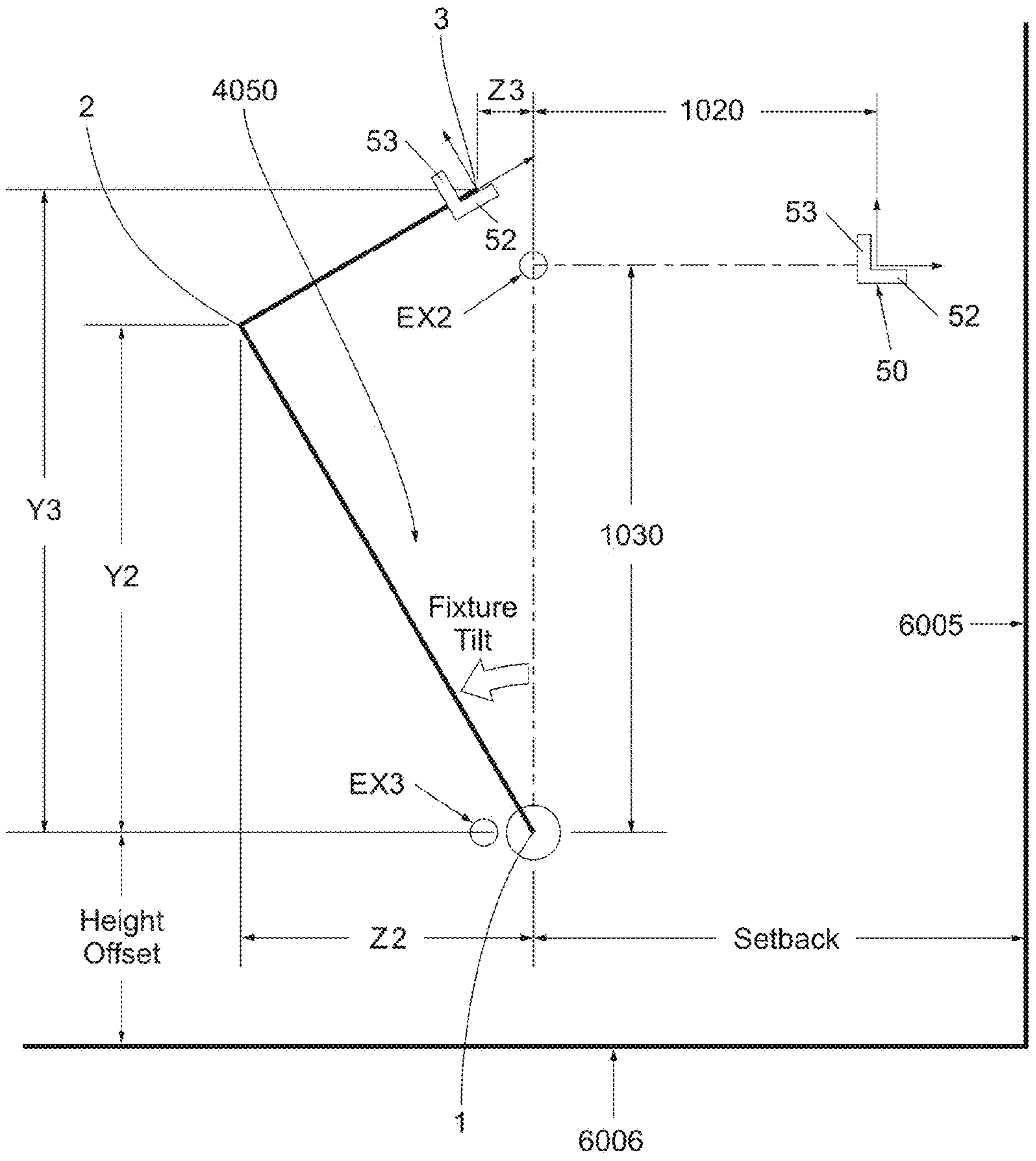

Fixture Tilt: the angle 4050 FIG. 16I that the Rail 50 FIG. 12 is tilted back about the Fixture rotation axis from the horizontal (0) position.

Height Offset: the distance 1000 FIG. 16C from the floor to the Fixture CS Left Wall Offset: the distance 1010 FIG. 16C from the Left Wall to the Fixture CS.

Pivot Z offset: the distance 1020 FIG. 16I from the Fixture CS to the Rail CS in the Fixture CS Z direction.

Pivot Y offset: the distance 1030 FIG. 16I from the Fixture CS to the Rail CS in the Fixture Coordinate System Y direction.

Module Pivot Y: The vertical distance 1040 FIG. 16W from the top of the rail to the Module H(X) axis 1045, FIG. 4.

Module Pivot Z: The horizontal distance 1050 FIG. 16W from the Module V(Y) axis 1055, FIG. 4 to the Module H(X) axis 1045, FIG. 4.

Module H(X) axis: the module mount pivot 1045, FIG. 4, about which the module 50 tilts up-and-down.

Module V(Y) axis: the module mount pivot 1055, FIG. 4 about which the module 50 pans side-to-side.

Fixture Zero position: the reference position where the aiming jig 6010 is zeroed; fixture tilt angle 4050, FIG. 16I is equal to zero.

Reference Points

A set of coordinate points referenced to the Fixture Coordinate System was created to help explain the model and ensure accuracy.

Point 1, FIG. 16E: This point is coincident with the midplane of the fixture and the rotation axis of the fixture, at the (0,0,0) point in the Fixture Coordinate System, or at (Left Wall Offset, Height Offset, Setback) in Wall Coordinate System.

Point 2, FIG. 16I: This point is the Pivot Y Offset from point 1, FIG. 16E along the Fixture Coordinate System Y-axis after the fixture has been rotated back. Point 2 (FIG. 16I) and point 3 (FIG. 16I) require very similar equations. These equations start with the current location in the Y or Z component then add or subtract the component of the next offset in that direction. These two points will only translate along the Fixture Coordinate System Y-Z plane therefore there will be no increase in the x component. Coordinates: X2=X1; Y2=Y1+Pivot Y Offset*COS(Radians(Fixture Tilt)); Z2=Z1+Pivot Y Offset*SIN(Radians(Fixture Tilt))

Point 3 (FIG. 16I): This point is the Pivot Z Offset from point 2 along the Fixture Coordinate System Z-axis after the fixture has been rotated back. Coordinates: X2=X2; Y2=Y2+Pivot Y Offset*SIN(Radians(Fixture Tilt)); Z2=Z2+Pivot Y Offset*COS(Radians(Fixture Tilt))

Figure 16J:
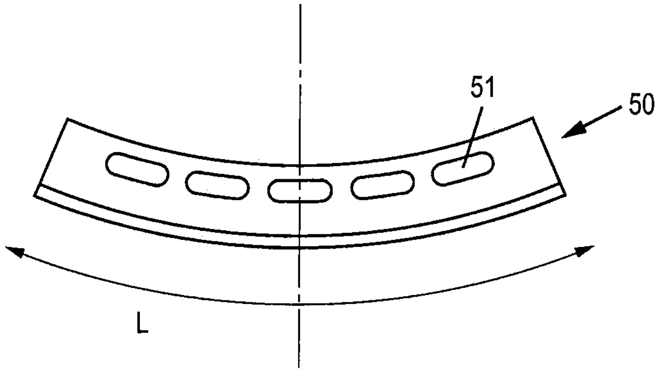
Figure 16K:
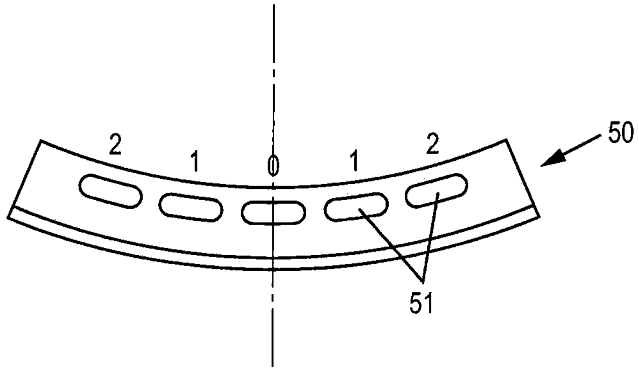
Figure 16L:
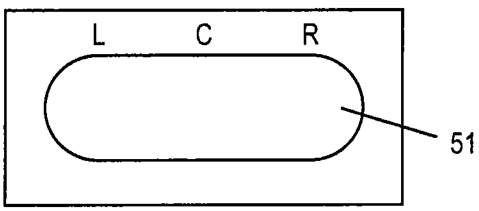
Figure 16M:
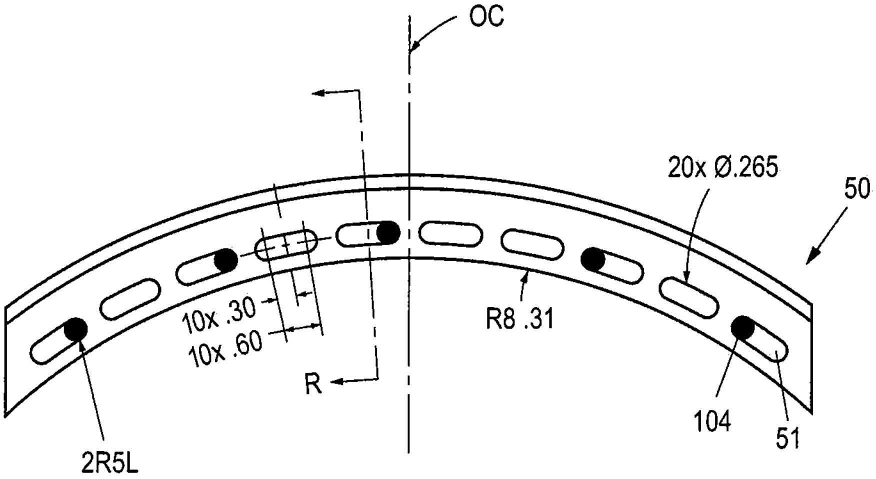

Point 4 (FIGS. 16M and N, represented by point 104). This point is first determined in the Rail Coordinate System then converted to the Fixture Coordinate System. The module is bolted into a set of standard positions and those are used to determine point 4 (FIGS. 16M and N, represented by point 104). It is therefore necessary to identify the possible slot positions as follows: Point 4 will be determined by input of a 2, 3, or 4 digit code that shows the slot position.

Three digit codes, FIGS. 16J-L are used for rails with a slot centered over the midplane of the rail, where the first digit (Xxx), FIG. 16J will determine if the module is located on the left or right side of the rail; the second digit (xXx), FIG. 16K determines the slot that the module is bolted in starting with 0 in the center and increasing by 1 each position out from the center as shown in the diagram below; the third digit (xxX), FIG. 16L is used to determine the position within the Slot, L for Left C for Center and R for Right. It is to be appreciated that point 4 is first determined in the RAIL_CS then converted to the FIXTURE_CS. This was done to simplify the calculations. It was determined that the module 10 would be bolted into a set of standard positions and those would be used to determine point 4. Point 4 will be determined by input of a two, three, or four digit code that shows the slot position (otherwise called the "slot description"). The standard code will be a three digit code for rails 50 with a slot centered over the mid-plane of the rail. FIG. 16J shows how the first digit is assigned per standard orientation of fixture Left and Right from the frame of reference of looking from behind the fixture (rail 50) as shown in FIG. 16J.

Four digit codes FIG. 16M are used on a rail using four modules. These rails do not have a slot centered in the midplane of the fixture; rather they have a space centered in the midplane of the fixture. These rails are identified by adding a 2 in front of the previously described 3 digit codes.

Figure 16N:
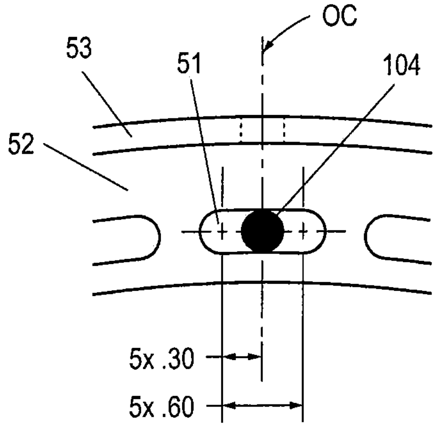

Two digit codes FIG. 16N are used on the center slot of the standard rail. Since this slot has no left or right position it does use the first digit of the previously described 3 digit codes which would describe a left or right position.

Figure 16O:
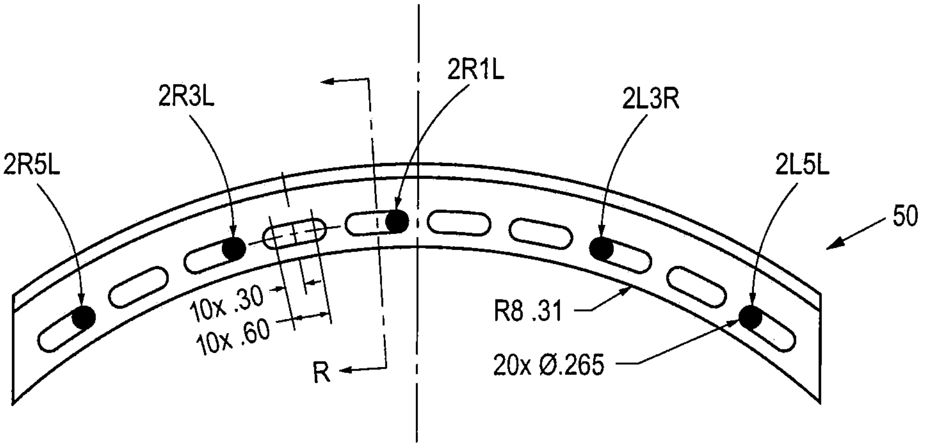
Figure 16O:
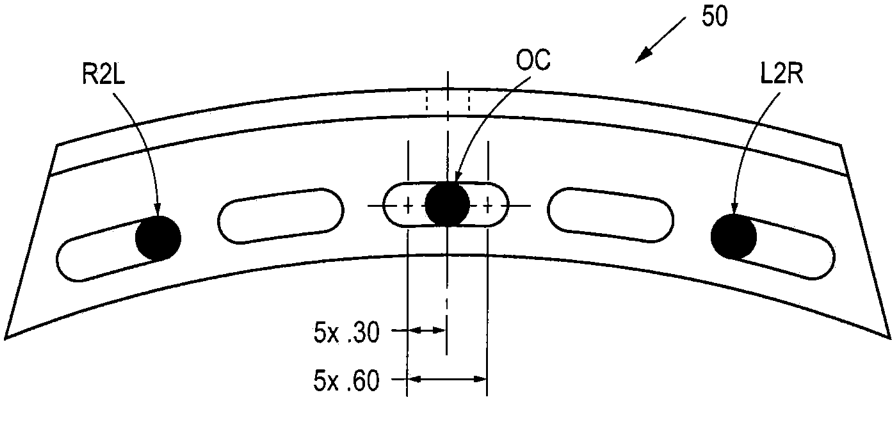
Figure 16P:
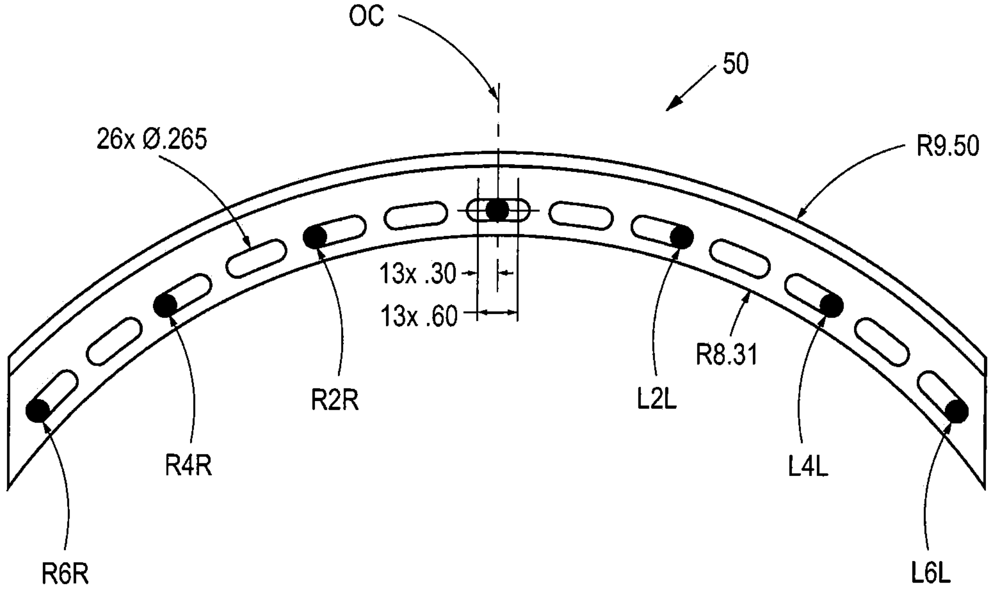
Figure 16Q:
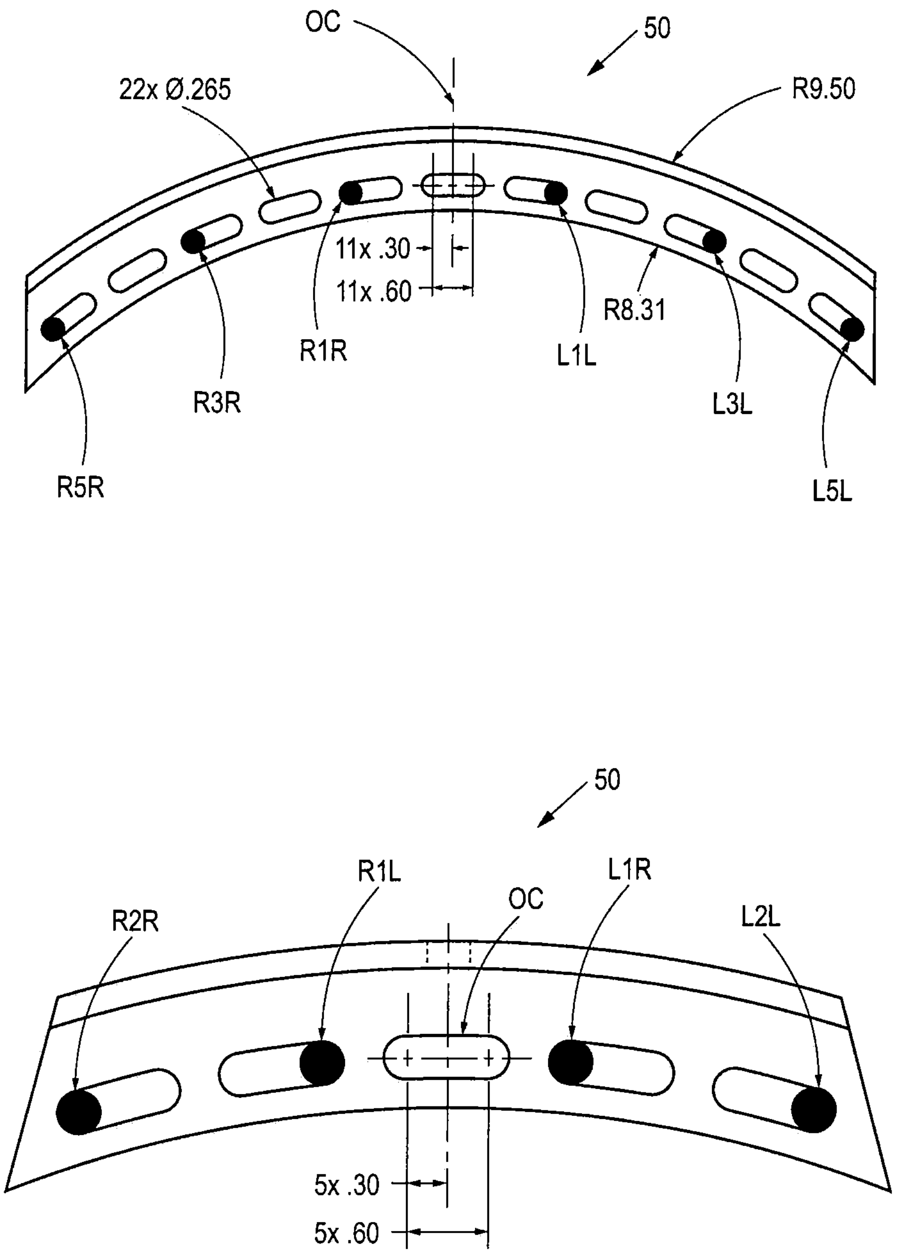

Several slot positions are identified in FIGS. 16O through 16Q.

Since the slots are cut on a straight line rather than a radius matching the radius of the rail, only the center slot positions for each slot will lie on the same radius around the rail. Therefore the center position for each slot will be calculated first followed by the Left and Right positions.

Figure 16R:
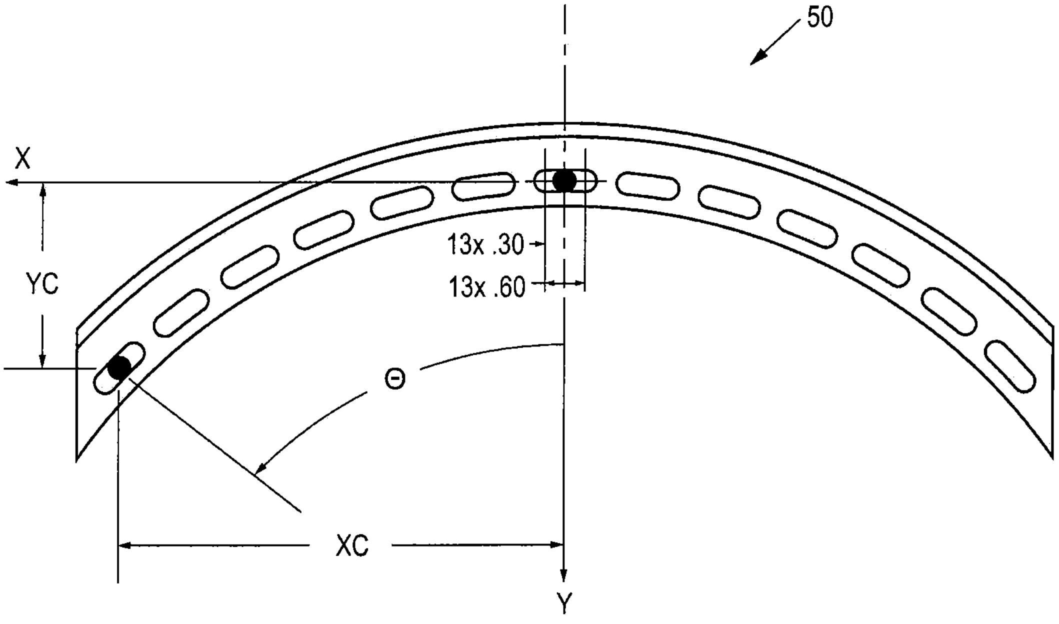

The Center positions, FIG. 16R, are 7.5 degrees apart and lie on an 8.68" radius starting at a maximum of 45 degrees from the midplane of the rail. θ: will range from −45 to 45 increasing by 7.5 degree increments for each position shift left or right. X and Y positions will again use the concept of resolving vectors into components discussed previously. The equations for X and Y values for the center positions are: X=8.68*sin(radians(θ)); Y=8.68-8.68*Cos(radians(θ)). Since the origin θ rotates about is in the center of the fixture and the origin of our calculations is centered in the "zero C" position, we must translate by 8.68 inches downward, then subtract the Y component of the vector drawn by θ.

Figure 16S:
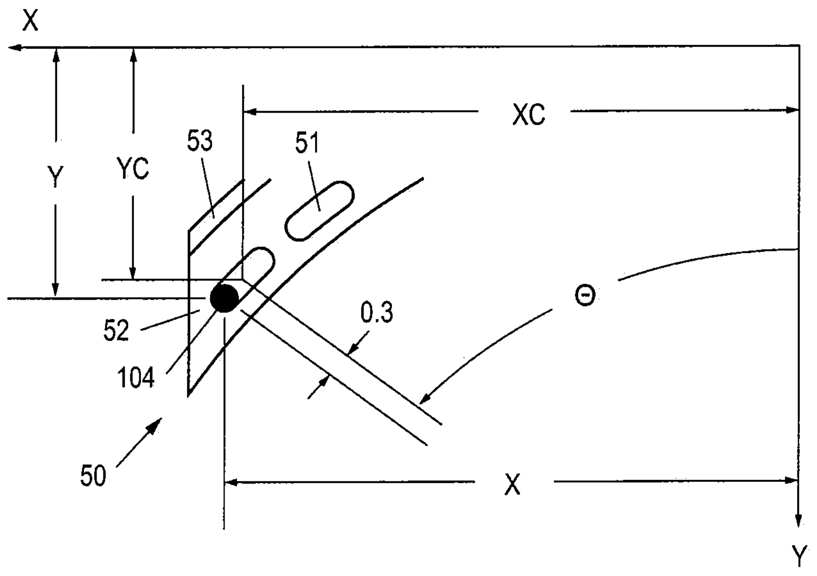

Left and Right Positions Calculation, FIG. 16S. The Left and Right Positions are offset by 0.3" from the center position perpendicular to the theta vector. The X and Y positions will again use the concept of resolving vectors into components discussed previously. The equations for X and Y values for the left and right positions are: X=XC+0.3*cos (radians(θ)); Y=YC+0.3*SIN(radians(θ)). These equations use the center position that was calculated and adds the component of offset from the slot in the corresponding directions.

Tables T1 and T2, FIG. 16T illustrate Slot position, Center Angle, and X and Y values calculated in this fashion for many possible slot positions.

Figure 16U:
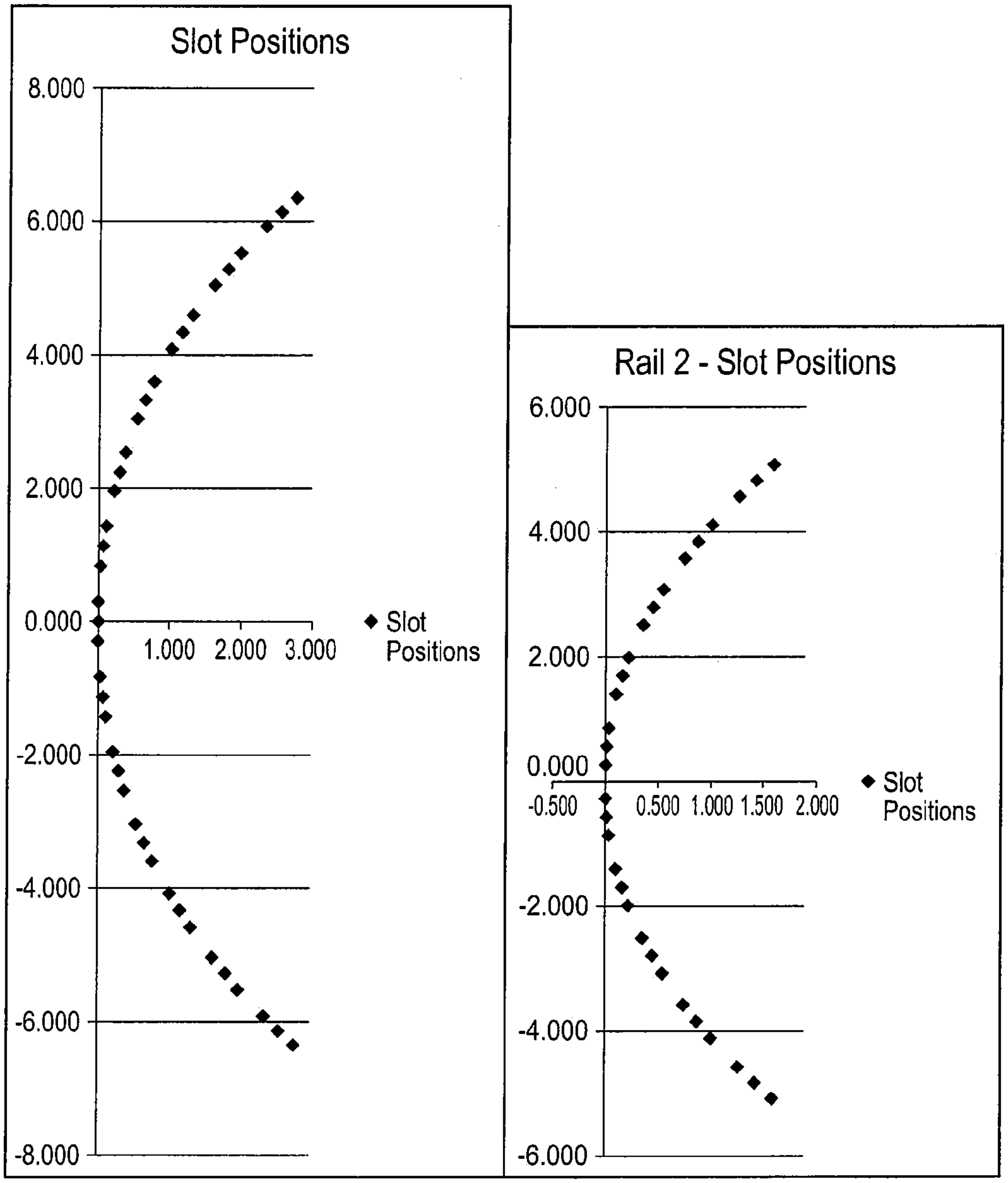

FIG. 16U shows plots of the module positions for tables T1 and T2. This visualization is useful to provide a visual comparison between the calculated positions and the physical distances represented, as a means of checking that calculations were set up correctly in the software model.

Figure 16V:
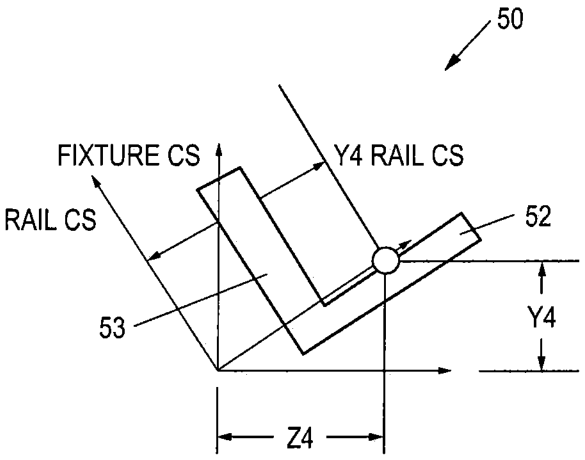

The X and Y values in the Rail Coordinate System (Rail CS) obtained above must now be converted to the Fixture Coordinate System (Fixture CS) values. For the X value, since the Fixture jig 6010 rotates about the X axis, the fixture rotation does not affect the X-dimension, FIG. 16V. The X-coordinate from the Rail Coordinate System is simply added to the previous X-coordinate: X4=X3+X4_Rail Coordinate System. For the Y and Z: since the fixture rotates about the x axis, the Y and Z axis will have components from Y4_Fixture Coordinate System. To convert from the Rail Coordinate System to the Fixture Coordinate System we will need to again use Vector components added to the previous Y3 Value:

Y4=Y3+Y4_Fixture Coordinate System*sin(radians(Fixture Tilt))

Z4=Z3+Y4_Fixture Coordinate System*cos(radians(Fixture Tilt))

Figure 16W:
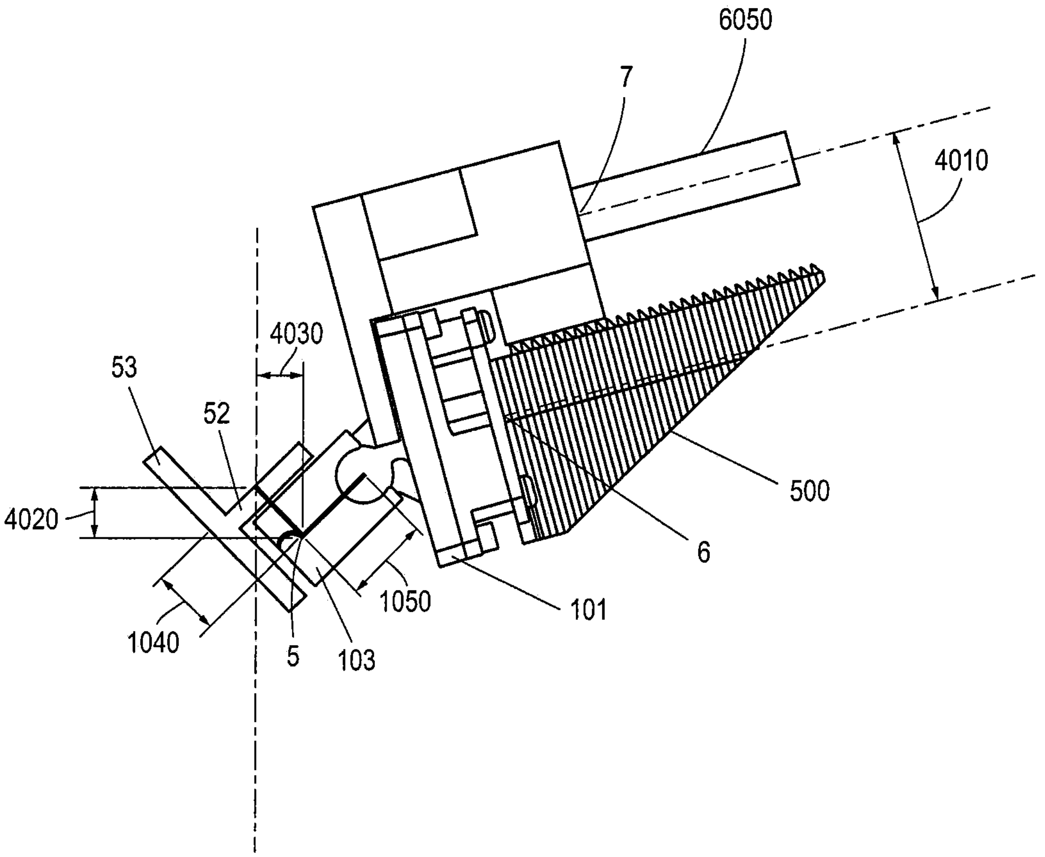

Point 5, FIG. 16W: This point takes care of the offset from the top of the rail to plane in which the vertical pivot lies. For the X value, since this offset occurs straight down when the Fixture Tilt is set to zero and the Fixture Tilt is about the X-Axis, the X Value will not be affected by this offset therefore X5=X4.

For the Y and Z values. since the fixture rotates about the X axis, the Y and Z axis will have components from the Module Pivot Y with their previous values added to them.

$$Y5=Y4+\text{Module Pivot } Y*\text{COS(radians(Fixture Tilt))}$$

$$Z5=Z4+\text{Module Pivot } Y*\text{SIN(radians(Fixture Tilt))}$$

Figure 16X:
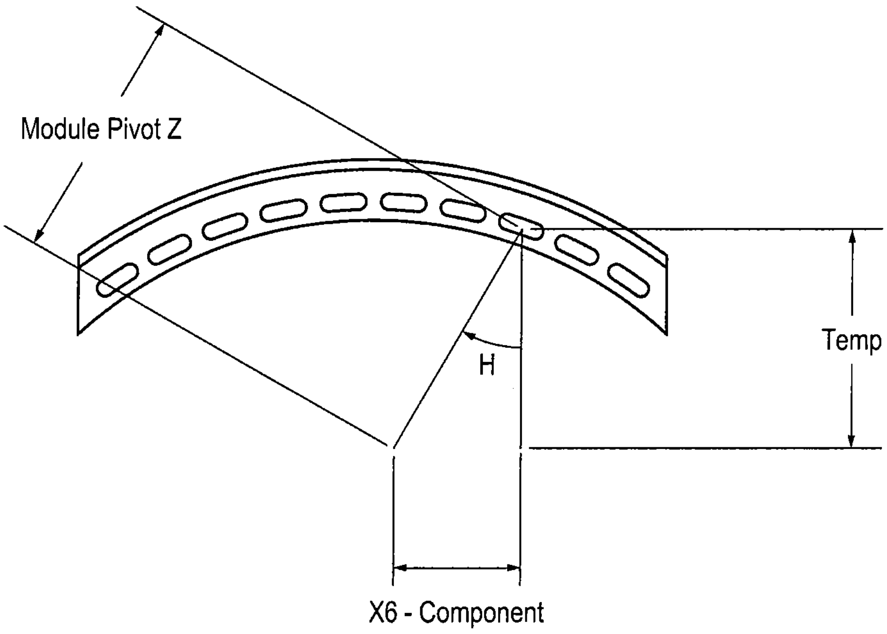

Point 6, FIG. 16W: This point takes care of the offset from the horizontal pivot to the vertical pivot after the horizontal pivot has occurred. Calculating this point becomes more complicated since it has been rotated about both the X-axis (Fixture Rotation) and the Y-axis (Horizontal Rotation), but it can be simplified to two steps: First. FIG. 16X, to get the XYZ components of this rotation the module must be rotated back to its zero position in reverse order, thereby first considering the Horizontal rotation, then the vertical rotation from the Fixture Tilt. The first step will be completed parallel to the plane of the top of the rail coincident with point 5, using Module Pivot z 1050, FIGS. 16W and 16X. This will find the X component of offset and a temporary value that will be used to find the Z and Y component offsets, using the following formulas:

$$X6\text{-Component}=\text{Module Pivot } Z*\sin(\text{radians}(H))$$

$$\text{Temp}=\text{Module Pivot } Z*\cos(\text{radians}(H))$$

Figure 16Y:
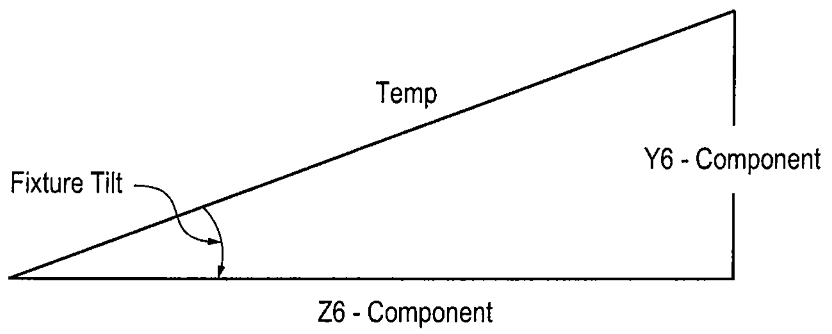

Second, FIG. 16Y, the vertical rotation will be calculated taking into consideration the TEMP component in the plane perpendicular to the axis of rotation, using the following formulas:

$$Y6\text{-Component}=\text{Temp*SIN(radians(Fixture Tilt))}$$

$$Z6\text{-Component}=\text{Temp*COS(radians(fixture Tilt))}$$

Now add these components to their previous values and eliminating the Temp variable:

$$X6=X5+\text{Module Pivot } Z*\sin(\text{radians}(H))$$

$$Y6=Y6-\text{Module Pivot } Z*\cos(\text{radians}(H))*\text{SIN(radians(Fixture Tilt))}$$

$$Z6=Z6-\text{Module Pivot } Z*\cos(\text{radians}(H))*\text{COS(radians(fixture Tilt))}$$

Point 7, FIG. 16W: This point needs to be placed on the line of the laser. This point could get very complicated since it would require a similar process as before with another rotation (V) added. Since the V angles are all always near the same value of the Fixture Tilt Value then this offset is near vertical and the error to the ideal point is minimal, and the error to the laser line is even less.

$$X7=X6$$

$$Y7=Y6+\text{Laser Offset}$$

$$Z7=Z6$$

Point 8, FIG. 16E, is the actual aiming point on the aiming wall as represented mathematically. It would be very difficult to calculate accurately using conventional geometry and trigonometry. However, the field of kinematics has dealt with these kinds of calculations and has developed the "Denavit-Hartenberg convention" for selecting frames of reference in robotics applications. Thus point 8 may be calculated using Denavit-Hartenberg matrix transformations as exemplified by table 1070, FIG. 16Z.

Therefore, by following the above figures and methodology, the system can automatically project the appropriate laser lines on the projection surface (wall 6005) and rotate jig 6010 to pre-determine the positions correlated to each mounting rail 50 and each module 10 in its assigned position on module rail 50. The methodology essentially provides a rapid procedure for aiming modules that requires simple and easily understood actions on the part of the operator; provides rapid transition from piece to piece and fixture to fixture, and allows for wide flexibility in aiming fixtures according to highly individualized requirements.

Figure 17B:
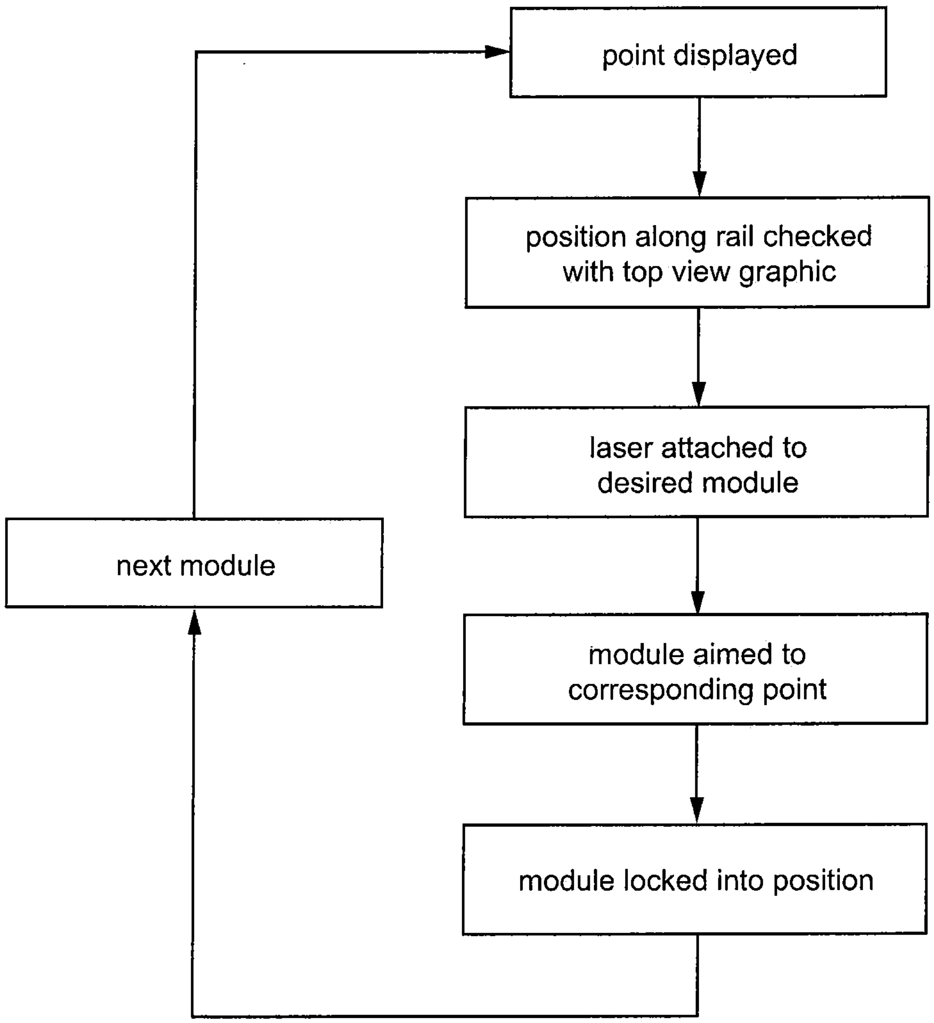

FIGS. 17A and B are flow charts which provide additional detail regarding use of the concepts of FIGS. 16A-Z to aim lighting modules. FIG. 17A shows In block diagram form the basic procedure used by the controller for calculating the steps in the aiming procedure wherein the fixture is rotated and the azimuth laser is aimed. FIG. 17B shows in block diagram form the physical procedure used by the operator to perform the aiming operation.

The ultimate goal of this embodiment is to aim each module 10, FIG. 18A to light a specific target area 13 when installed and oriented on its appropriate fixture 5000 and pole 12. This requires setting the module in a specific orientation relative to its position on the pole. To do this requires translating several physical components from one reference frame to another. Simply conceived, the location of each module is generally identified by specifying which of many possible mounting points it will occupy in a fixture. Given that specific mounting point, the module must be aimed in a specific direction relative to the fixture. The embodiment provides a speedy and reliable method for aiming the module in the desired direction. The following description references FIGS. 18A-P.

One way of doing this would be to have all of the possible mounting locations identified on a fixture, then mount each module at its location in the fixture and aim it relative to the fixture so that when the fixture is installed in its exact permanent location, the module will be aimed precisely at the target.

However, because the fixtures are quite large and bulky, and because the modules are very tightly spaced in the fixture, it is very difficult to aim the modules when in the fixture. It is much more convenient to effectively remove sections of the fixture, then mount a few modules in each section of the fixture, aim the modules in some fashion, and reinstall the fixture sections into the fixture in their exact original locations so that the aiming is the same as if the modules had been aimed in there fixture locations. One could envision cutting up the fixture into small pieces, then reassembling them like a puzzle into their original locations. But this would not be practical. Instead, sub-assembly rails 50, FIG. 13 are designed to be mounted in the fixture so the modules 10 can be precisely aimed relative to the rails, and then the rails installed into fixtures so that the relationship of the modules to the fixtures are precisely as desired. This could be done with individual rails that fit in only one location in the fixture (like the cut-up pieces just discussed), however it is more convenient to make each rail identical, then to provide mounting locations within the fixture that orient the rails in a known and identifiable position in the fixture. Then each rail is identified with a marking as to its position in the fixture; the modules are individually installed and aimed in the rails, and the rails are mounted in the fixture. Finally the fixtures 5000 with their pre-aimed modules are installed on their support structures in a pre-planned orientation which places each module in the desired orientation with relation to its target.

In order to accomplish this, directional orientation of the module must be described in a way that allows an operator to aim it to its desired orientation relative to the module. Since the modules are quite small, it would be difficult to provide markings on the modules or rails that would provide sufficiently accurate indexing, though that could be done with very precise manufacturing and micrometer-like markings; however tolerance stackups and physical limitations for spacing of markings make this a sub-optimum solution. Further, for an operator to aim the module in this manner, an ordered pair of numbers (x and y rotations) must be read, remembered, and transferred, raising the possibility of introducing errors such as number transposition or simply forgetting the number, as well as requiring a visual discrimination on the order of less than a degree in two axes. Operator fatigue and statistical likelihood of simple error again mitigate against this solution.

A better solution is to provide an analogue for the light from each module (for example, a laser beam or 'dot' projected from the module) such that an operator can simply aim the light to a target and tighten a set of fasteners. This has the advantage that if a target can be identified, the operator can focus on a target at a medium distance rather than having to work repeatedly with very fine markings; further no calculations or memory of number sequences are required. If a machine is adapted to identify the particular module and create a target, then the operator merely has to match the light analogue (laser dot) with the target for a module within a few inches, then tighten two fasteners and check that the dot position is within the desired accuracy limits for the project.

This makes the setup of multiple fixtures having multiple light modules quite simple for the operator, but necessitates methods to enable the identification of the modules and the provision of individual targets for each of potentially several hundreds of modules for a given lighting project.

One way of accomplishing this would be to provide a fixed location for the rails such that when individual modules were mounted and identified in the rails, the aiming point for the module could be specified by Cartesian coordinates on an aiming wall. Thus with a laser 6050, FIGS. 14A and 16W, mounted on a module so that its projected 'dot' 21, FIG. 18B was on or very close to the optic axis of the module, the operator could read an ordered pair of numbers and measure a distance up 19, FIG. 18B and over 18 from a known reference point 17 on the aiming wall 28, FIG. 18B. That desired location 24 (FIG. 18F), FIG. 18B could be marked with a marker (paint, tape, etc.) and the module with its laser aimed to the point. This solution, however, still requires remembering an ordered pair of numbers, and then measuring a distance from a reference point. Introduction of error is still likely due to operator error and other factors.

A partial solution would be to provide a way of automating the identification of the aiming point. Given a fixed position of the rail in a mounting fixture relative to an aiming wall, another laser 6052, FIG. 18C, referenced to the mounting fixture and projecting a dot, could be aimed automatically at the desired aiming point. Or laser 6052, FIG. 18D could project a cross pattern 23 which could respectively represent the horizontal and vertical aiming Cartesian coordinates, such that the intersection of the laser lines indicates the aiming target. Or two lasers, 6052 and 6053 (FIG. 18E) could be used separately to project the horizontal and vertical lines forming the cross pattern 23. Then the operator could match the two points, tighten the fasteners and recheck for desired positioning. This is a partial solution that is better than previous options. However, given the wide range of mounting positions of fixtures and desired targets, the possible range of vertical positioning of the aiming point 24*a* (FIG. 18F) could require a very tall aiming wall, which would require uncomfortable working positions for the operator required to look up for extended times during the repetitive procedure. Or it could even far exceed the size of the aiming wall. Thus this solution has limitations.

Another solution is to position the rail 5070, FIG. 18G in a mounting bar 6010 FIG. 12 and FIG. 18I which is part of fixture 6000, that is in a known position relative to the aiming wall and which precisely and repeatable indexes each rail as it is mounted to the same know relationship to the fixture. Then the fixture itself would orient the rail 5070 so the target is within a much smaller range, such that the operator can gaze in a comfortable direction that is relatively close to horizontal. Thus the operator would orient the module, particularly the submodule 5100, FIG. 18G of the module that contains the LED light in the required two planes, but regardless of the angle specified between the module and the rail, the target would remain easy to match with the module's aiming laser.

In some cases, this might require the fixture to rotate in two axes, such that the aiming point might be kept constant regardless of module aiming specification. In other cases, such as FIG. 18H, the mounting bar 6010 might rotate only in one axis, such that either the horizontal or the vertical aiming direction remains the same, while the other aiming direction varies within the limits of practicability and comfort. For many situations, this means that the vertical aiming direction may be kept constant and the fixture rotates the bar 6010 and the rail 5070 to place each module being aimed in the same direction (typically in a more or less horizontal direction) even if the specified angle between the module and the rail is quite large. Then the fixture could direct a horizontal laser aiming line (indicating the vertical axis aiming direction for the module) at a constant location. A second laser, projecting a vertical line (indicating the horizontal axis aiming direction) which would be affixed to the fixture and which would rotate from side to side, would be directed towards the aiming wall. The intersection of the horizontal and vertical laser lines, as previously described, would indicate the aiming point. This arrangement allows for a relatively large movement of the vertically oriented laser line from side to side, since looking left or right is less likely to cause discomfort for an operator (particularly since there is freedom to stand and move about) than having to look up or down for an extended time. So while the fixture could be arranged to rotate the rail in two axes, it appears most advantageous to rotate about the horizontal axis, thereby providing increased operator comfort and efficiency while saving the cost of an additional axis of rotation for the large fixture instead of the relatively small laser.

So the fixture with controllable lasers and rail positioning provides an efficient way of repeatedly aiming modules to differing specifications. And though the final aiming operation is quite simple, calculating fixture positioning can be complicated, since there are many different reference points and angles that need to be considered.

The modules which are positioned in the rails are installed in a specific location in their respective rails. The modules typically have two degrees of freedom of rotation. In the example specifically described have the module rotates or pivots about vertical axis V(Y) 5091 (the double ended vertical arrow through point 5090 on component 5350), FIG. 18G in a horizontal direction at the mounting point 5090 on the rail. The point of rotation 5095 in the vertical direction, is in front of and below the mounting point, about the horizontal axis H(X) (represented as a dot 5101, FIG. 18G). So simplistically viewed, all that is necessary to aim the module is to calculate the X and Y rotation of the module at the rail in order to be directed to the target when the rail is installed on the fixture in its final location. However, it can be beneficial to compensate for several factors in order to translate that simpler specification.

Many ways of specifying these locations are possible. For instance, it would be possible to arbitrarily pick any point on the rail and calculate an aiming angle for a module installed at that angle; however for manufacturing it is desired to have a limited number of possible locations to limit the number of calculations. One solution that is relatively simple to manufacture and specify locations for is to provide slots tangent to an arc on the rail.

So, many factors which are not immediately obvious and which are not trivial are necessary to consider in order to facilitate an aiming system which is easy and convenient to operate.

A Proposed Procedure:

Since it has been established that the purpose of the aiming fixture is to reproduce the positioning of modules on rails that would be created by aiming the modules mounted on the fixtures in their final positions, one way to envision the aiming process is to consider a module mounted in its correct position on a rail which was mounted in its correct position in a fixture, the module being aimed correctly to its target. If this rail were to be removed without disturbing the relationship of the module to the rail, it would be quite simple then to mount the rail in the aiming fixture and mount the aiming laser on the module. Then the fixture's rail mount would be manipulated (i.e. rotated up or down) so that projected dot from the aiming laser lay on the line projected by the horizontal laser from the aiming fixture. Then the side-to-side aiming laser projecting the vertical line from the aiming fixture would be rotated left or right so that it intersected the horizontal line at the point where the module aiming laser dot was already on the horizontal line. At this point, it would be possible to describe the point of intersection on the aiming wall using Cartesian coordinates. Then the rotation angle of the aiming fixture and the rotation angle of the side-to-side aiming laser could be precisely measured. Given this information, another module mounted in an identical location on another rail could be aimed for the same target by placing the aiming fixture's rail mount and its side-to-side aiming laser in the same position, then installing an identical aiming laser on the module and simply manipulating the module so its aiming laser dot matched the intersection of the two lines from the aiming fixture. Then for each additional module, the Cartesian coordinates on the aiming wall and the required adjustments on the aiming fixture could be recorded by removing a rail with its aimed modules from a fixture and then repeating the above procedure.

Thus a library of aiming coordinates could be established for as many module aiming points as desired. And for a lighting project having very many fixtures, each having identical aiming coordinates, this might be a workable, though extremely difficult and time-consuming procedure. Consider that if this procedure were followed, the manual aiming procedure in situ, while working outside and at a high elevation would have to be done only once, instead of once for each of tens or even hundreds of fixtures. However, performing this procedure even once is not optimum, since there are many dangers and difficulties associated with working at the tops of lighting structures (e.g. tall poles, or other structures). Also, if the aiming angles for each module in each fixture were not precisely the same, there would be no possible benefit for aiming the modules, then removing the rails to create aiming measurements and coordinates, since there might be no identical aiming instructions in an entire installation of hundreds or even thousands of individual modules.

A different procedure would be to calculate, rather than simply copy, the aiming angles for each module 10, thereby eliminating the need to do any manual aiming on site. This would simply require determining the geometrical relationships that describe a module in its aimed position on a rail, and comparing those relationships to the position of the rail on the fixture's rail mount, the position (i.e. rotation) of the fixture's rail mount and the position (rotation) of the fixture's side-to-side aiming laser, then comparing the relationship of the fixture components to the aiming point on the aiming wall described by the Cartesian coordinates. This procedure is achievable, but not obvious, since it requires understanding the geometrical relationship of several coordinate systems. This includes at least:

- Describing the location of the aiming point 21, FIG. 18J on the aiming wall 28 in its coordinate system
- Describing the position of the aiming fixture 5050 relative the aiming wall 28
- Describing the position of the fixed (horizontal) targeting laser 6053, FIG. 18J relative the fixture 5050 and the aiming wall
- Describing the position of the moveable (side-to-side) aiming laser 6052, FIG. 18J relative the fixture and the aiming wall
- Describing the position of the moveable rail mount 6010, FIG. 18H, 18I relative the aiming fixture Describing the position of the mounted rail 5070, FIG. 18H, 18I relative the aiming fixture rail mount Describing each possible position of the module 10 on its side-to-side pivot 5090 FIG. 18G relative to the rail Describing the position of the module up-and-down pivot 5095, FIG. 18G relative to the rail Describing the angular position of the submodule 5100, both up-and-down and side-to-side Describing the position of the module aiming laser 6050, FIG. 18G relative the submodule 5100.

Thus while the procedure of simply pointing a module to match an aiming point on a wall, then tightening the mounts and rechecking the aiming accuracy is quite simple, the calculations required to provide the correct aiming point for any desired module aiming angle is neither simple nor obvious.

Examples of Specific Geometrical Relationships:

The module aiming laser 6050 must be temporarily mounted in fixed and repeatable location relative each module. The submodule 5100 has an optic axis 5105. The laser 6050 with its optic axis 5106 is mounted as close as possible to the optic axis of the module. It would be possible, but would be difficult and likely impractical to mount the laser precisely coaxial with the optic axis. So the axis of the aiming laser must be at least parallel, and physically close to the optic axis of the module. This will result in a small parallax error or offset in aiming—no more typically than the distance of a few inches—between the projected laser dot and the actual aiming point of the module. This error will likely not be significant on an actual lighting target (e.g. many tens or even hundreds of feet away), where accuracy on the order of a few feet is considered sufficient. However if the laser axis is not parallel to the module axis, the aiming could easily be off by tens of feet over an aiming distance of tens or hundreds of feet. (If even the parallax error is not acceptable it could be overcome by calculating the known distance between the two axes and correlating them geometrically with the distance to the actual aiming target and adjusting the calculated angle of the module accordingly.)

The module 10 in this embodiment has two pivot points, which describe two axes. A third pivot point and axis could be considered as well if it were desirable to consider rotation of the module about a Z-axis in order to maintain, for example, a horizontal effect of a wide beam of light projecting from the module. For most instances however, two pivot axes will be sufficient. Many types of arrangements for providing two axes are possible. One common arrangement is a pivot joint 5095 as seen in FIG. 18G made as part of the module mount, which provides up and down motion about the H(X) axis 5101 and a pivot joint 5090 which also serves as the module mounting point to its rail, and which provides side to side motion about the V(Y) axis 5090 FIG. 18G. It should be recognized that the Z axis for the submodule 5100 may be considered to be the optic axis 5105 which is also along the vertical plane through the V(Y) axis 5090.

The rail 5070, FIGS. 18G and 18L has several possible mounting points (e.g. 5071, 5072, 5073) to allow multiple modules to be installed. It is described in terms of the rail coordinate system (Rail CS) Since fixtures tend to be curved, the rail is also curved. This means that module mounting points near the ends of the rail have significantly different X and Z coordinates then a module mounted in the center.

The module mounting point on the rail describes where the module mount 5102. FIG. 18G is fastened to the rail. The top of the rail, center of center slot 5072 (FIG. 18M) is designated as Rail CS (0,0,0) point. The module therefore pivots at an simple angle relative the Z axis since the module V axis always remains parallel to the rail Y axis. The module pivots at a complex angle relative the X axis but the module H axis is typically skewed with relation to the rail X axis (in other words, the module H(X) axis is typically neither on the rail X-Z plane, nor is it parallel to the rail X axis.

The rail itself as embodied is a curved 'T' shape, with the flange 5340 FIG. 18G of the T forming a portion of a cylinder, and the web 5350 perpendicular to the flange, with its bottom or inner edge a relatively consistent distance from the flange. The center module mounting point lies on the "mounting arc" 5370. The mounting arc is concentric with the flange, and lies on the surface of one side of the flange. The several module mounting locations could be simply evenly spaced holes about the mounting arc; however for purposes of manufacturing in this embodiment they are slots which functionally provide a left, center, and right mounting point per slot. This makes describing module position more complicated, since the slots are not curved, but straight. Thus while each slot has its long-axis centerline tangent to the arc through the center mounting point on the rail, the left and right mounting points in each slot are very slightly displaced in the negative Z direction from the mounting arc through the rail zero point.

For purposes of specifying the fixture design, the rails are designed to have several modules mounted. Since the modules have two degrees of freedom of rotation, they may be positioned somewhat arbitrarily and still be amiable to the desired target location. However because the modules occupy physical space which is constrained by the limited size of the fixture, it is helpful to allow the modules to have a variable spacing between the mounting points, in order to reduce or eliminate collisions between adjacent modules with different aiming specifications. The result is that for purposes of specifying the fixture, module mounting locations may be specified according to a nomenclature that describes exclusively one of the several available locations on the rail. These mounting locations must be described within the aiming coordinate systems in a way that supports the specification of the module aiming relative the rail, relative the aiming fixture, and ultimately relative the lighting fixture.

Given these coordinate systems and descriptions, the position of the module relative the rail can be specified in the following terms:

For the module CS by itself, an X-Y-Z and/or angular coordinate specifying:

Module optic axis 5105 (FIG. 18O) rotated [GAMMA] degrees 5121, [GAMMA] added to FIG. 18O relative the module Z axis 5220 about the H(X) axis 5200 FIG. 18N

Module H(X) axis 5101 distance 5222 FIG. 18G along the module Z or optic axis 5105 from module V(Y) axis 5090

Module H(X) axis distance 5223 FIG. 18G along the module V(Y) axis 5090 from the module Z or optic axis 5105.

Aiming laser 6050, FIG. 18G distance 5224 and angle (if any) from module optic axis 5106

For the module CS relative the rail CS:

Module optic axis 5105 rotated [PHI] degrees 5227 FIG. 18N about the rail Y axis 5310 relative the rail X axis 5200

Module optic axis 5105 rotated [BETA] degrees 5126 FIG. 18O relative the rail Z axis 5221

Module mounting point 5500 at its interface with the rail. The rail CS Y coordinate will be the distance from the top of the rail 5090 FIG. 18O to the bottom where the module interfaces with the rail. The X coordinate will indicate a distance to the left or right of the center point. The Z coordinate will indicate the distance forward from the center point of the rail, as the points are distributed about the curve (mounting arc) of the rail.

The aiming fixture is described in terms of a third coordinate system, Fixture CS. The X axis 5610, FIG. 18K is at the axis of rotation of the fixture's rail mount. The Y axis 5620 and Z axis 5600 18H lie orthogonal to each other on a plane through the center point of the rail as mounted. The Y axis is essentially vertical relative the fixtures location as installed. The Z and X axes are essentially horizontal relative the fixture location as installed.

The aiming fixture is installed in location that is described by a fourth coordinate system, Wall CS. The X 5710 and Y 5700 (FIG. 18P) axes lie on the plane formed by the aiming wall as previously described. The Z axis 5720 lies on the plane of the floor of the room, perpendicular to the aiming wall, at a "left wall" location that may describe an actual physical wall in the aiming room, or may simply describe a plane perpendicular to the aiming wall/X-Y plane. This Wall CS coordinate system allows the description of the physical location of the aiming fixture relative the aiming wall. It also allows the description of the location of the aiming points described by the horizontal and vertical targeting lasers mounted on the aiming fixture.

If each module being aimed were installed so that its aiming axis, the aiming laser axis, and the module H(X) and V(Y) axes all intersected the Rail CS origin, and if the Rail CS origin as installed in the aiming fixture coincided exactly with the Fixture CS origin, specifying the aiming points would be relatively simple. The module aiming specification would simply specify a single rotation side to side and a single rotation up and down. The fixture rail mount would rotate the same angle in the opposite direction as the module up and down specification, and the horizontal targeting laser would rotate the same number of degrees in the same direction as the module. However, each transition from one coordinate system to the next introduces major or subtle changes in the geometry, since:

- there are many different coordinate systems which are not co-originated
- the modules are not mounted in only one position
- the module pivots are not both centered at single point
- the aiming laser is not coaxial with the module aiming axis.

Thus, while the mathematical calculations can be performed by those with skill in the art, mathematical transformations can be used, and as will be seen, requires the application of not only geometry and trigonometry, but also matrix math to describe and perform the operations of this example.

IV. OPTIONS AND ALTERNATIVES

The invention may take many forms and embodiments. The foregoing examples are but a few of those. To give some sense of some options and alternatives, a few examples are given below.

Given sufficient space and or other considerations, the line 6035 could become a variable, and the module aiming mount 6010 could be fixed with reference to the room. While this might necessitate a much greater distance from the lowest to highest aiming point, even to the extent of requiring a lowered floor or raised ceiling to allow sufficient range of adjustability, there might be reasons for accuracy, economy, or production efficiency which would make this advantageous.

While having automated setting of the laser lines and angle of the aiming module mount is a great convenience, the procedures could be effected manually by using angular aiming methods well known in the art. It would be necessary to provide a means of aiming each component according to specifications provided to the technician, which would be as simple as rotating the aiming mount and the azimuth laser to a given angle, then adjusting the module as previously described. However, the most desirable embodiment uses automatic methods for speed, convenience, and accuracy.

Bar coding with automatic scanner input of module groups is an easy way to identify them using a scanner such as 6080, FIG. 12. However other means, such as even manually marking an ID number on the groups using paint or marker, then entering the ID number manually into the controller would work.

For best results, accuracy of the fixture should be maintained by keeping manufacturing tolerances within common machine shop practice. During the aiming procedure, the technician need only keep the laser dot from the aiming laser 6050 within 1-2 inches of the intersection of lines 6025 and 6035, for example, FIG. 12. In actual practice, it is quite easy to aim and hold the laser dot to within ¼ inch or less of the desired point. These practices have been shown to keep the position of the aimed beam within a few feet at a projected distance on the order of 300 feet. Desired accuracy exceeding these standards is not normally required in the lighting industry, however careful manufacturing of the fixture and careful operation of the aiming fixture will enable whatever level of accuracy might normally be desired for a lighting installation.

What is claimed is:

1. A method for aiming LED modules, each LED module mounted in a mounting frame which is adapted to be installed into a lighting fixture which is adapted to be installed and operated to provide illumination to a target area at a site, which allows a plurality of individual LED modules to be aimed with respect to one or more axes and in reference to pre-determined aiming points correlated to the target area comprising:

a. identifying a first set of the LED modules;

b. attaching a first LED module of the first set of LED modules to a specific position in a first said mounting frame; and c. attaching the first mounting frame with the first attached LED module to an aiming fixture which (i) projects one or more laser reference lines to an aiming surface and (ii) positions the first mounting frame with reference to a desired angle between the first LED module and the aiming surface to assist in aiming the first module in reference to one of the pre-determined aiming points;

d. attaching each of the other LED modules of the first set of LED modules sequentially to a specific position in the first said mounting frame attached to aiming fixture which (i) projects one or more laser reference lines to the aiming surface and (ii) positions the first mounting frame with reference to a desired angle between each said other LED module and the aiming surface to assist in aiming each said other LED module in reference to a pre-determined aiming point;

e. repeating steps a. to d. for one or more additional mounting frames adapted to be installed into the same lighting fixture as the first mounting frame and first set of LED modules, each additional mounting frame including an additional set of LED modules;

f. so that each set of the LED modules for each mounting frame is pre-aimed in reference to the same said lighting fixture and the pre-determined aiming points so that when the lighting fixture is installed at the site, each said LED module on whatever said LED mounting frame in the fixture is pre-aimed relative the target area at the site.

2. The method of claim 1 wherein each said LED module comprises an LED, optics, and a mounting joint with two degrees freedom of movement.

3. The method according to claim 2, which allows a plurality of said LED modules to be aimed with respect to one or more axes and in reference to the pre-determined aiming points, further comprising:

a. calculating the desired orientation of a said LED module with reference to a said mounting frame or lighting fixture;

b. calculating the required geometrical relationship between the said LED module and its said mounting frame or lighting fixture, including any other said mounting frames which have a fixed geometric relationship to the said mounting frame or lighting fixture; and c. adjusting the said LED module in one or more axes relative to the said mounting frame or lighting fixture including any other said mounting frames in the lighting fixture.

4. The method according to claim 3, wherein the desired orientation of the said LED module is indicated by creating one or more indicia relative to the mounting frame, and the LED module is positioned by adjusting it to match or approximate the indicia.

5. The method according to claim 4, wherein the indicia are projected using light sources oriented with reference to the mounting frame.

6. The method according to claim 5 wherein another light source is oriented with reference to the LED module and projects a mark which in comparison with the indicia indicates the orientation of the LED module with reference to the mounting frame.

7. The method according to claim 6 wherein another light source oriented with reference to the LED module is a laser.

8. The method according to claim 5 wherein the light sources are lasers.

9. The method according to claim 5 wherein the light sources comprise one or more digital projectors.

10. The method according to claim 1 for aiming said LED modules wherein the LED modules are identified, attached to a said mounting frame, and affixed to the aiming fixture.

11. The method according to claim 10 for aiming said LED modules with reference to a said lighting fixture and the target area, comprising:

a. identifying a said lighting fixture location, position, and orientation with respect to the target area;

b. calculating lighting requirements for the target area;

c. determining individual said LED modules needed to provide required lighting for the target area and identifying the LED modules by type, number, and aiming direction or orientation relative the lighting fixture;

d. identifying the mounting frames with respect to number, type, and position on which the required LED modules are to be mounted;

e. calculating the required aiming direction for each said LED module with reference to the target area and the lighting fixture;

f. calculating the required aiming direction for each said LED module with reference to its said mounting frame;

g. calculating a required positioning for the mounting frame when temporarily installed in an automated aiming mechanism;

h. mounting individual said LED modules to their said mounting frames;

i. temporarily installing a said mounting frame, to which is mounted one or more said LED modules, in the automated aiming mechanism which creates, projects, or is referenced to one or more fixed or variable aiming marks or references usable for an aiming process;

j. identifying said mounting frame with regard to its predetermined position in its said lighting fixture and the required aiming for its one or more said LED modules;

k. identifying one of the one or more said LED modules with reference to its pre-determined location and orientation;

l. positioning mounting frame and LED module aiming references with reference to each other by the automated aiming mechanism;

m. mounting a position indicator on the identified LED module to indicate the position of the LED module with reference to the mounting frame;

n. adjusting the LED module to the desired position with reference to the mounting frame;

o. repeating the process to aim each of the one or more LED modules with reference to its said mounting frame; and p. repeating the process for any remaining said mounting frames.

12. A system for aiming plural individually adjustable LED lighting modules in a lighting fixture comprising:

a. a lighting fixture housing comprising a plurality of spaced apart mounting surfaces for a plurality of mounting frames each supporting a set of the LED lighting modules;

b. each said mounting frame adapted to be attached to the mounting positions in the lighting fixture housing and having mounting slots for attaching individual said LED lighting modules along the mounting frame;

c. an aiming station comprising:

i. a base;

ii. an aiming jig on the base, the aiming jig having a longitudinal axis in a mount for removable mounting of any of the mounting frames;

iii. an azimuth laser mounted on the base and projecting a vertical laser line;

iv. an elevation laser mounted on the base and projecting a generally horizontal laser line;

v. a projection surface spaced from the base and generally in the aiming direction of the azimuth and elevation lasers;

vi. a module laser removably mountable to a said LED lighting module;

vii. a controller comprising digital storage memory for storing software that includes correlated aiming directions for each said LED lighting module of each said mounting frame for a given said lighting fixture housing and instructions to actuators that can automatically rotate the aiming jig around its longitudinal axis and pan the azimuth laser relative to the projection surface in correlation to the data base of aiming angles.

13. The system of claim 12 further comprising software associated with the controller that translates three dimensional space at and around the projection surface and the base to the desired aiming direction for a said LED lighting module from the data base and calculate the pan/tilt adjustment needed to match the intended aiming direction with the physical space of the aiming station to allow manual manipulation of a said LED lighting module on the lighting jig relative to the projected azimuth and elevation laser beams to provide a worker with a visual target for the module laser beam to effectuate the intended aiming for the LED lighting module.

14. A method of rapid and repeatable aiming individual solid state light source modules according to a lighting plan for a pre-determined target area, each having at least two degree freedom of movement adjustability, for a lighting fixture having a plurality of such light source modules comprising:

a. forming a housing for the lighting fixture;

b. assigning mounting positions for one or more module mounting frames in the lighting fixture housing;

c. providing light source module mounting locations along each said mounting frame;

d. mounting a said light source module on a said mounting frame;

e. rotating the mounting frame correlated to a desired tilt of the light source module, relative to the mounting frame according to the lighting plan;

f. projecting a reference target for a pan of the light source module relative to the mounting frame on a projection surface according to the lighting plan;

g. projecting a laser beam from a light source module laser coincident with the optical or aiming access of the light source module to the projection surface according to the lighting plan; and h. adjusting pan/tilt of the light source module until the light source module laser coincides with an appropriate reference position on the projection surface; and i. repeating for each light source module.

15. An apparatus for aiming solid state light source modules relative to a module mounting frame adapted for mounting in a lighting fixture, said mounting frame adapted to allow a set of said modules to be adjustably mounted to said mounting frame comprising:

a. an aiming fixture at an aiming station;

b. the aiming fixture having a mounting location for a said module mounting frame and being rotatable over a range to tilt module mounting frame up or down;

c. a reference laser projecting a laser line correlated with azimuth for aiming a said source module;

d. a projection surface spaced from said aiming station onto which the azimuth laser is projected; and e. a removable laser mountable on a said light source module in alignment with the aiming or optical axis of the said light source module, wherein f. the plurality of lighting modules can be aimed rapidly without removing or repositioning said mounting frame, using repeatable motions for identifying, mounting, and aiming said modules relative predetermined aiming points applicable to each individual lighting module; further wherein g. each of the other LED modules of the first set of LED modules is sequentially mounted to a specific position in the first said mounting frame and wherein said aiming fixture (i) projects one or more laser reference lines to the aiming surface correlated to the desired aiming point of said module and (ii) positions the first mounting frame with reference to a desired angle between each said other LED module and the aiming surface to assist in aiming each said LED module in reference to a pre-determined aiming point;

h. further wherein each mounting frame may be removed after the set of modules is aimed and further mounting frames comprising sets of LED modules may be installed such that the aiming of the modules relative the mounting frame and thus relative the intended final mounting location of the mounting frame, is retained, until all mounting frames have been aimed as intended.

* * * * *